(12) United States Patent
Lockhart, Jr. et al.

(10) Patent No.: US 11,334,843 B2
(45) Date of Patent: May 17, 2022

(54) APPARATUS FOR TEMPORAL SCHEDULING OF A LOAD TO BE TRANSPORTED

(71) Applicant: Freightmonster.com Inc., Hamilton, MT (US)

(72) Inventors: Larry C. Lockhart, Jr., Hamilton, MT (US); Arlen Anderson, Corvallis, MT (US); Matt Wilson, Hamilton, MT (US)

(73) Assignee: Freightmonster.com Inc., Hamilton, MT (US)

( * ) Notice: Subject to any disclaimer, the term of this patent is extended or adjusted under 35 U.S.C. 154(b) by 233 days.

(21) Appl. No.: 14/635,692

(22) Filed: Mar. 2, 2015

(65) Prior Publication Data
US 2015/0248637 A1    Sep. 3, 2015

Related U.S. Application Data

(60) Provisional application No. 61/946,610, filed on Feb. 28, 2014.

(51) Int. Cl.
  *G06Q 10/08*    (2012.01)
(52) U.S. Cl.
  CPC ................ *G06Q 10/0835* (2013.01)
(58) Field of Classification Search
  CPC ............. G06Q 10/0835; G06Q 10/083; G06Q 10/0833; G06Q 10/0837
  USPC ........................................................ 705/337
  See application file for complete search history.

(56) References Cited

U.S. PATENT DOCUMENTS

| 2002/0032018 A1* | 3/2002 | Morton ................... H04L 51/38 455/412.1 |
| 2005/0177447 A1* | 8/2005 | Napier ............... G06Q 10/0831 705/26.1 |
| 2005/0209913 A1* | 9/2005 | Wied ................... G06Q 10/083 705/12 |
| 2005/0278063 A1* | 12/2005 | Hersh .............. G06Q 10/06311 700/216 |

(Continued)

OTHER PUBLICATIONS

Beecher, Susan. "Can the Electronic Bill of Lading Go Paperless?" The International Lawyer, vol. 40, No. 3, American Bar Association, 2006, pp. 627-647, http://www.jstor.org/stable/40707816. (Year: 2006).*

*Primary Examiner* — Emmett K. Walsh
(74) *Attorney, Agent, or Firm* — Keith D. Grzelak; Wells St. John P.S.

(57) ABSTRACT

An apparatus is provided for improved processing of instructions to provide temporal selection to a client when scheduling a load to be transported for a prospective transportation industry customer. The apparatus includes a processor and a non-transitory machine readable memory. The processor is designed to process instructions to provide date and time selection to a client from a server to enable temporal scheduling of a load to be transported for a prospective transportation industry customer. The non-transitory machine readable memory at a host server has stored therein computer instructions programmed to cause the processor to store and access user information and instructions, and to present, enable, receive, store and associate date ranges, time ranges and waypoints for a load and cargo delivery destination. A method is also provided.

16 Claims, 54 Drawing Sheets

(56) References Cited

U.S. PATENT DOCUMENTS

| | | | |
|---|---|---|---|
| 2013/0342343 A1* | 12/2013 | Harring | G08B 21/18 340/521 |
| 2014/0195457 A1* | 7/2014 | Lozito | G06Q 10/0834 705/334 |
| 2014/0200942 A1* | 7/2014 | Benjamin | G06Q 10/1093 705/7.18 |
| 2014/0229258 A1* | 8/2014 | Seriani | G06Q 30/08 705/14.23 |
| 2015/0077276 A1* | 3/2015 | Mitchell | H04W 4/021 340/995.1 |

* cited by examiner

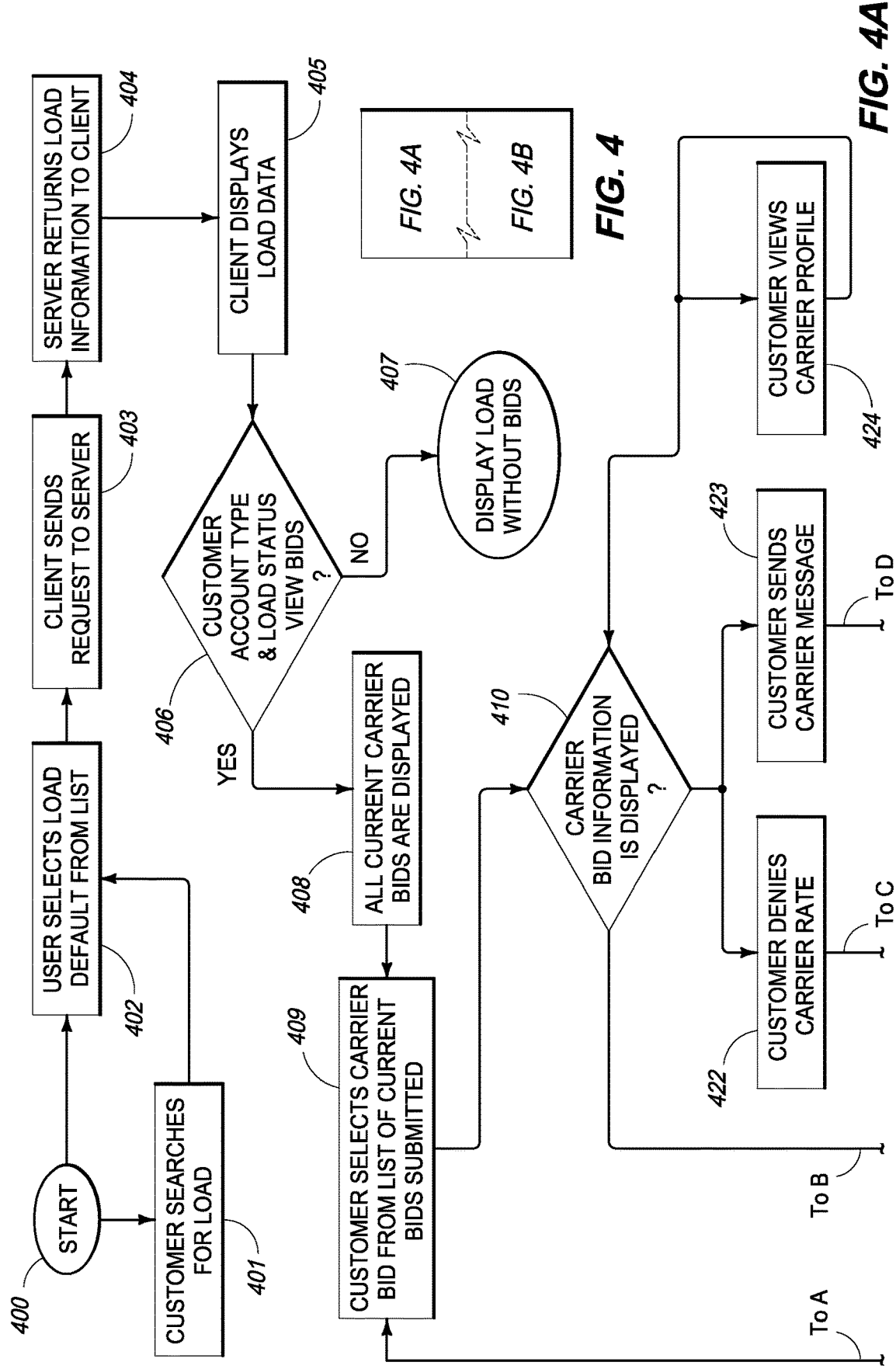

FIG.5 freightmonster.com PORTAL — Load 54801

- Dashboard
- Loads
- Contracts
- Settings
- Log out

54801
Broker: Fred Doe   assign broker

PRIVATE   ★ Search

PUT ON HOLD   Move to Waiting for Pickup   Cancel   On Load Boards

Customer   John Doe
Customer PO   rigging shop
Commodity   40' sea container
Preferred Equipment   Flatbed
Blind Load?   No
Need a Tarp?   No
Full or Partial?   Full
Gross Pay Rate
add item Finish 🗓   Carrier Pay Rate
add item Rates   add bids Paperwork   add files $5,500

Route   3,456 mi   add shipper / receiver

Shipper   Set Date & Time  — 502
  Search Facilities     Phone
  Street Address        Pick #
  Seattle WA   Zip Code   US

— 501

Receiver   3,456 mi   Set Date & Time
  Search Facilities     Phone
  Street Address        PO #
  Key West FL  33040  US Weight 14,000 lb   Length 40'
Units [n/a]        Width 8'
                   Height 8'6"

Weight [n/a] lb    Length [n/a]
Units [n/a]        Width [n/a]
                   Height [n/a]

map it

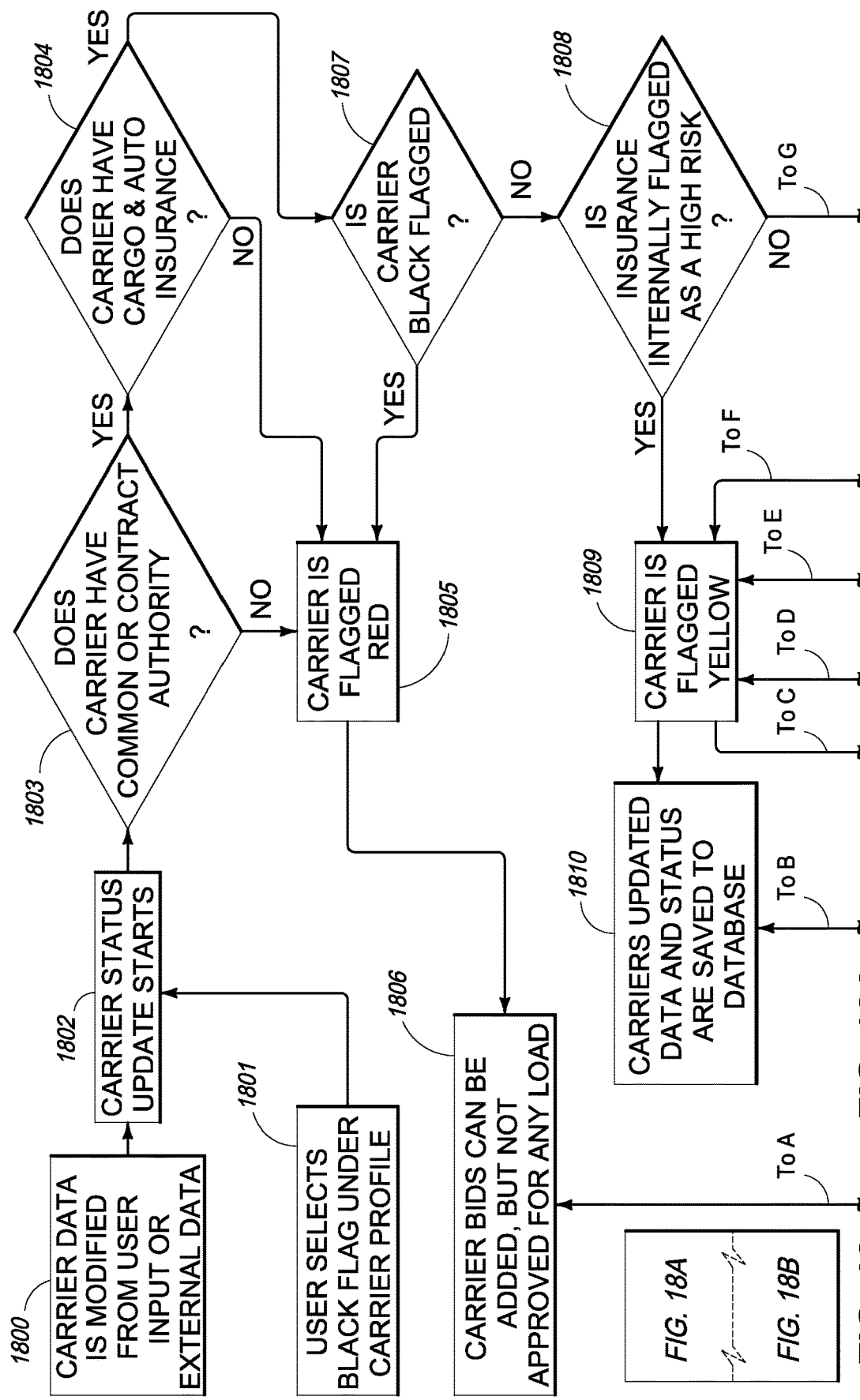

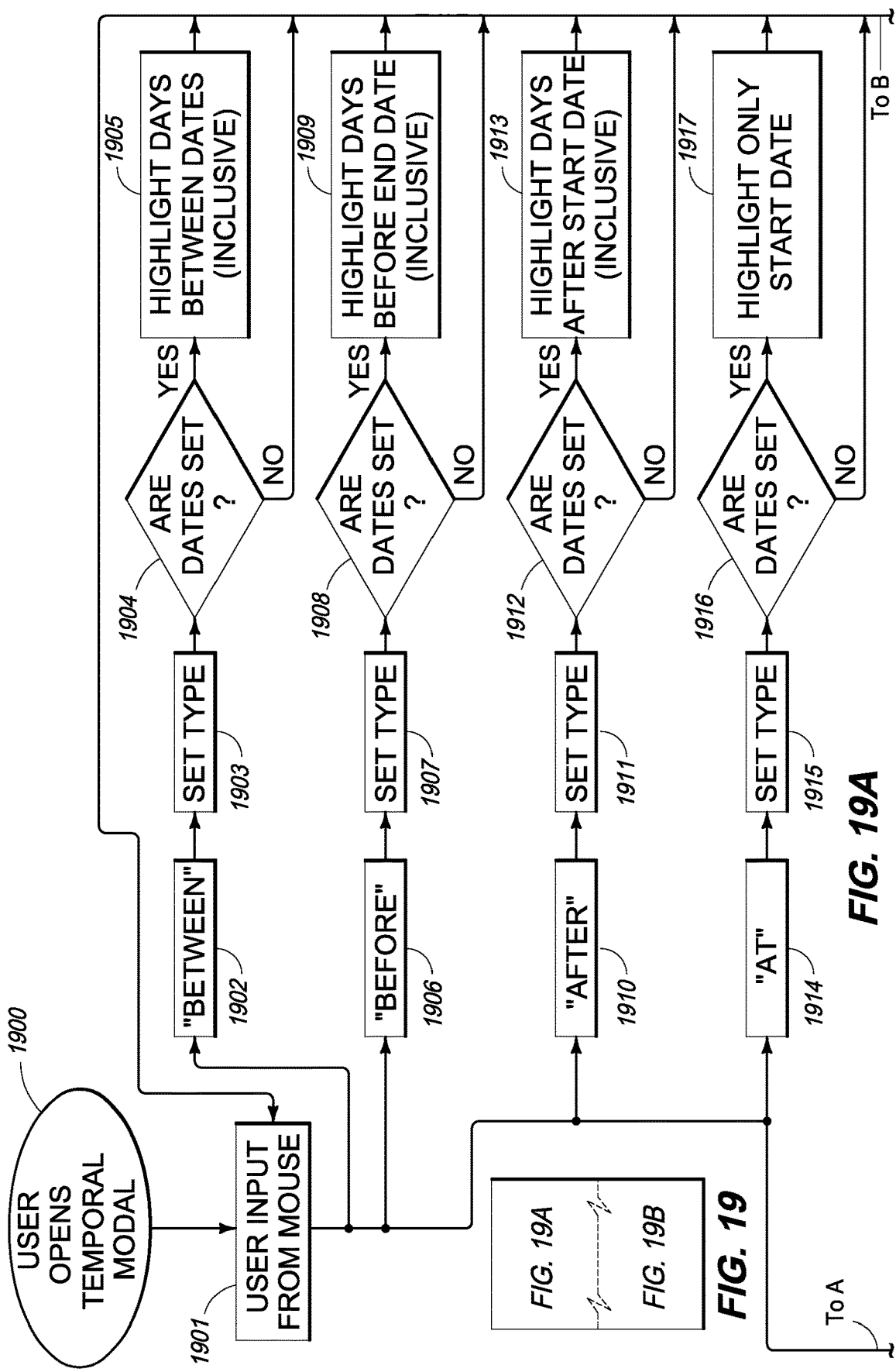

← → C  🔒 https://portal.freightmonster.com/contact/110497 ☆ freightmonster.com
PORTAL

- ● Dashboard
- 🚚 Loads
- 👥 Contacts
- ⚙ Settings
- ⏻ Log out

🔔 Notifications

🔔 Notifications

Fdc Enterprises LLC
Fleet Company

— 2002

[+ Add Info]

Billing  (360) 425-9111
Fax     (866) 697-7104

Billing  614 N 3rd Ave
         Kelso WA  98626  US

Affiliates    add an affiliates

| Details | | | Black Flag This Carrier |
|---|---|---|---|
| Docket # | MC556308 | Authorities | |
| USDOT | 1468625 | Common | None |
| TIN | | Contract | Active |
| Grade | B- ← 2006 | Broker | None |
| | | Drivers | 1 |
| | | Trucks | 1 |

← 2004

Assign Factoring Company

Rates    add files
Loads                                                                show all
Load    Lane    Customer    Broker                                   Status Paperwork    add files                                          show deleted

Insurance  Cargo Limit: $100,000    Add a Policy    Flag as High Risk

Auto
Policy Number: 70TRS027459    Effective: 12/16/2013 - 12/16/2014    Combined Single Limit $1,000,000
Scheduled Autos              The Campbell Group (confident)          (Each Accident)
                             Phone: (800) 938-7825  Fax: (888) 231-8598

Policy Number: 70TRS027459    Effective: 12/16/2013 - 12/16/2014    Combined Single Limit $1,000,000
Scheduled Autos              The Campbell Group (confident)          (Each Accident)
                             Phone: (800) 938-7825  Fax: (888) 231-8598
                                                                             Mon Dec 16 2013

Cargo
Policy Number: 467679        Effective: 12/16/2013 - 12/16/2014    Reefer Breakdown Ded. $2,500
                             The Campbell Group (confident)         Limit $100,000
                             Phone: (800) 938-7825  Fax: (888) 231-8598    Deductible $1,000
                                                                             Mon Dec 16 2013

(Browser chrome) ← → C  🔒 https://portal.freightmonster.com/load/54823  ☆  🔍

Apps | Bing Ads | AdWords | Analytics | FM youtube | Webmaster | Moz | FreightMonster Portal | FM Websites | VPN | Server | WordETC | Chrom Shortcuts | FM Archive freightmonster.com PORTAL

- Dashboard
- Loads
- Contracts
- Settings
- Log out

🚚 54823    [PUT ON HOLD]    Move to waiting for pickup    On Load Boards    Cancel Broker: Kiah H.    assign broker  ← 2102

| | | |
|---|---|---|
| Customer | John Doe | |
| Customer PO | 352 | |
| Commodity | Widgets | |
| Preferred Equipment | Van or Flatbed | |
| Blind Load? | No | |
| Need a Tarp? | No | |
| Full or Partial? | Full | |

Gross Pay
Rate        $3,421
Permits     $200
Tarp/Tailgate $100
Total Pay   $3,721

2104  2106
Rates       add bids
XYZ Trucking    $2,859    Open Quote
EFD Trucking    $3,100    Open Quote  ← 2108
       ↑    ↑
     2110  2112

Paperwork    add files    show deleted
☐ Customer Rate Confirmation

🔒 Carrier Pay
Rate    add item
Finish 🔒
$

Route    add shipper / receiver    map it

Shipper          BetweenThu Feb 13 2014 and Fri Feb 21 2014
[Search Facilities]                    Phone [    ]    Weight [n/a] lb    Length [n/a]
[Street Address]                       Pick # [    ]   Units [n/a]        Width [n/a]
Wooster OH 44691 US                                                       Height [n/a]

Receiver         After Thu Feb 20 2014
[Search Facilities]                    Phone [    ]    Weight [n/a] lb    Length [n/a]
[Street Address]                       PO # [    ]    Units [n/a]         Width [n/a]
Portsmouth VA 23707 US                                                    Height [n/a]

🔔 Notifications

[Browser window showing Load 54824 page at https://portal.freightmonster.com/load/54824]

freightmonster.com PORTAL

- Dashboard
- Loads
- Contracts
- Settings
- Log out

54824
Broker: Fred Doe   assign broker

Customer   John Doe
Customer PO   3412
Commodity   Widgets
Preferred Equipment   Flatbed
Blind Load?   No
Need a Tarp?   No
Full or Partial?   Full
Gross Pay
Rate   $4,500   Finish   Carrier Pay
Tarp/Tailgate   $150   Rate
add item   add item
Total Pay   $4,650   $ Route   658 mi   add shipper / receiver Shipper   Between Thu Feb 06 2014 at 9AM and Thu Feb 20 2014 at 5 PM
Search Facilities   Phone
Address   Pick #
Benton KY   42025 US Receiver   658 mi   After Wed Feb 19 2014
Search Facilities   Phone
Address   PO #
Valley View TX   76272 US Rates   add bids
Paperwork   add files PUT ON HOLD — 3402
Move to Waiting for Pickup   Cancel show deleted map it
Weight 6,000 lb   Length n/a
Units n/a   Width n/a
                Height n/a Weight n/a lb   Length n/a
Units n/a       Width n/a
                Height n/a Notifications

Load 54824 https://portal.freightmonster.com/load/54824 freightmonster.com PORTAL

- Dashboard
- Loads
- Contracts
- Settings
- Log out

Notifications (1)

54824

Broker: Fred Doe  assign broker

On Load Boards  
PUT ON HOLD   Move to Waiting for Pickup   Cancel

| | |
|---|---|
| Customer | John Doe |
| Customer PO | 3412 |
| Commodity | Widgets |
| Preferred Equipment | Flatbed |
| Blind Load? | No |
| Need a Tarp? | No |
| Full or Partial? | Full |

| | | Finish  Carrier Pay |
|---|---|---|
| Gross Pay | Rate | $4,500  Rate |
| Tarp/Tailgate | | $150  add item |
| add item | | |
| Total Pay | | $4,650 |

Route 658 mi   add shipper / receiver

Rates   add bids

LMN Transport   $3,500   Open Quote  [Approve] [Decline]   Step Deck

Add a note...

Equipment changed to Step Deck by You — a moment ago  
Amount changed to $3,500 by You — a moment ago  
Status changed to Open Quote by You — a moment ago

XYZ Trucking   $3,900   Open Quote

Paperwork   add files   show deleted

---

Shipper   Between Thu Feb 06 2014 at 9AM and Thu Feb 20 2014 at 5 PM

Search Facilities   Phone ☐   map it

Address  
Benton KY  42025 US   Pick # ☐

| | Weight | 6,000 | lb |
|---|---|---|---|
| | Units | n/a | n/a |

Length n/a  
Width n/a  
Height n/a

Receiver 658 mi   After Wed Feb 19 2014

Search Facilities   Phone ☐

Address  
Valley View TX  76272 US   PO # ☐

| | Weight | n/a | lb |
|---|---|---|---|
| | Units | n/a | n/a |

Length n/a  
Width n/a  
Height n/a

Load 54824 https://portal.freightmonster.com/load/54824

Apps | AdWords | Bing Ads | Analytics | FM youtube | Webmaster | Moz | FreightMonster Portal | FM Websites | VPN | Server | WorkETC | Chrom Shortcuts | FM Archive freightmonster PORTAL

- Dashboard
- Loads
- Contracts
- Settings
- Log out

54824

Broker: Fred Doe    assign broker

PUT ON HOLD    Move to Waiting for Pickup    Cancel    On Load Boards

Customer  John Doe
Customer PO  3412
Commodity  Widgets
Preferred Equipment  Flatbed Blind Load?  No
Need a Tarp?  No
Full or Partial?  Full
Gross Pay
Rate          $4,500       Finish   Carrier Pay
Tarp/Tailgate  $150                  Rate
add item                              add item
Total Pay     $4,650         $ Route  658 mi    add shipper / receiver

Rates    add bids
LMN Transport       $3,500    Open Quote
XYZ Trucking        $3,900    Open Quote
                              Approve | Decline
                              No Equipment Specified
Add a note...
Will Pick Up in Evening
a moment ago
Amount changed to $3,900 by You                by you
Status changed to Open Quote by You     a moment ago
                                        a moment ago

Paperwork    add files    show deleted

Shipper   Between Thu Feb 06 2014 at 9AM and Thu Feb 20 2014 at 5 PM
Search Facilities              Phone              Weight  6,000  lb
Address                        Pick #             Units   n/a  n/a
Benton KY  42025 US                                              map it
                                                   Length  n/a
                                                   Width   n/a
                                                   Height  n/a Receiver  658 mi   After Wed Feb 19 2014
Search Facilities              Phone              Weight  n/a  lb
Address                        PO #               Units   n/a  n/a
Valley View TX  76272 US                           Length  n/a
                                                   Width   n/a
                                                   Height  n/a Notifications (1)

FIG. 51

APPARATUS FOR TEMPORAL SCHEDULING OF A LOAD TO BE TRANSPORTED

RELATED PATENT DATA

This application claims priority to U.S. Provisional Patent Application Ser. No. 61/946,610, filed Feb. 28, 2014, entitled, "System and Method for Time Managing Loads in the Transport of Goods", the entirety of which is hereby incorporated by reference.

TECHNICAL FIELD

This disclosure pertains to business-to-business (B2B) transactions. More particularly, this disclosure relates to apparatus and methods for managing the transportation of freight.

BACKGROUND

Techniques are known for scheduling loads for delivery on behalf of a customer using a carrier. Such scheduling typically involves collating of multiple independent communications from one or more of phone calls, emails, and facsimiles from one or more customer and/or carriers. Logistics capabilities have yet to minimize efforts in intermediating load delivery for customers by carriers. Therefore, there exists a need to improve temporal selection of a load to be delivered and a load to be scheduled for delivery by a carrier that is to be transported for a prospective transportation industry customer.

SUMMARY OF THE INVENTION

A system and method are provided for managing the transportation of freight between shippers, brokers, and carriers. Functional interaction between the shippers, brokers, and carriers is provided in a different manner than is currently implemented in a "bricks & mortar" business model.

According to one aspect, a computer-implemented system of providing date and time selection to a client from a server is provided to enable temporal scheduling of a load to be transported for a prospective transportation industry customer. The system includes user information and instructions and a computer processor. The user information and instructions are stored in a computer memory at a host server. The computer processor accesses the memory at a host server to retrieve the user information and instructions and executes the instructions to perform steps including: presenting from the server to the client at a user interface one or more of a selectable date range and a time range for which the user provides a temporal-based requirement for picking up a customer load; enabling selection of one or more of a date range and a time range at a user interface of the client; receiving a selected one or more of the date range and the time range at the server from a user at the client; storing the received information into the database; associating the stored temporal data with a waypoint indicative of a cargo delivery destination desired by a customer; associating the stored waypoint to a load; and associating the attached load to the customer.

According to another aspect, a method is provided for enabling date and time selection from a client through a server to enable temporal scheduling of a load to be transported for a prospective transportation industry customer.

BRIEF DESCRIPTION OF THE DRAWINGS

Preferred embodiments of the disclosure are described below with reference to the following accompanying drawings.

FIGS. 4A and 4B together illustrate a flowchart for a customer selecting carrier bids, approving carrier rates, accepting carrier bids, and storing multiple customer approved bids on a load.

FIG. 5 illustrates a screen shot of a web page for a simple request for a broker for posting loads and identifying shippers and receivers of a type that would be displayed on the screen of one of the computers connected for communication with the processing circuitry of the server for the system of FIG. 1.

FIG. 11 illustrates a screen shot of a web page for realizing the temporal range selected in FIG. 10.

FIG. 14 illustrates a screen shot showing customer load details.

FIG. 16 illustrates load details including a new load with a temporal range selection.

FIGS. 18A and 18B together illustrate a flowchart depicting a system for rating carriers having checks and balances in accordance with an exemplary embodiment.

FIGS. 19A and 19B together illustrate a flowchart depicting logic behind selection of a temporal range in accordance with an exemplary embodiment.

FIG. 20 illustrates a screen shot for a carrier profile to access through one or more interfaces the features and functionality of FIG. 1 in accordance with an exemplary embodiment.

FIG. 21 illustrates a screen shot depicting a load profile with quotes attached to a load with ratings.

FIG. 22 illustrates a screen shot depicting a menu for interacting with a carrier rate on a load menu.

FIG. 23 illustrates a screen shot depicting a customer profile.

FIG. 24 illustrates a screen shot depicting a brand new load.

FIG. 27 illustrates a screen shot depicting realization of the line item added to the customer's invoice of FIG. 26.

FIG. 28 illustrates a screen shot depicting the ability to add a shipper and a receiver for a designated city and state.

FIG. 32 illustrates a screen shot depicting a realized selected temporal range implemented via actions depicted in FIGS. 29-31.

FIG. 33 illustrates a screen shot depicting automatically converted units of weight for a specific cargo over that entered in the screen shot of FIG. 32.

FIG. 34 illustrates a screen shot depicting a load status change "PUT ON HOLD" resulting from selection of a "POST TO LOAD BOARDS" field in FIG. 35.

FIG. 35 illustrates a screen shot depicting the adding of a carrier quote where permissions change the rate and "XYZ TRUCKING" is added.

FIG. 36 illustrates a screen shot depicting the addition of a second carrier quote to provide for multiple quotes.

FIG. 37 illustrates a screen shot depicting a carrier quote menu.

FIG. 39 illustrates a screen shot depicting realized changes of carrier quote equipment type from FIG. 38 to FIG. 39.

FIG. 40 illustrates a screen shot depicting the addition of a note to a carrier.

FIG. 41 illustrates a screen shot depicting realization of the added note input in FIG. 40.

FIG. 42 illustrates a screen shot depicting realizing equipment changes for the listed carrier with the added note and approval of "XYZ TRUCKING".

FIG. 43 illustrates a screen shot depicting realized changes for approved carrier "XYZ TRUCKING".

FIG. 44 illustrates a screen shot depicting creation of carrier rate paperwork.

FIG. 47 illustrates a screen shot depicting realization of customer rate confirmation paperwork.

FIG. 48 illustrates a screen shot depicting selection of change of load status to "IN TRANSIT".

FIG. 49 illustrates a screen shot depicting realization of selection of the changed load status in FIG. 48.

FIG. 50 illustrates a screen shot depicting added notes to a load with carrier permissions to view.

FIG. 51 illustrates a screen shot depicting that selection is being made for making it visible to a customer.

DETAILED DESCRIPTION OF THE PREFERRED EMBODIMENTS

This disclosure is submitted in furtherance of the constitutional purposes of the U.S. Patent Laws "to promote the progress of science and useful arts" (Article 1, Section 8).

Figure 1:
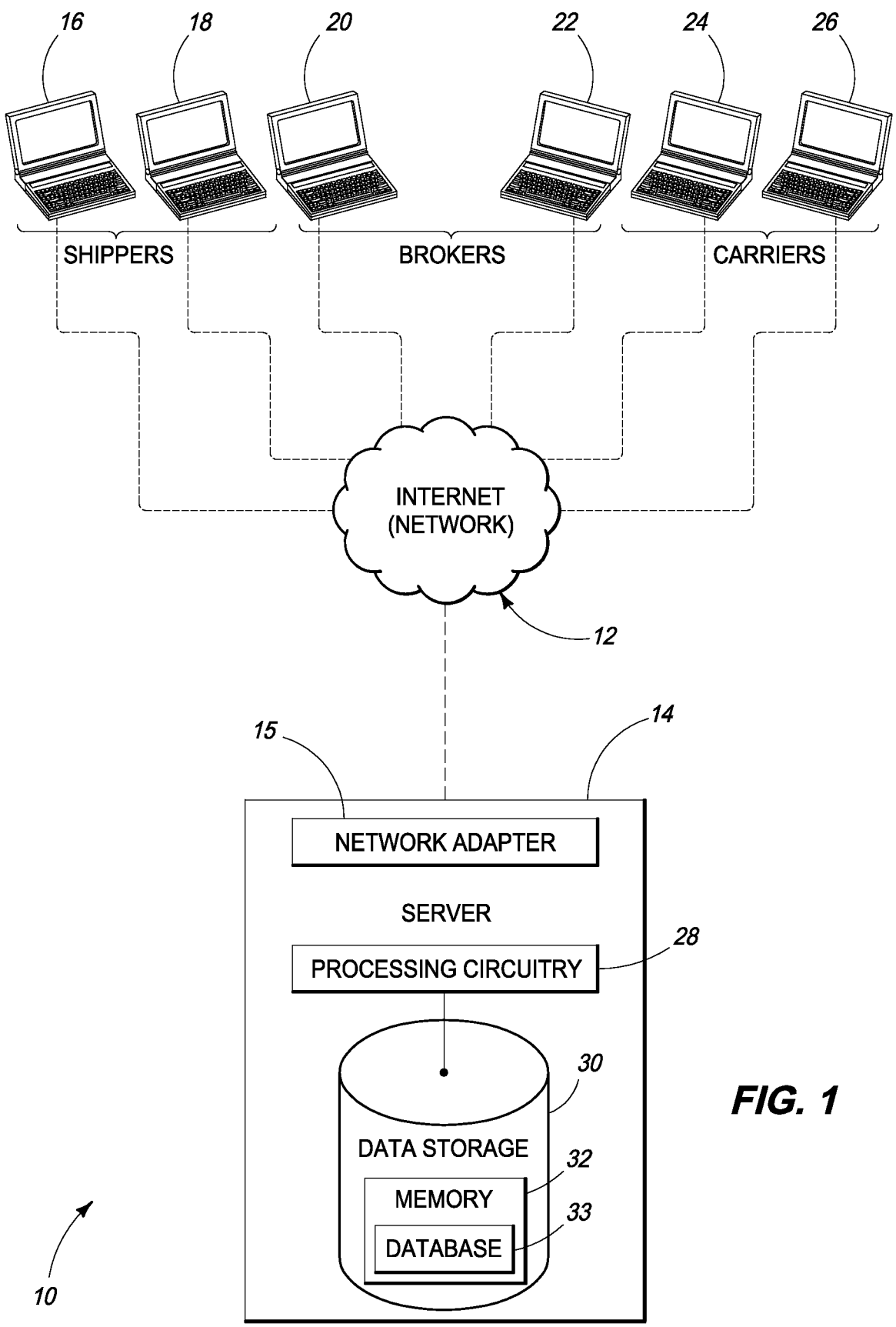
FIG. 1 is a block diagram of the central processing system and network used to carry out temporal selection of a load to be delivered and a load to be scheduled for delivery by a carrier that is to be transported for a prospective transportation industry customer according to an exemplary embodiment.

FIG. 1 shows a platform or system 10 used to carry out temporal selection of a load to be delivered and a load to be scheduled for delivery by a carrier that is to be transported for a prospective transportation industry customer according to an exemplary embodiment. The system 10 includes a network, such as the Internet 12, a server 14, and terminals, or clients 16, 18, 20, 22, 24 and 26. Server 14 includes one or more processor having processing circuitry 28 and data storage 30 having memory 32 communicating with the processing circuitry. Memory 32 includes, or defines one or more databases 33 configurable to store data. Server 14 includes one or more network adapters 15 that enables communication with a network, such as the Internet 12. Clients 16 and 18 comprise shipper terminals used by Shipper A and Shipper B, respectively. Clients 20 and 22 comprise broker terminals used by Broker A and Broker B, respectively. Clients 24 and 26 comprise carrier terminals used by Carrier A and Carrier B, respectively. Each client is further understood to include a wired or wireless communications device, memory, one or more processors having processing circuitry, an input/output device with a display driver for connecting the client to an input/output (I/O) device, such as a display, a keyboard, and a mouse. The display driver transforms digital data into visual images perceptible by a user at the client capable of generating screen images visible on the display. In several forms, client is a personal computer, a laptop, a tablet, or a smart phone.

As shown in FIG. 1, it is understood that one or more input modules can be generated by server 14. Such modules are each configured to cause a graphical user interface to be rendered on a user's client machine, or computer to enable a user to input data relating to selection, scheduling, and delivery of a load (freight). Such interface renders features provided on the screen shots provided herein. Similarly, output modules are configured to display results of the data that is input by a user.

Figure 2:
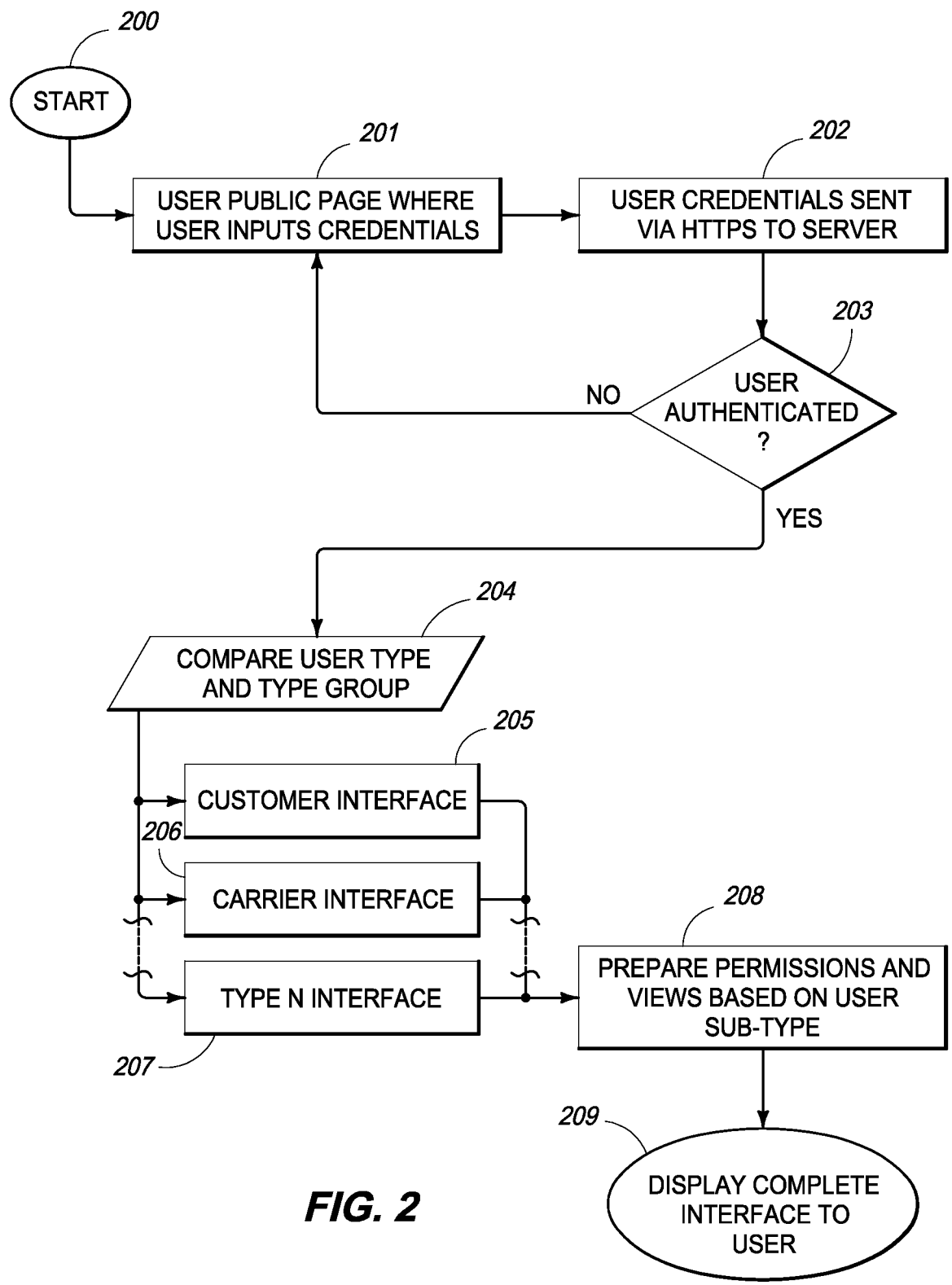
FIG. 2 illustrates a flowchart for implementing user authentication and permissions to access through one or more interfaces the features and functionality of FIG. 1 in accordance with an exemplary embodiment.

FIG. 2 illustrates a flowchart for implementing user authentication and permissions to access through one or more interfaces the features and functionality of FIG. 1 in accordance with an exemplary embodiment. With reference to FIG. 2, a flow of logic that is executed in various embodiments, when implementing user authentication and permissions is illustrated. The process can start at step 200. After start 200, the process proceeds to step 201 where a user public page is presented at one or more clients where a user can input their credentials. After step 201, the process proceeds to step 202 where the input user credentials are sent via HyperText Transfer Protocol Secure (HTTPS) to server 14 (of FIG. 1). After performing step 202, the process proceeds to step 203 where a user is authenticated (with a userid and a password). If the user is authenticated, then the process proceeds to step 204. If the user is not authenticated, the process proceeds to step 201. In step 204, the process compares user type and user group to determine which category a user is identified with including a customer interface at step 205, a carrier interface at step 206 and a "Type N" interface at step 207. Once a user has been identified and assigned to a user category, the process proceeds to step 208. In step 208, the process prepares permissions and views based on a user sub-type, such as "broker", "customer", and "account manager". After performing step 208, the process proceeds to step 209. In step 209, a completely functional interface is displayed to the authenticated (identified) and permissioned user.

Figure 3:
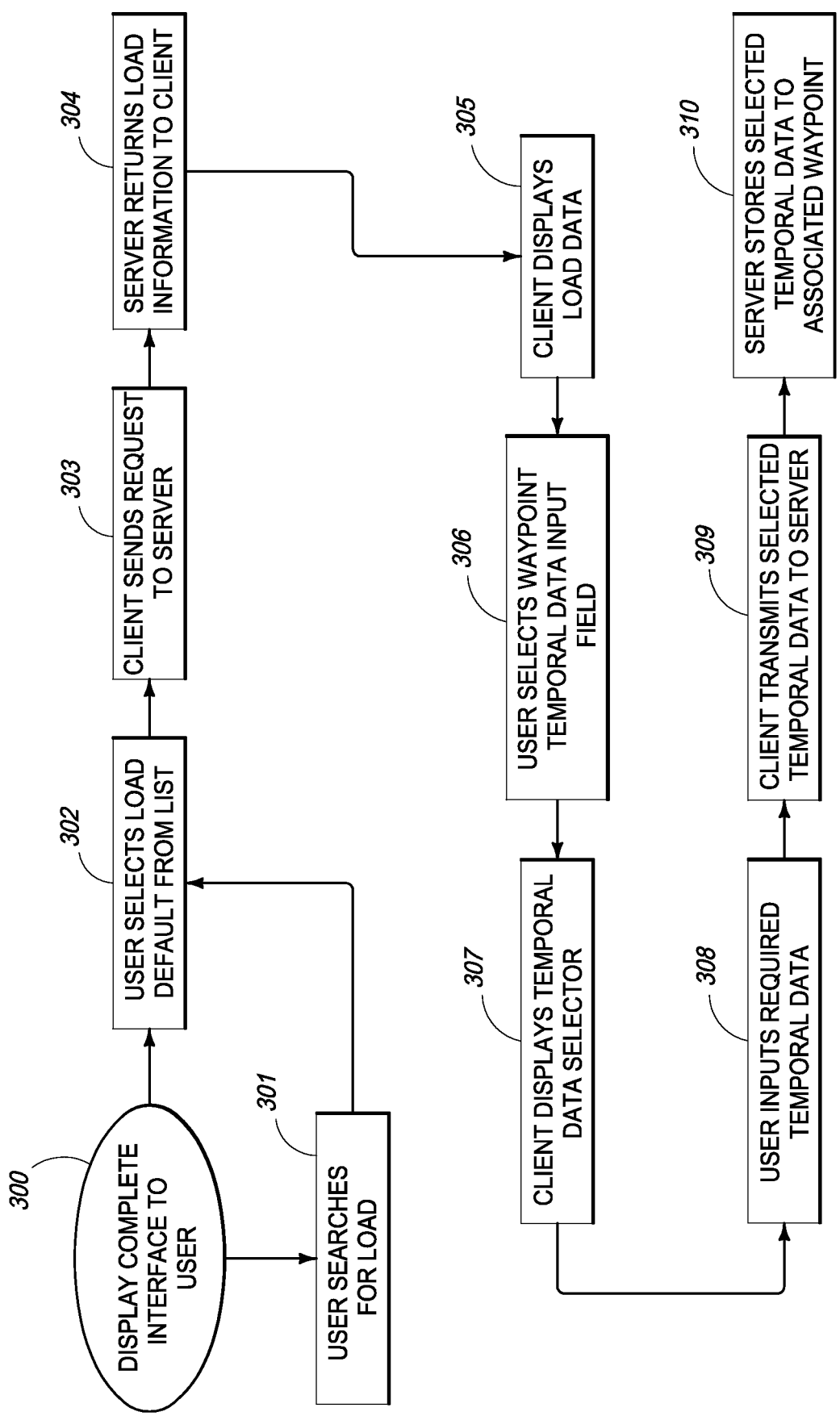
FIG. 3 illustrates a flowchart for displaying load data to users and clients and for selecting and transmitting temporal data requirements for shipping the load.

FIG. 3 illustrates a flowchart for displaying load data to users and clients and for selecting and transmitting temporal data requirements for shipping the load. With reference to FIG. 3, a flow of logic that is executed in various embodiments, when implementing the display of load data to users and clients and for selecting and transmitting temporal data requirements (date range and time range) is illustrated. The process can start at step 300. In step 300, a complete interface (with complete interface functionality) is displayed to a user at a specific client. After performing step 300, the process proceeds to either step 301 or step 302. In step 301, a user searches for a load, then proceeds to step 302. In step 302, a user selects a load default from a list. After performing step 302, the process proceeds to step 303 where a client sends a request to server 14 (of FIG. 1). After performing step 303, the process proceeds to step 304 where the server returns load information to the client. After performing step 304, the process proceeds to step 305 where the client displays the load data. After performing step 305, the process proceeds to step 306 where the user selects a waypoint temporal data input field (such as a range of dates and/or a range of times) for which a designated load is to be picked-up/delivered to a desired destination. After performing step 306, the process proceeds to step 307 where the client displays a user interface with a temporal data selector (a date range and/or a time range). After performing step 308, the process proceeds to step 308 where the user inputs required temporal data (date range and/or time range). After performing step 308, the process proceeds to step 309 where the client transmits the selected temporal data to the server 14 (of FIG. 1). After performing step 309, the process proceeds to step 310 where the server stores the selected temporal data to an associated waypoint (a coordinate or location on the freight delivery path).

As detailed in FIG. 3, temporal date/time range storage is provided for logistics purposes. For each "waypoint" in a freight delivery (begin, midpoint, end, etc.) on a load to be transported, there exist pick-up and drop-off dates and/or times. There exist five different options to fill the temporal field with data including: "Between"; "Before"; "After"; "At"; and "N/A" (not available). These dates and times are then parsed in different ways in order to distribute them to industry standard load boards, such as GetLoaded, Dat360, and Internet Truckstop. Such distribution is an optional feature.

As used herein, the terms "carrier rate", "carrier bid", and "carrier quote" are used interchangeably until a carrier is fully signed on for a load, after which the designation becomes "carrier-on-board".

Figure 4B:
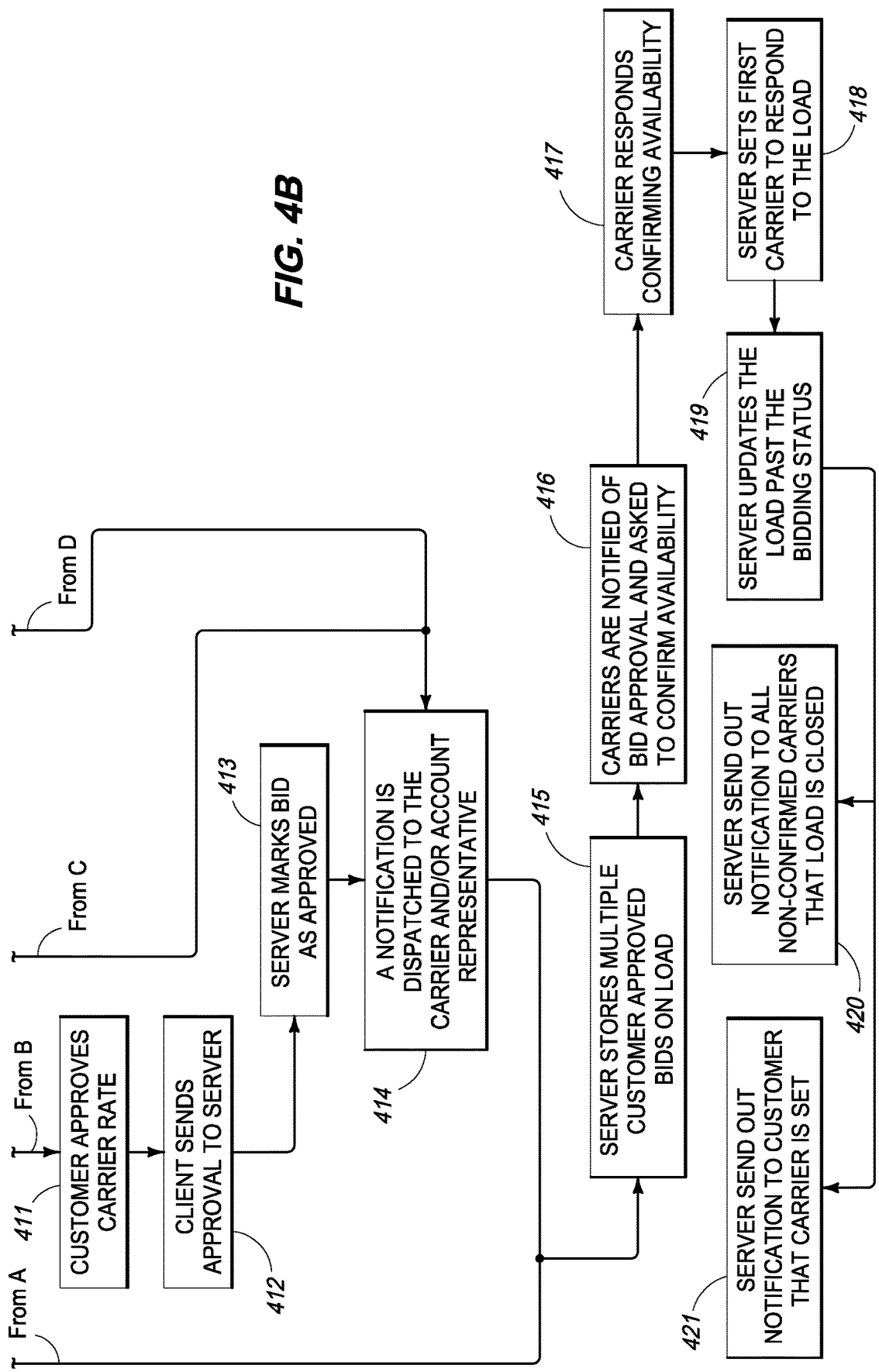

FIGS. 4A and 4B together illustrate a flowchart for a customer selecting carrier bids, approving carrier rates, accepting carrier bids, and storing multiple customer approved bids on a load. With reference to FIGS. 4A and 4B, a flow of logic that is executed in various embodiments, when implementing the display of load data to users and clients and for selecting and transmitting temporal data requirements (date range and time range) is illustrated. The process can start at step 400. After step 400, the process proceeds either to step 401 or step 402. In step 401, a customer searches for a load using a specific client. After performing step 401, the process proceeds to step 402 where a user selects a load default from a list of loads. After performing step 402, the process proceeds to step 403 where the client sends a request to the server 14 (of FIG. 1). After step 403, the process proceeds to step 404 where the server returns load information to the client. After step 404, the process proceeds to step 405 where the clients displays load data. After step 405, a query is made at step 406 as to whether a specific account type and load status is enabled to view bids. If not, the process proceeds to step 407 where a load is displayed without any bids. If enabled, the process proceeds to step 408 where all current carrier bids and/or quotes are displayed at a client (including multiple bids displayed concurrently). After performing step 408, the process proceeds to step 409 where a customer selects a carrier bid from a list of currently submitted bids. After performing step 409, the process proceeds to step 410 where a multi-variate query is made about four responses that can be taken after carrier bid information is displayed at a client. At step 410, a user is presented with four choices. A first choice is triggered by a user selecting an approved button (on a user interface of the client) that causes the process to proceed to step 411. A second choice is triggered by a user selecting a decline button (on a user interface of the client) that causes the process to proceed to step 422. A third choice is triggered by a user selecting an add note/comment via a text box and submitting it that causes the process to proceed to step 423. A fourth choice is triggered by a user selecting a click on name button (listing a static profile for a carrier) which proceeds to step 424. After performing step 424, the user then clicks on a back button to return the process back to step 410. In step 411, the customer approves the provided carrier rate. In step 422, a customer denies a carrier rate and the process proceeds to step 414. After a customer denies a rate at step 422, the system changes the status of the bid relative to the customer's interface. In step 423, a customer sends the carrier a message and the process proceeds to step 414. After step 411, the process proceeds to step 412 where the client sends approval to the server. After step 412, the process proceeds to step 413 where the server marks the bid as approved. After step 414, the process proceeds to step 414 where a notification is dispatched to the carrier and/or account representative. After step 414, the process either proceeds back to step 409 or forward to step 415. In step 415, the server stores multiple customer approved bids on a load. After step 415, the process proceeds to step 416 where individual carriers are notified of bid approval and asked to confirm their availability to deliver a specific load. After performing step 416, the process proceeds to step 417 where the carrier responds by confirming their availability (to the server). After step 417, the process proceeds to step 418 where the server sets the first carrier to respond to the load. After step 418, the process proceeds to step 419 where the server updates the load past the bidding status. After step 419, the process proceeds to step 420 where the server sends out notification to all non-conforming carriers that the specific load is closed (and not open for bid acceptance). More particularly, the term "closed" is applied to loads to denote that the load is delivered. After performing step 420, the process proceeds to step 421 where the server sends out notification to the customer that a carrier has been set (or assigned) to carry their particularly load. At this point, the process terminates.

As detailed in FIG. 4, a multiple quote and simultaneous approval process is disclosed. When a customer is logged in and look at quotes that have been submitted by various carriers, they are enabled with the ability to approve multiple carriers at the same time. Once this happens, an automated notification goes out to all carriers approved, requesting confirmation of their availability. The first carrier that logs into the website and provides an availability verification to complete the load in question is then changed to become the provider. The remaining carriers are then automatically notified that they were too slow to become the provider, and the load is no longer available.

FIG. 5 illustrates a screen shot of a web page for a simple request for a broker for posting loads and identifying shippers and receivers of a type that would be displayed on the screen of one of the computers connected for communication with the processing circuitry of the server for the system of FIG. 1. More particularly, a cursor 501 is positioned over "Set Date & Time" field 502 which provides a selectable navigation link that opens up a temporal range pop-up window 601 depicted in FIG. 6, below.

Figure 6:
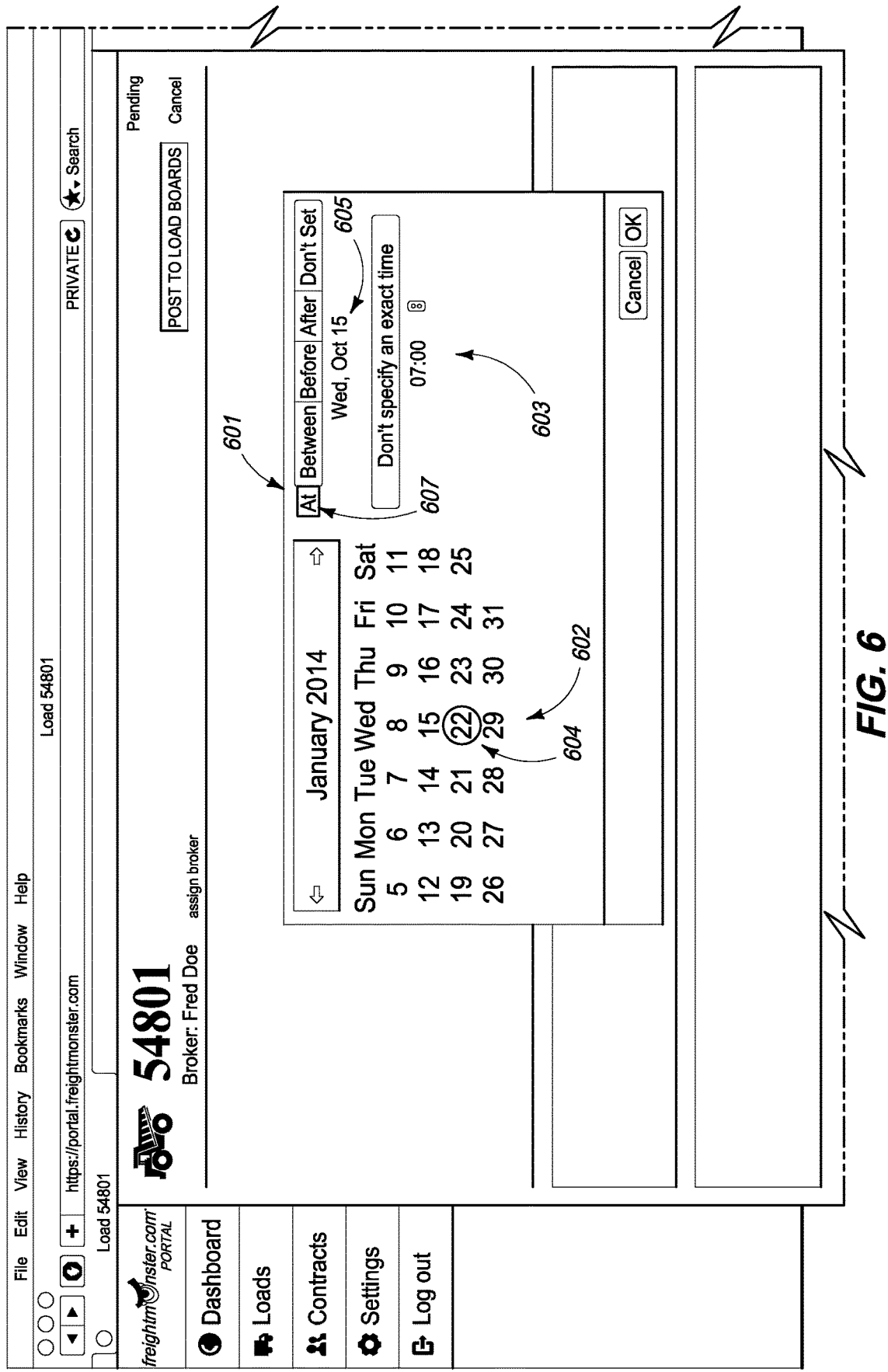
FIG. 6 illustrates a screen shot of a web page for a date/time/selection menu that pops up when a user selects a "Date & Time" field in one of the shipper and received fields of FIG. 5.

FIG. 6 illustrates a screen shot of a web page for a date/time/selection menu that pops up when a user selects a "Set Date & Time" field 502 in one of the shipper and received fields of FIG. 5. More particularly, pop-up menu 601 includes a temporal date range selection menu item 602 and a corresponding temporal time range selection menu 603 via which a user can select a temporal range (time and/or date) using a single click/drag of a mouse and cursor over the calendar displayed in selection menu 602. A temporal date range is shown as selection field 606. A selectable date identifier "At" 607 is selected in menu 601 corresponding with a single selected date shown in a date field 605 shown directly below. Another date indicated by menu item 604 representing Jan. 22, 2104 shows the current date via a round circle, whereas the "At" selected date will show up on the calendar via a rectangular surround feature corresponding with the date shown in date field 605. Other date identifiers of menu 601 for selecting a date, or date range that are selectable include, "Between", "Before", "After", and "Don't Set".

Figure 7:
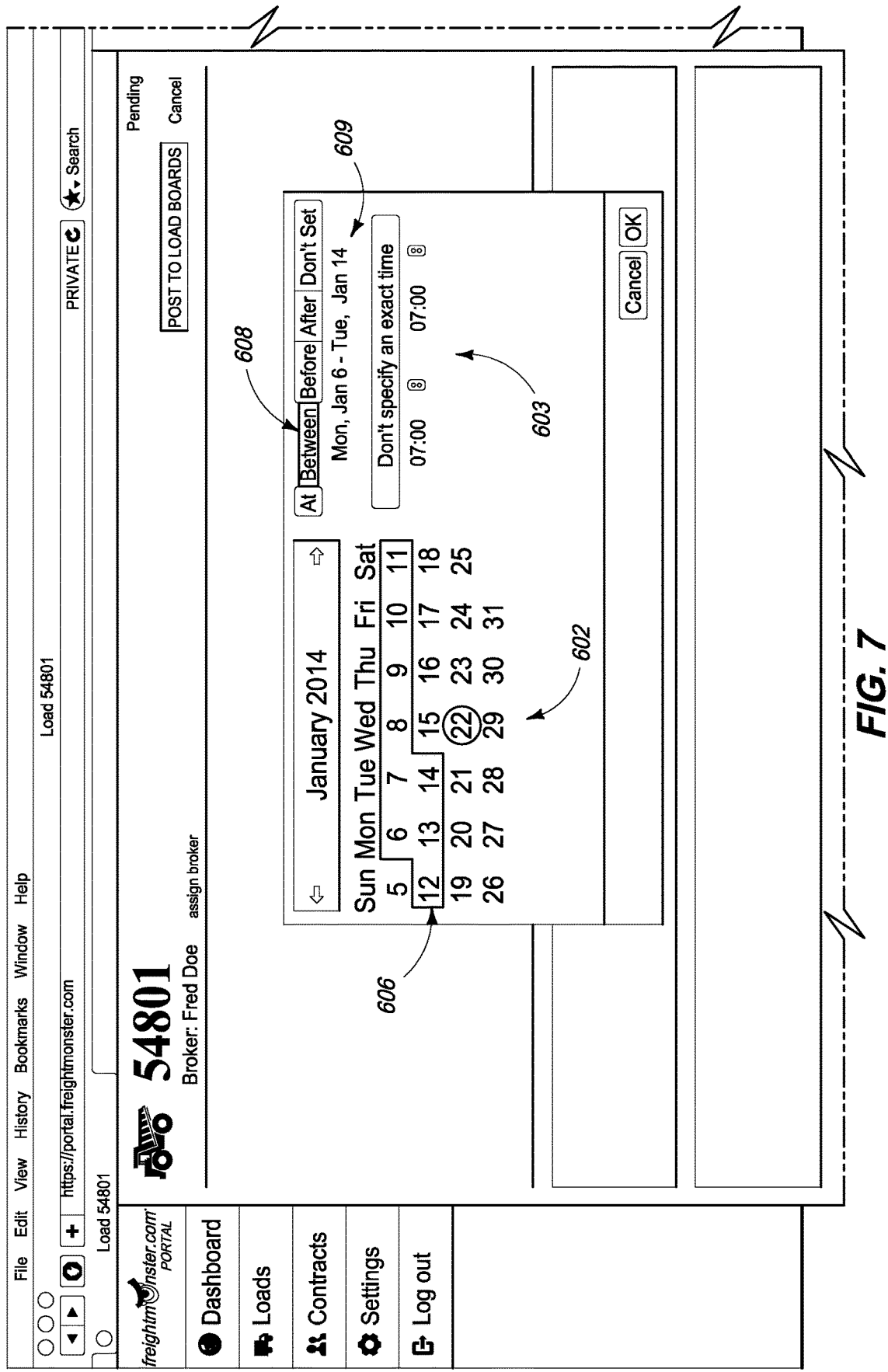
FIG. 7 illustrates a screen shot of a web page showing a user "mousing over" a selected date range field prior to selecting a time range.

FIG. 7 illustrates a screen shot of a web page showing a user "mousing-over" and selecting date range field 606 (with a cursor) of temporal date range selection menu 602 separate from selecting a time range 609 via a "between" time field selection 608 of a temporal date range selection menu 602. Furthermore, a temporal time range selection menu 603 is also provided for selecting and inputting dates for respective date ranges.

Figure 8:
FIG. 8 illustrates a screen shot of a web page showing a selected temporal range achieved in FIG. 7.

FIG. 8 illustrates a screen shot of a web page showing a selected temporal range achieved in FIG. 7. More particularly, a cursor 801 is positioned over a selectable navigation date range link 802 that opens up the temporal range pop-up window 601 depicted in FIG. 7, above.

Figure 9:
FIG. 9 illustrates a screen shot of a web page showing selection of a receiver "Set Date & Time" field.

FIG. 9 illustrates a screen shot of a web page showing selection of a receiver "Set Date & Time" field 902 by "mousing-over" a cursor 901 and selecting field 902. More particularly, cursor p01 is positioned over "Set Date & Time" 902 which provides a selectable navigation link that opens up a temporal range pop-up window 601 depicted in FIG. 10, below.

Figure 10:
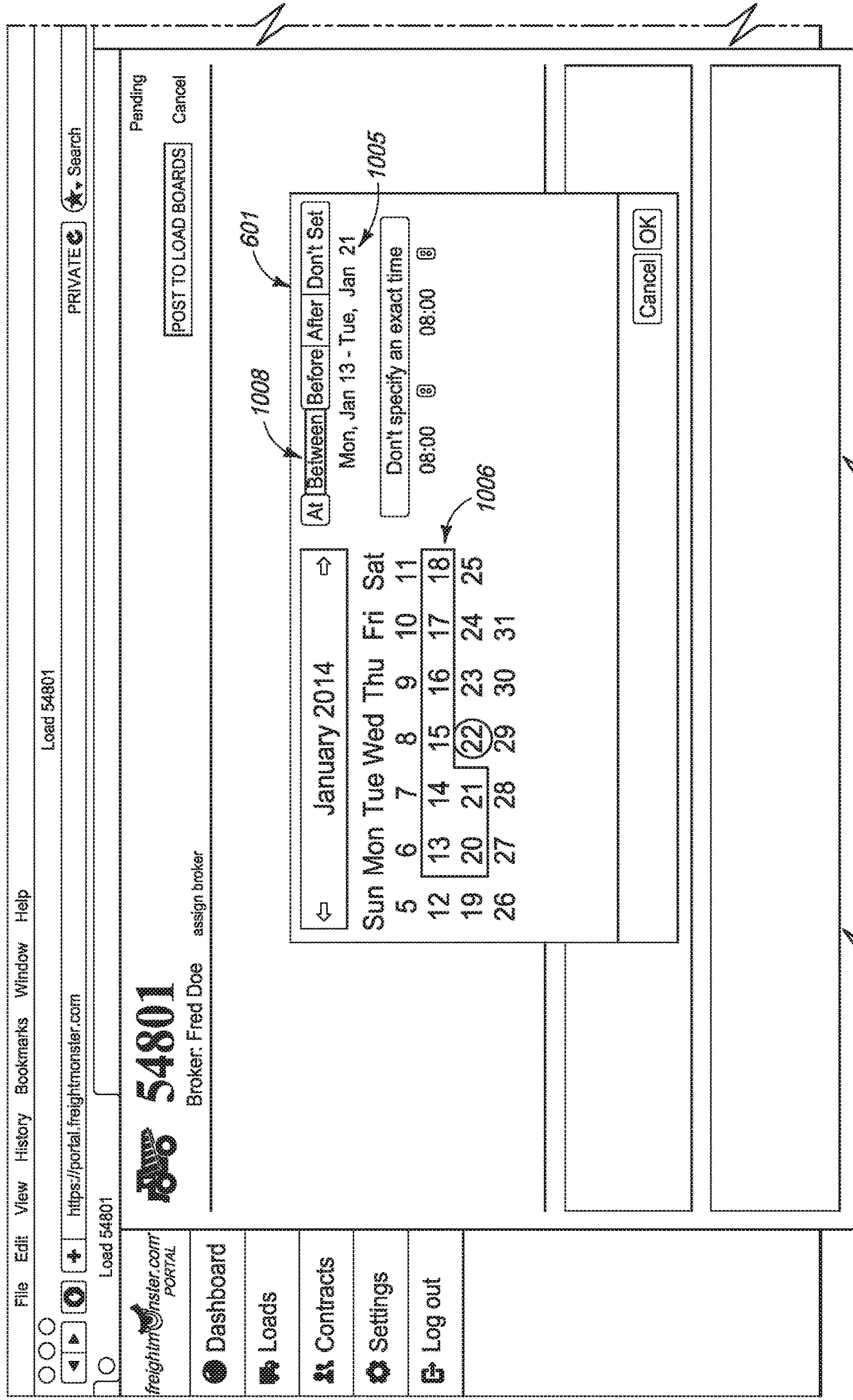
FIG. 10 illustrates a screen shot of a web page showing a selected temporal range for the pop-up menu of FIG. 6.

FIG. 10 illustrates a screen shot of a web page showing a selected temporal range for the pop-up menu of FIG. 6 that pops up when a user selects a "Set Date & Time" field 902 in the receiver field of FIG. 9. More particularly, pop-up menu 601 includes a temporal date range selection menu item 602 and a corresponding temporal time range selection menu 603 via which a user can select a temporal range (time and/or date) using a single click/drag of a mouse and cursor over the calendar displayed in selection menu 602. A temporal date range is shown by selection field 1006. A date identifier "Between" 1008 is selected in menu 601 corresponding with a range of dates shown in a date field 1005 shown directly adjacent. Another date indicated representing Jan. 22, 2014 shows the current date via a round circle. Other date identifiers of menu 601 for selecting a date, or date range that are selectable include, "At", "Before", "After", and "Don't Set".

Figure 11:
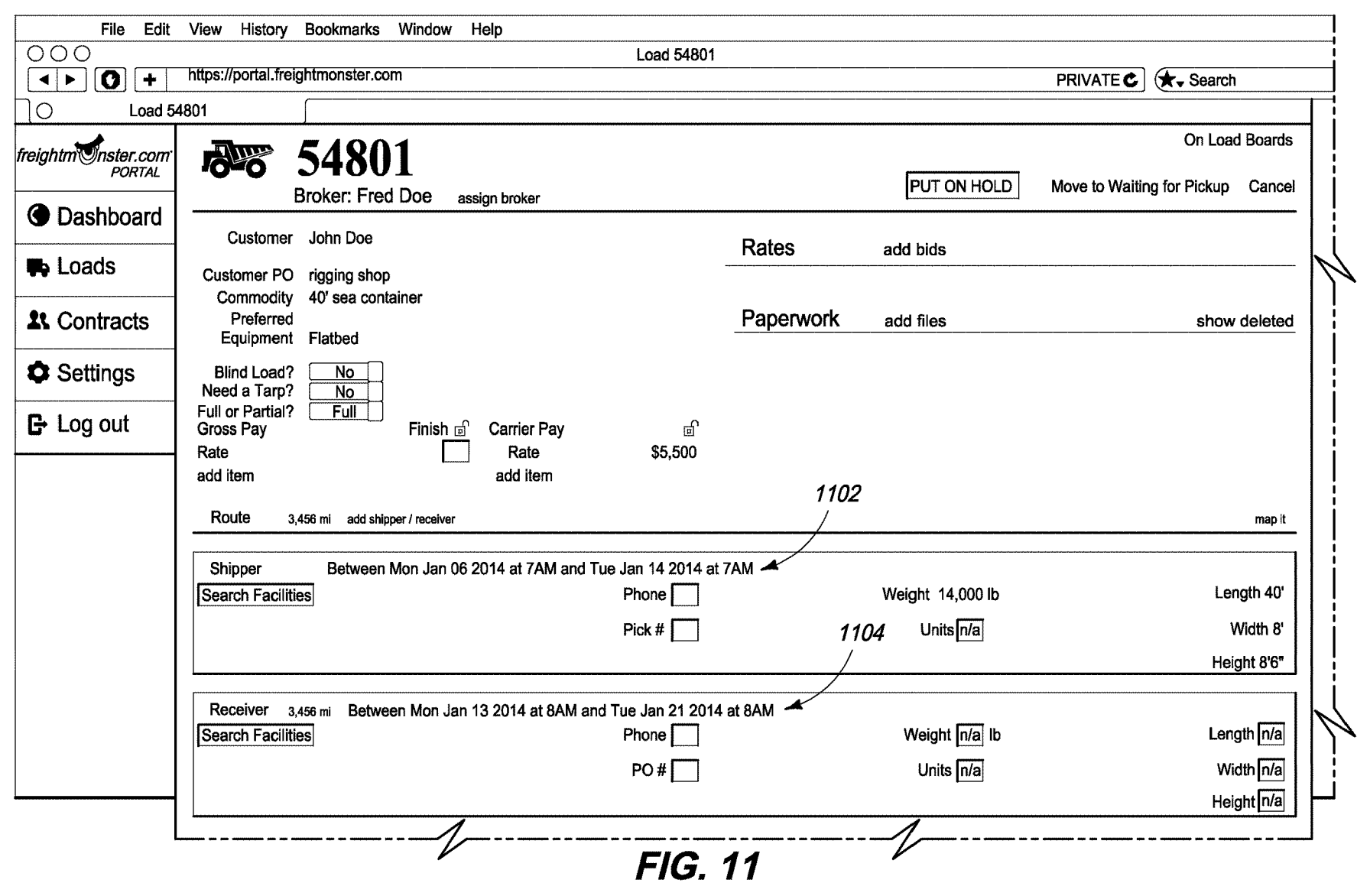

FIG. 11 illustrates a screen shot of a web page for realizing the temporal range selected in FIG. 10. More particularly, a temporal date and time range 1102 and 1104 is provided for the shipper and the receiver, respectively.

Figure 12:
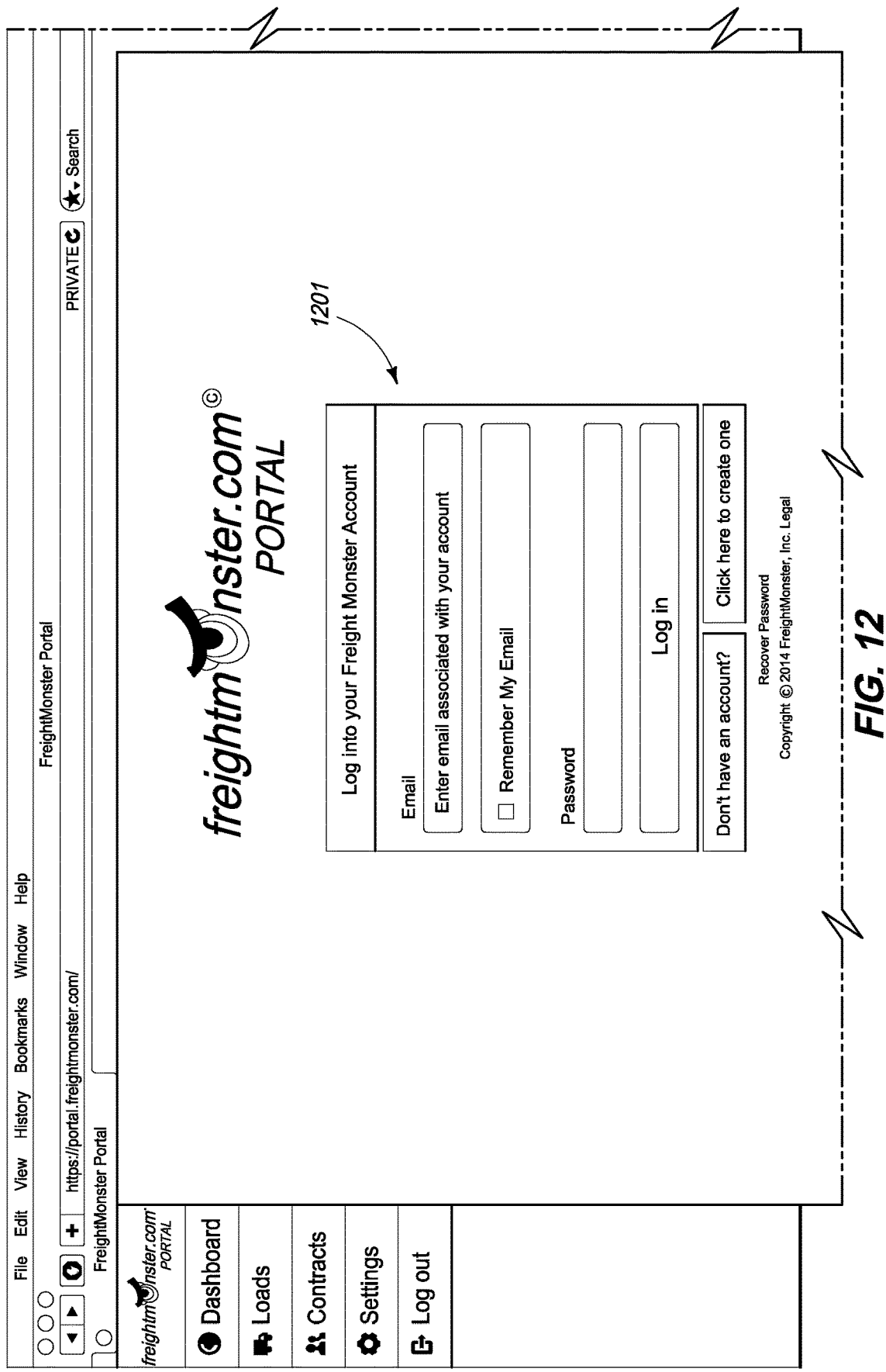
FIG. 12 illustrates a screen shot of a user login page.

FIG. 12 illustrates a screen shot of a user login page having a login menu 1201 for receiving user login information including email adrees, and password information that enables permissioned login to features of the website portal described variously in FIGS. 1-52.

Figure 13:
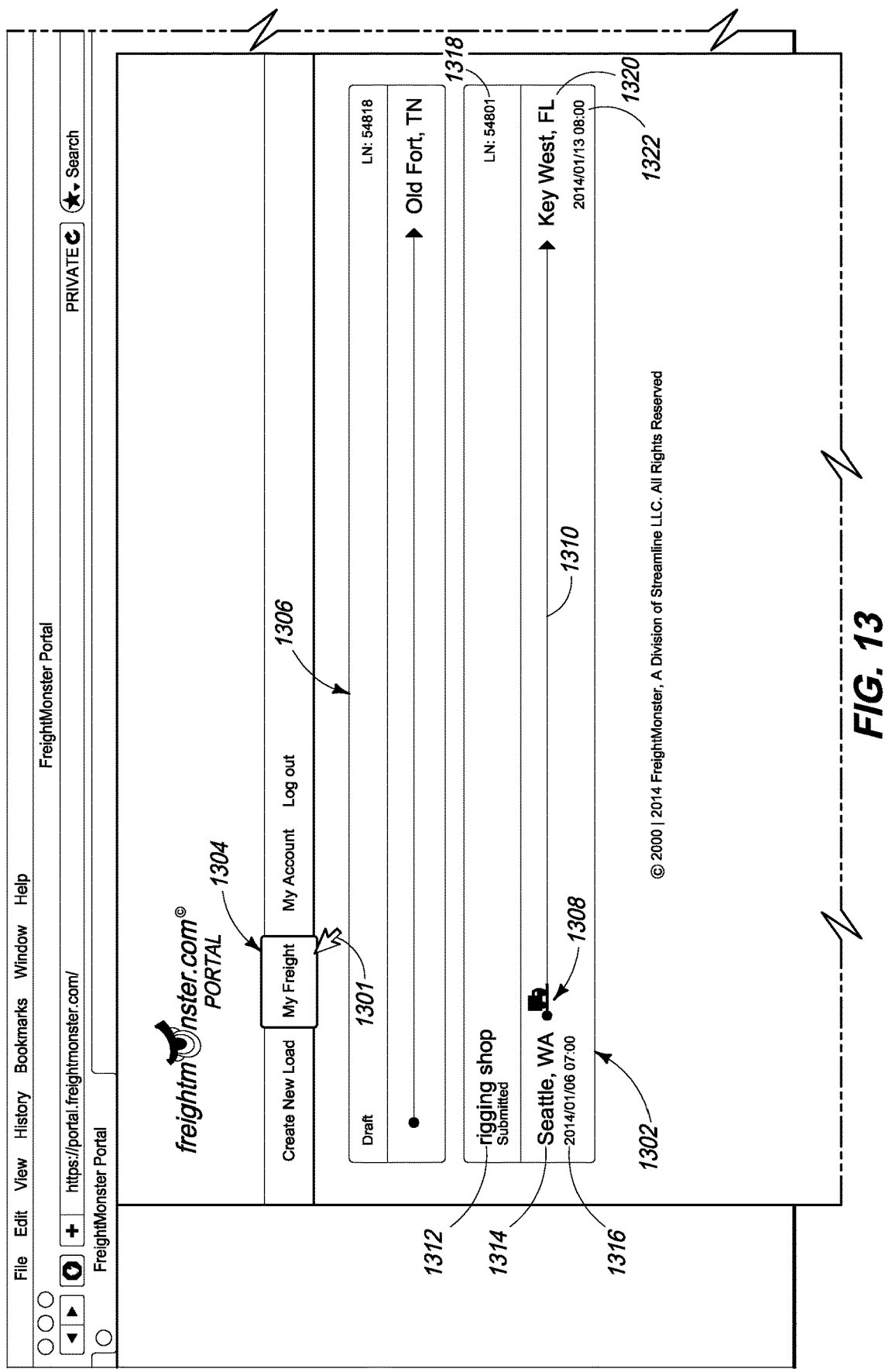
FIG. 13 illustrates a screen shot of a customer dashboard.

FIG. 13 illustrates a screen shot of a customer dashboard illustrating a customer's specific freight requests, or loads that a particular customer has pending. Loads are shown in various stages in any scenario. One exemplary shown freight request for shipping a freight load from Seattle, Wash. to Key West, Fla. is shown in field 1302 when a "My Freight" menu item 1304 is selected with a mouse (or input device) via cursor 1301. A draft load request 1306 is shown for a load that the customer is still working on, but is not yet fully filled in and submitted. In contrast, field 1302 shows a customer name 1312, an in-house tracking number 1318 for identifying a load, an originating location identifier 1314 with a preferred date of pickup identifier 1316, and a destination location identifier 1320 with a preferred date of drop-off identifier 1322. Furthermore, field 1302 includes a truck icon 1308 that traverses along a line 1310 from start location identifier 1314 at one end to finish location identifier 1320 at an opposite end. Position of truck icon 1308 is provide along line 1310 at a location corresponding with the distance presently travelled by the carrier with the cargo, as determined by GPS monitoring of the actual carrier (and cargo). In this way, a user of the system can monitor status (relative position) of the cargo and carrier relative to the total distance being traveled between the start location and the finish location during the delivery.

Figure 14:
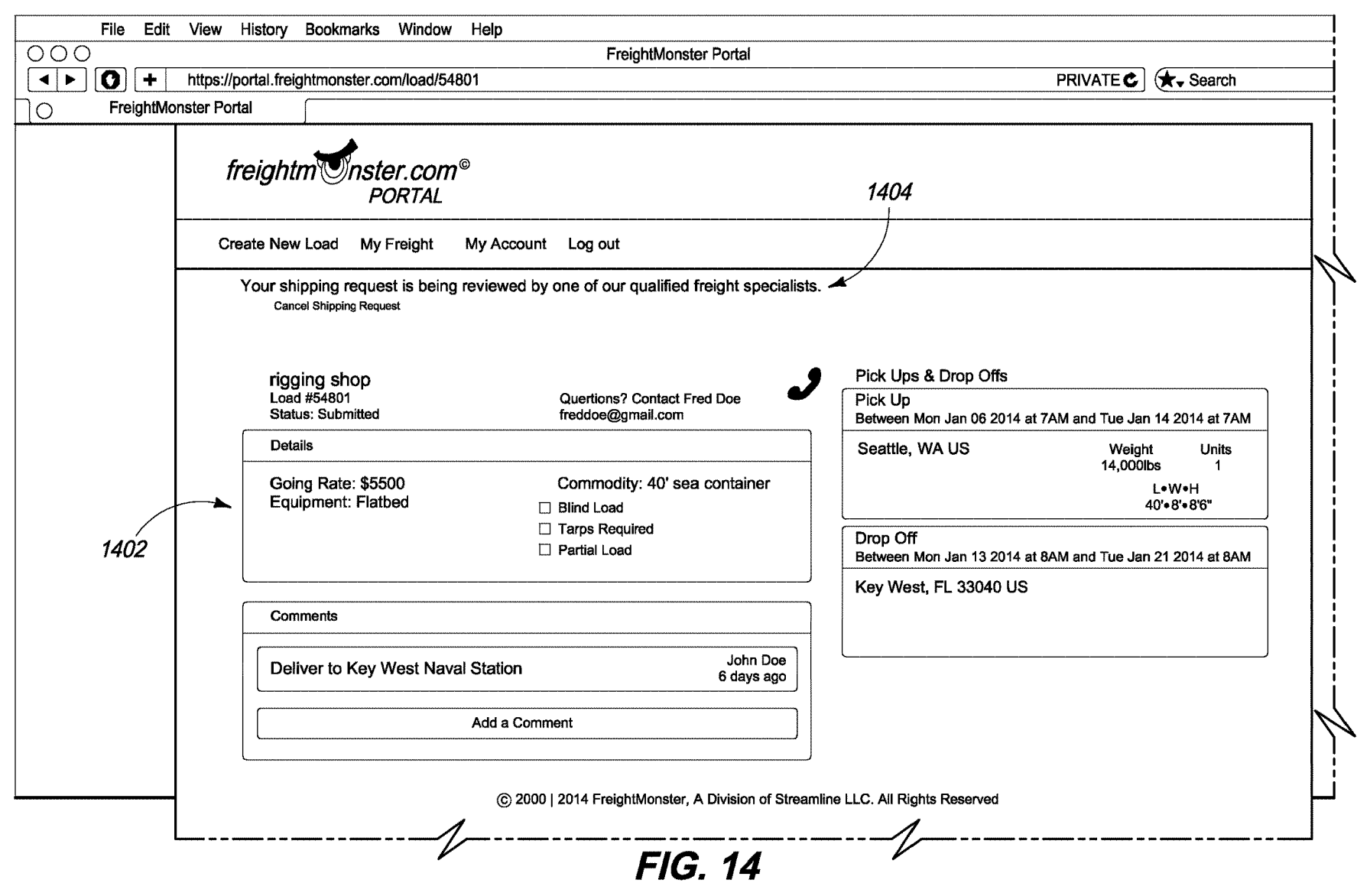

FIG. 14 illustrates a screen shot showing customer load details in a detail menu 1402 including status of a load submitted and pending, as well as status of carrier approval. A status indicator field 1404 shows the status of a shipping request under review.

Figure 15:
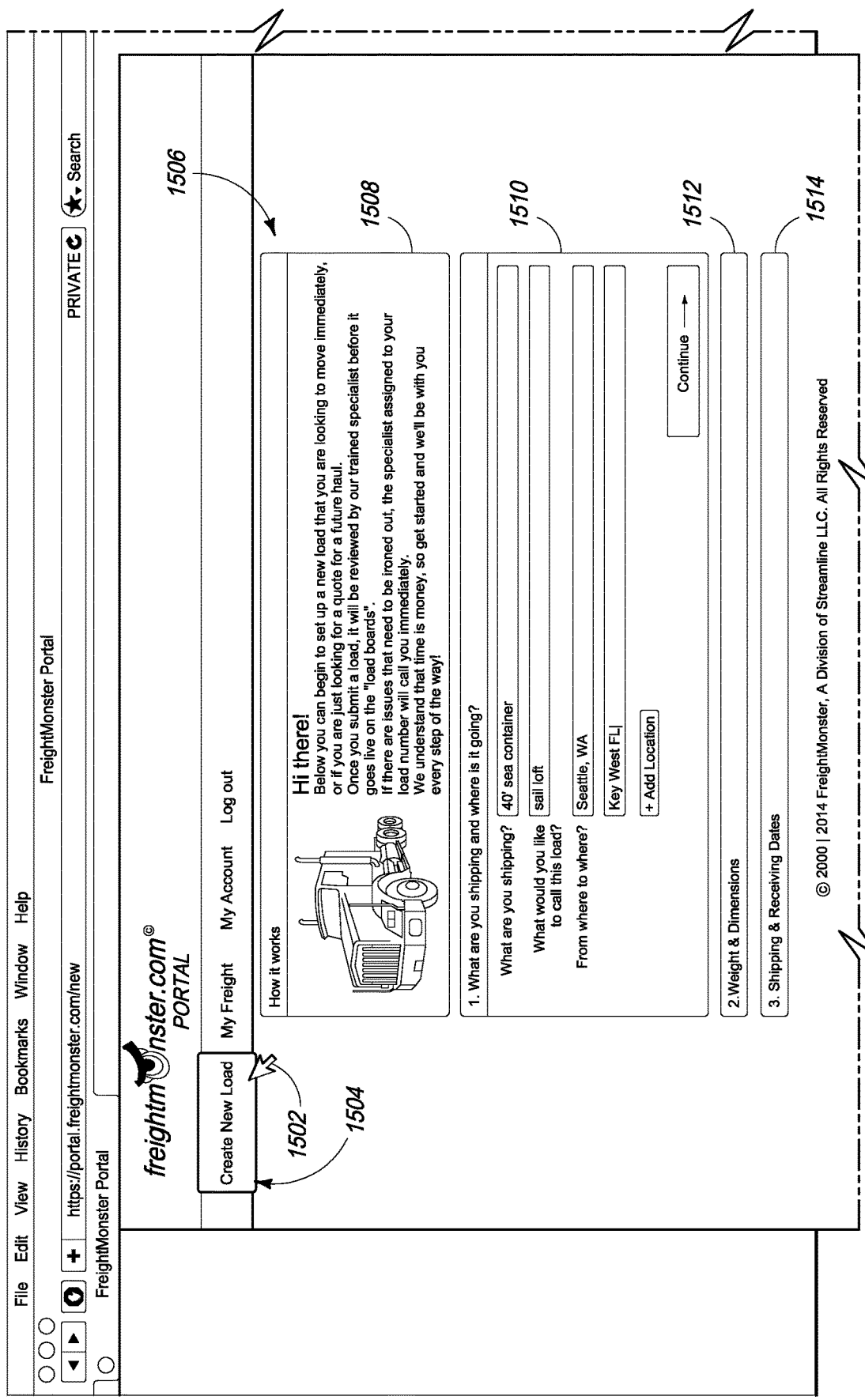
FIG. 15 illustrates a screen shot showing a customer new load.

FIG. 15 illustrates a screen shot showing a customer new load data entry input menu 1506 obtained by selecting a "Create New Load" identifier 1504 with a mouse cursor 1502. Menu 1506 includes an explanation, or "How it works" explanation field 1508, a "What are you shipping and where is it going?" field 1510, a "Weight & Dimensions" field 1512, and a "Shipping & Receiving Dates" field 1514.

Figure 16:
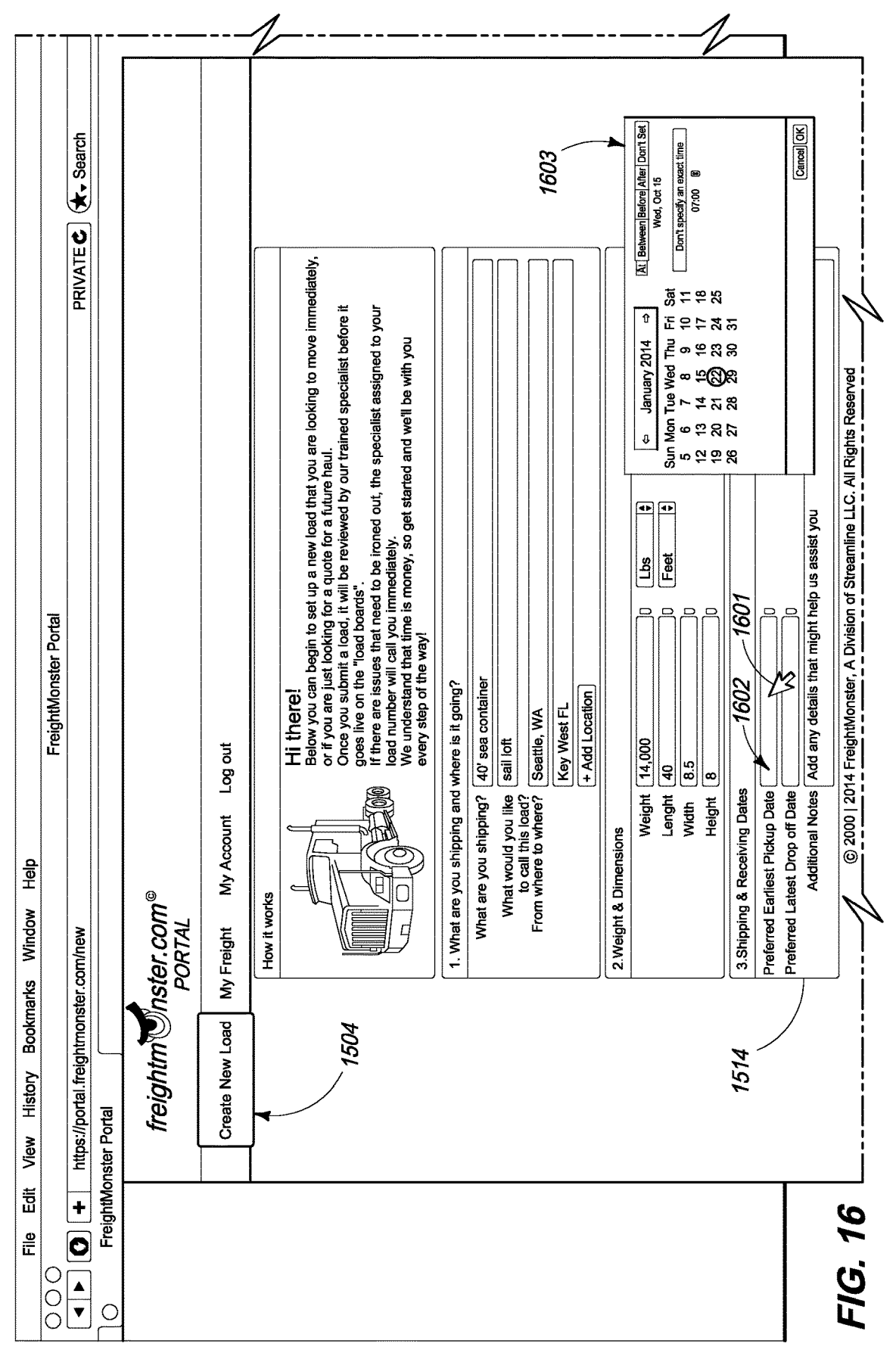

FIG. 16 illustrates load details including a newly created load realized by accessing "Create New Load" field 1504 with a temporal range pop-up menu 1603. Menu 1603 is generated by selecting "Preferred Earliest Pickup Date" field 1602 within field 1514 using a mouse cursor 1601.

Figure 17:
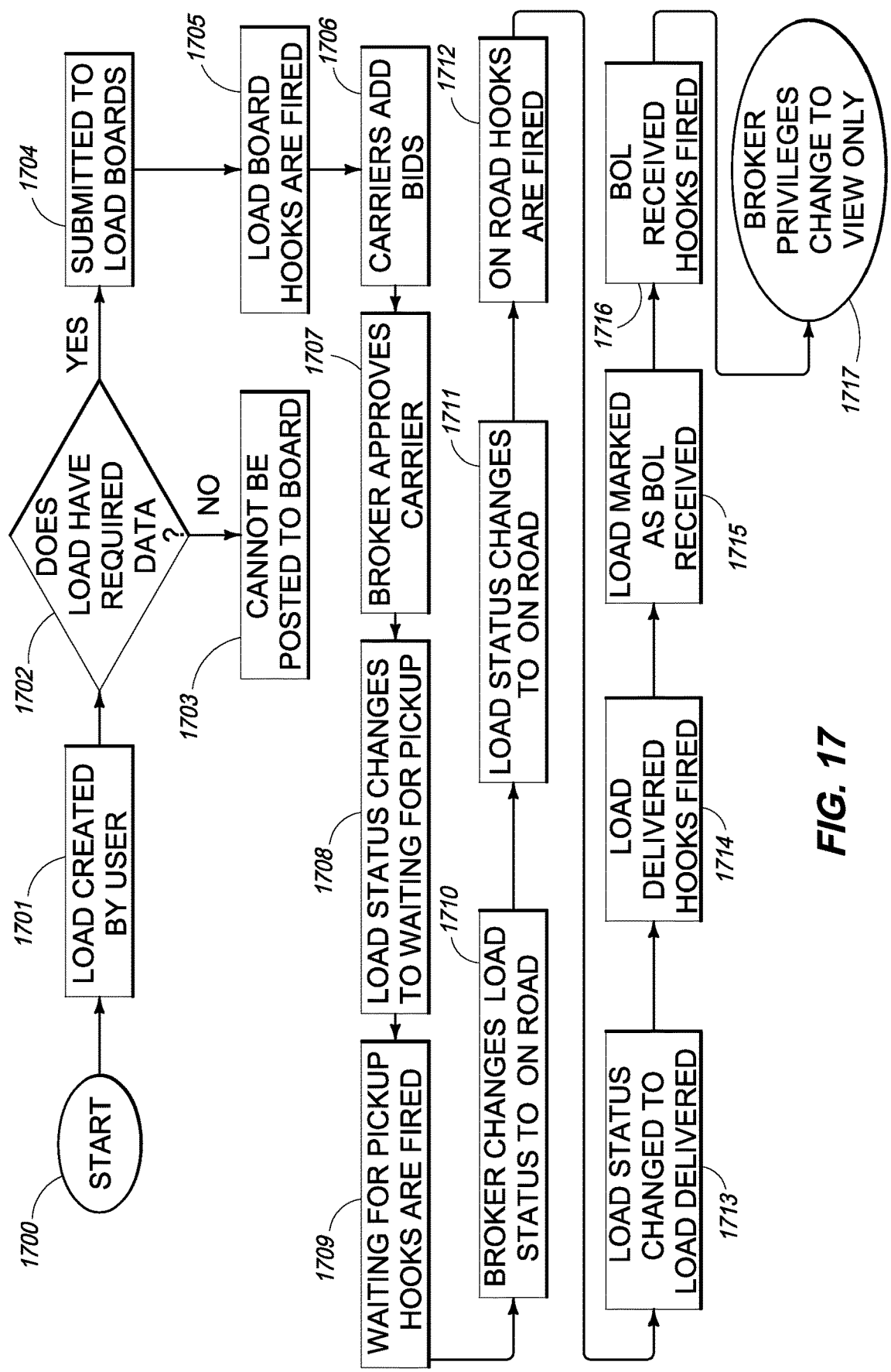
FIG. 17 illustrates a flowchart depicting account manager load interaction flow and privileges in accordance with an exemplary embodiment.

FIG. 17 illustrates a flowchart for depicting account manager load interaction flow and privileges in accordance with an exemplary embodiment. With reference to FIG. 17, a flow of logic that is executed in various embodiments, when implementing the creation and submission of load data is illustrated. The process can start at step 1700. After step 1700, the process proceeds to step 1701 where a load is created by a user. After performing step 1701, the process proceeds to step 1702 where a query is made as to whether the created load has required data (for submission to the load boards). If so, the process proceeds to step 1704. If not, the process proceeds to step 1703. After step 1703, the process terminates. In step 1703, the load does not have required data and cannot be posted to the board(s). In step 1705, the load board hooks are fired. After step 1706, carriers add bids to the load on the load board. After performing step 1706, the process proceeds to step 1707 where a broker approves a carrier (from those that have added a bid to the load). After performing step 1707, the process proceeds to step 1708 where the load status changes to "waiting for pickup". After performing step 1708, the process proceeds to step 1709 where "waiting for pickup" hooks are fired that trigger a series of system events that are mandatory for that status of the load and operation of the system. After performing step 1709, the process proceeds to step 1710 where a broker changes load status to "on road". After performing step 1710, the process proceeds to step 1711 where the load status on the system actually changes to "on road". After performing step 1711, the process proceeds to step 1712 where "on road" hooks are fired. After performing step 1712, the process proceeds to step 1713 where the load status changed to "load delivered". After performing step 1713, the process proceeds to step 1714 where "load delivered" hooks are fired. After performing step 1714, the load is marked "BOL received". After performing step 1715, the process proceeds to step 1716 where "BOL received" hooks are fired. After performing step 1716, the process proceeds to step 1717 where broker privileges are changed to "view only" status. After step 1717, the process is terminated.

As detailed in FIG. 17, the disclosed system provides for account management and accountability for brokers. First, account representatives (or brokers) cannot modify a load after it has been delivered. Secondly, all management of load after delivery is shifted to other departments. For example, after the shift (or lock-out), an exemplary account representative will only be enabled with the ability to view load and account information. Thirdly, only the accounting department can close a load after it has been delivered. Finally, only an administrator can modify the load outside of the normal flow process. A normal flow process for a brokered process proceeds sequentially, as follows: created→submitted to boards→carriers add bids→broker approves carrier-→load on road→load delivered→BOL (Bill of Lading) received→load closed (after billing). A normal flow process for a dispatched customer's flow process proceeds sequentially, as follows: draft→submitted to rep→submitted to boards→carriers add bids→customer approves bids→carrier signifies availability→load on road→load delivered-→BOL received→load closed (after billing).

Figure 18B:
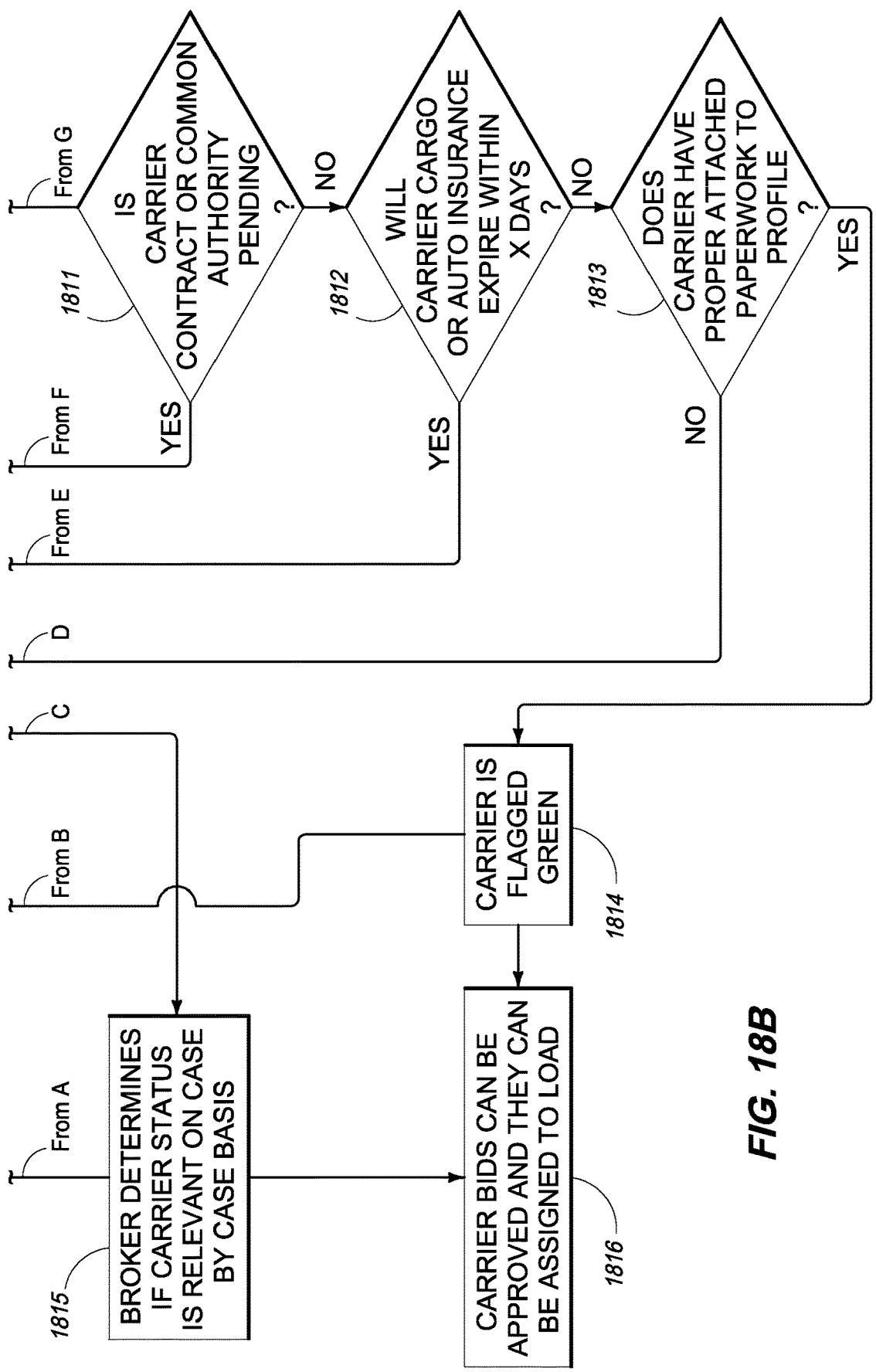

FIGS. 18A and 18B together illustrate a flowchart depicting a system for rating carriers having checks and balances in accordance with an exemplary embodiment. With reference to FIGS. 4A and 4B, a flow of logic that is executed in various embodiments, when implementing a system of checks and balances in the process of rating carriers is illustrated. The process can start at step 1800. In step 1800, carrier data is modified from user input or external data. After performing step 1800, the process proceeds to step 1802. In step 1801, the process can start when a user selects a black flag under a carrier profile. After performing step 1801, the process proceeds to step 1802. In step 1802, a carrier status update starts. After performing step 1802, the process proceeds to step 1803 where a query is implemented to determine whether a carrier has common or contract authority. If the carrier does have authority, then the process proceeds to step 1804. If not, the process proceeds to step 1805. In step 1804, a query is implemented to determine if the carrier has cargo and auto insurance. If the carrier does have the insurance, the process proceeds to step 1807. If not, the process proceeds to step 1805. In step 1807, a query is implemented to determine if the carrier is flagged "black". If the carrier has been flagged "black", the process proceeds to step 1805. If not, the process proceeds to step 1808. In step 1805, the carrier is flagged "red". In step 1808, a query is implemented to determine if a carrier's insurance has been internally flagged as a high risk. If so, the process proceeds to step 1809. If not, the process proceeds to step 1811. After performing step 1805, the process proceeds to step 1806 where carrier bids can be added, but not approved for any load. After performing step 1808, the process proceeds to step 1809 where a carrier is flagged "yellow". After performing step 1809, the process proceeds to step 1810 where a carriers updated data and status are saved to a database. In step 1811, a query is implemented to determine if a carrier contract or common authority is pending. If so, the process proceeds to step 1809. If not, the process proceeds to step 1812. In step 1812, a query is implemented to determine if carrier cargo or auto insurance will expire within "X" days (X being a determined or set number of days, such as 30 days). If so, the process proceeds to step 1809. If not, the process proceeds to step 1813. In step 1813, a query is implemented to determine if a carrier has proper attached paperwork to their profile. If so, the process proceeds to step 1814. If not, the process proceeds to step 1809. In step 1814, a carrier is flagged "green". After performing step 1814, the process proceeds to step 1816 and to step 1810. In step 1816, the carrier bids can be approved and they can be assigned to the load. After performing step 1816, the process terminates. In step 1815, a broker determines if carrier status is relevant on a case-by-case basis. After performing step 1815, the process proceeds to step 1806 and step 1816.

As detailed in FIG. 18, the disclosed system provides for carrier compliance including an inter-office black list. Carriers are color coded for usability: namely, green (safe/insured), yellow (elevated risk/close to losing insurance), and red (risky/lost insurance). Notifications are provided if a particular carrier loses their insurance on a load (this data is pulled from both third-party systems and applicant's own internal management system). Such notifications are shown by item 2002 (of FIG. 20) and items 2110 and 2112 (of FIG. 21). Current logic for color coding is as follows: red is the worse case indicating no insurance; yellow is between red and green and indicates that insurance is soon at risk of loss; and green indicates insurance is in place and the carrier does not present a know risk. In addition, or optionally, black can be used to indicate that a carrier has been internally black-flagged, and should not be considered for any deliveries. If insurance is flagged due to an imminent lapse, a yellow designation is applied. If the carrier has neither common or contract authority, then a yellow designation is used. If no cargo or auto insurance is in place, a red designation is used. If cargo or auto insurance is going to expire in less than 30 days, then a yellow designation is used. All other cases will be provided with a green designation. Other suitable criteria for setting a risk-based color designation on a carrier include using information as to whether they have a W-9/EIN on file with applicant, as well as whether there is an existing contract in place with the carrier.

Figure 19B:
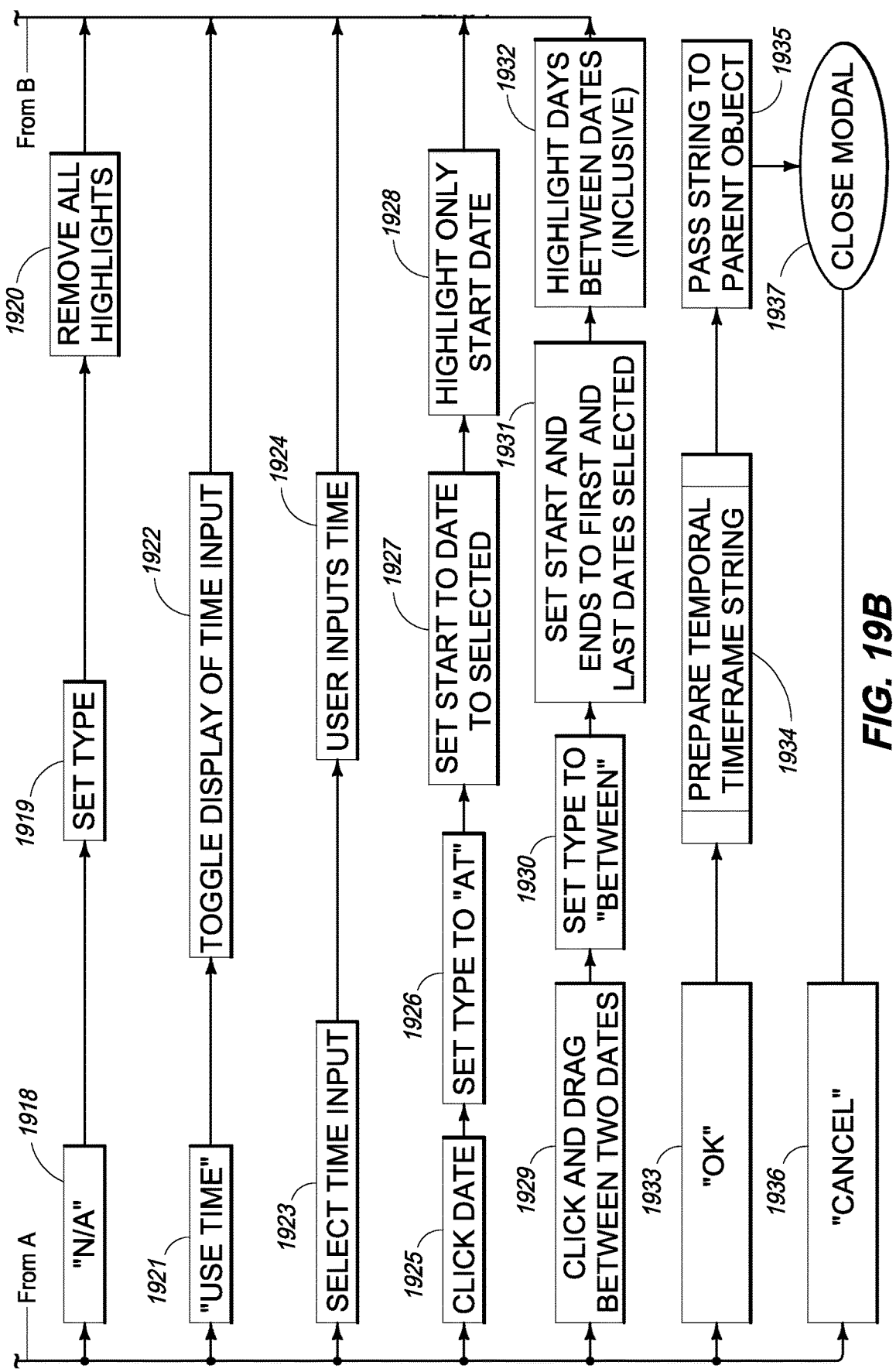

FIGS. 19A and 19B together illustrate a flowchart depicting logic behind selection of a temporal range in accordance with an exemplary embodiment. The process can start at step

1900. In step 1900, a user opens a temporal modal. After step 1900, the process proceeds to step 1901 where a user provides input from a mouse (or input device) at a client. From step 1901, a user proceeds to one of steps 1902, 1906, 1910, 1914, 1918, 1921, 1923, 1925, 1929, 1933, and 1936. In step 1902, the user selects "BETWEEN". After step 1902, the process proceeds to step 1903 where the selected type is set. After step 1903, a query is made at step 1904 to determine if the dates are set. If the dates are set, the process proceeds to step 1905 where days between the set (or selected) dates are highlighted (inclusive). After step 1905, the process proceeds to step 1901. If the dates are not set, the process proceeds to step 1901. In step 1906, the user selects "BEFORE". After step 1906, the process proceeds to step 1907 where the selected type is set. After step 1907, a query is made at step 1908 to determine if the dates are set. If the dates are set, the process proceeds to step 1909 where days before the set (or selected) end date are highlighted (inclusive). After step 1909, the process proceeds to step 1901. If the dates are not set, the process proceeds to step 1901. In step 1910, the user selects "AFTER". After step 1910, the process proceeds to step 1911 where the selected type is set. After step 1911, a query is made at step 1912 to determine if the dates are set. If the dates are set, the process proceeds to step 1913 where days after the set (or selected) start date are highlighted (inclusive). After step 1913, the process proceeds to step 1901. If the dates are not set, the process proceeds to step 1901.

In step 1914, the user selects "AT". After step 1914, the process proceeds to step 1915 where the selected type is set. After step 1915, a query is made at step 1916 to determine if the dates are set. If the dates are set, the process proceeds to step 1917 where only the start date is highlighted (inclusive). After step 1917, the process proceeds to step 1901. If the dates are not set, the process proceeds to step 1901.

In step 1918, the user selects "N/A" (not available). After step 1918, the process proceeds to step 1919 where the selected type is set. After step 1919, the process proceeds to step 1920 where all highlights are removed. After step 1920, the process proceeds to step 1901.

In step 1921, the user selects "USE TIME". After step 1921, the process proceeds to step 1922 where the display of time input is toggled. After step 1922, the process proceeds to step 1901.

In step 1923, the user selects a time input. After step 1923, the process proceeds to step 1924 where the user inputs time. After step 1924, the process proceeds to step 1901.

In step 1925, the user selects or clicks on a date. After step 1925, the process proceeds to step 1926 where type is set to "AT". After step 1926, the process proceeds to step 1927 where start is set to the date selected. After step 1927, the process proceeds to step 1928 where only the start date is highlighted. After step 1928, the process proceeds to step 1901.

In step 1929, the user clicks and drags between two dates. After step 1929, the process proceeds to step 1930 where the type is set to "BETWEEN". After step 1930, the process proceeds to step 1931 where a user sets start and end to first and last dates selected. After step 1931, the process proceeds to step 1932 where days between selected dates are highlighted. After step 1932, the process proceeds to step 1901.

In step 1933, the user selects "OK". After step 1933, the process proceeds to step 1934 where a temporal timeframe string is prepared. After step 1934, the process proceeds to step 1935 where the timeframe string is passed to a parent object. After step 1935, the process proceeds to step 1937 where the modal is closed.

In step 1936, the user selects "CANCEL". After step 1936, the process proceeds to step 1937 where the modal is closed.

FIG. 20 illustrates a screen shot for a carrier profile for "FDC Enterprises LLC" to access through one or more interfaces the features and functionality of FIG. 1 in accordance with an exemplary embodiment. More particularly, the carrier profile of FIG. 20 shows an insurance "Grade" field 2004 with a corresponding rating value of "B-" in field 206.

FIG. 21 illustrates an account manager/broker screen shot for a broker designated in field 2102 and depicting a load profile with quotes attached to a load with carrier ratings. More particularly, a "Rates" field 2104 identifies individual shippers "XYZ Trucking" and "EFD Trucking" via respective open quote fields 2106 and 2108.

Figure 22:
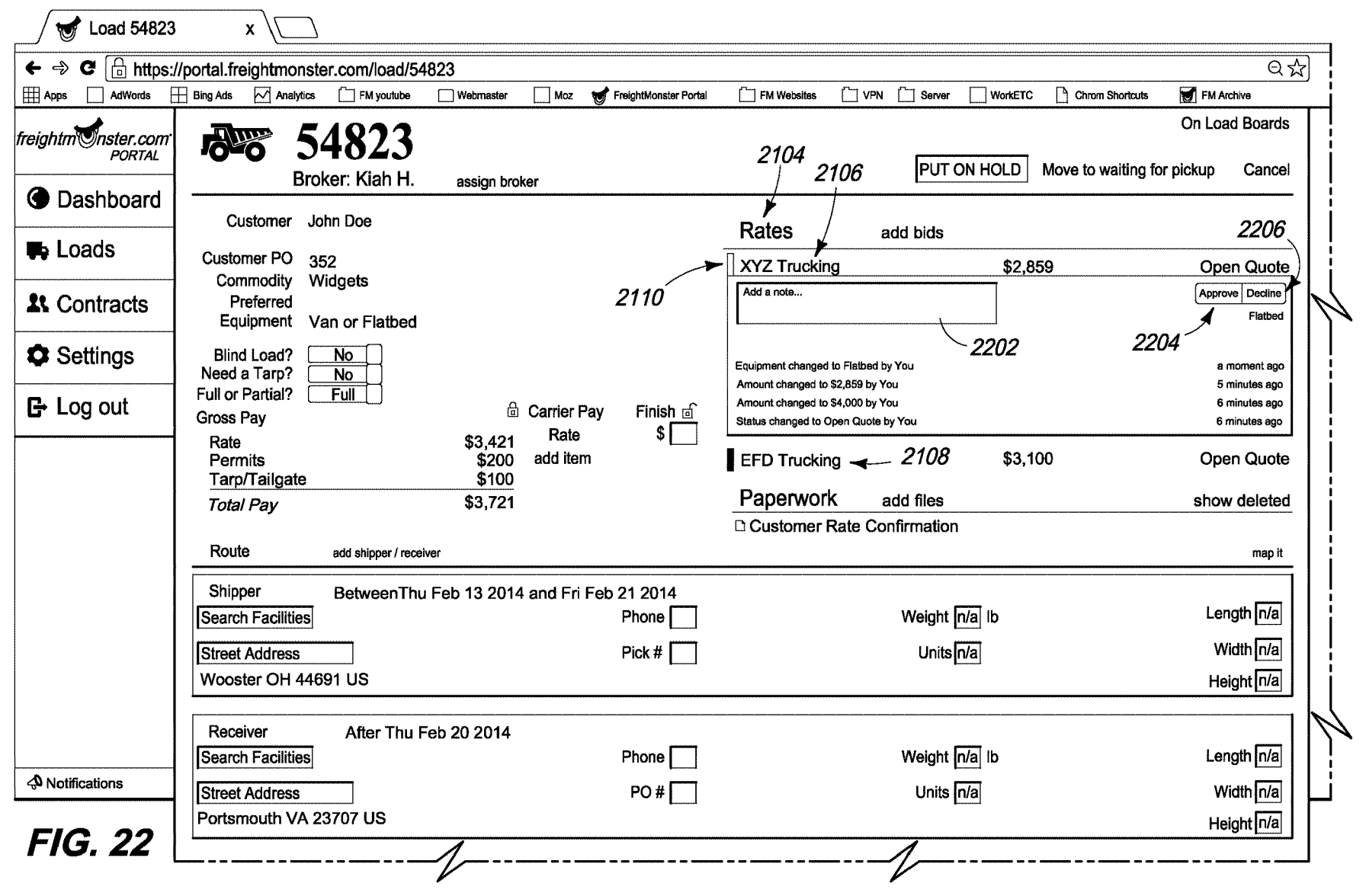

FIG. 22 illustrates an account manager/broker screen shot depicting a menu for interacting with a carrier rate on a load menu. Multiple quotes from unique sources (indicated by carriers 2106 and 2108) are shown, as further previously depicted by reference numeral 408 of FIG. 4B. More particularly, a note text field 2202 enables a user to input comments relating to that carrier bid and a selectable "Approve" button 2204 and "Decline" button 2206 enable a user to indicate approval or decline of a particular carrier bid.

Figure 23:
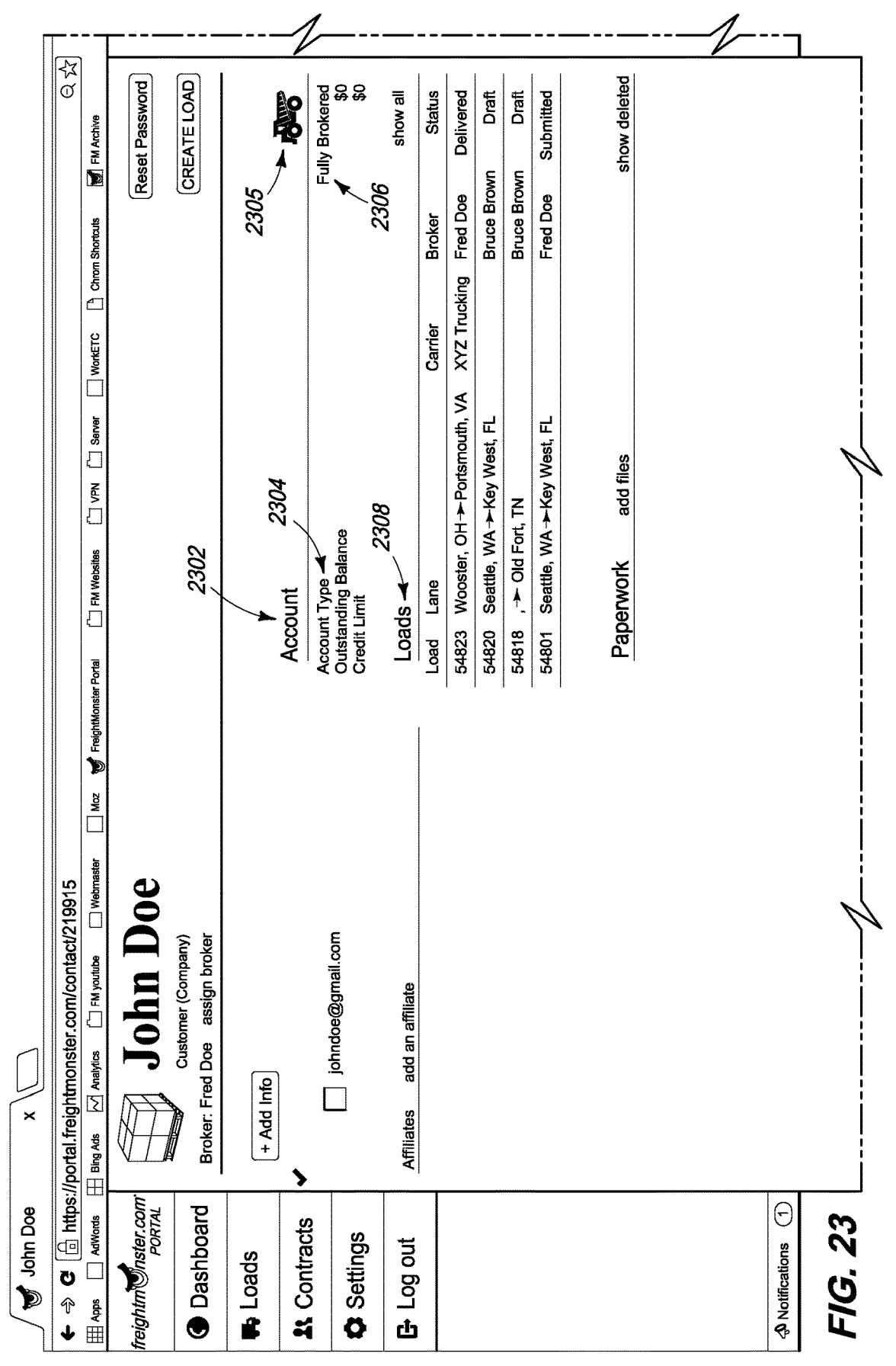

FIG. 23 illustrates a broker-side screen shot depicting a customer profile. More particularly, an "Account" type display field 2302 is shown above a "Loads" type display field 2308. Field 2302 includes an "Account Type" field category 2304 with a presently displayed "Fully Brokered" field value, or visual indicia that is further represented by one of a series of vehicle representations by vehicle icon 2305. Field 2304 correlates with item 406 in FIG. 4A.

Figure 24:
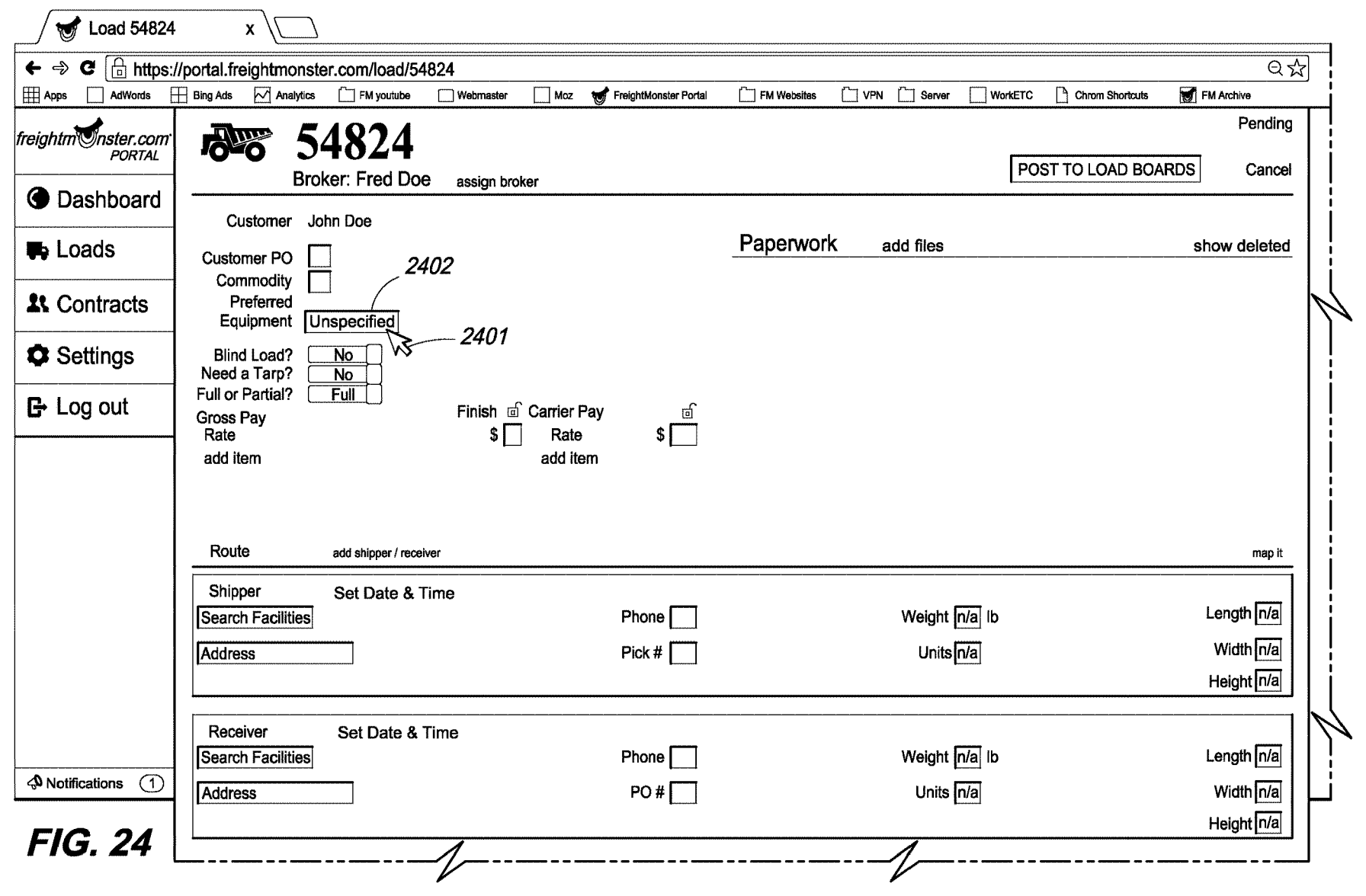

FIG. 24 illustrates a broker-side screen shot depicting a brand new load. A cursor 2401 is "moused-over" a preferred equipment "Unspecified" field 2402 which generates pop-up menu 2502 in FIG. 25, below.

Figure 25:
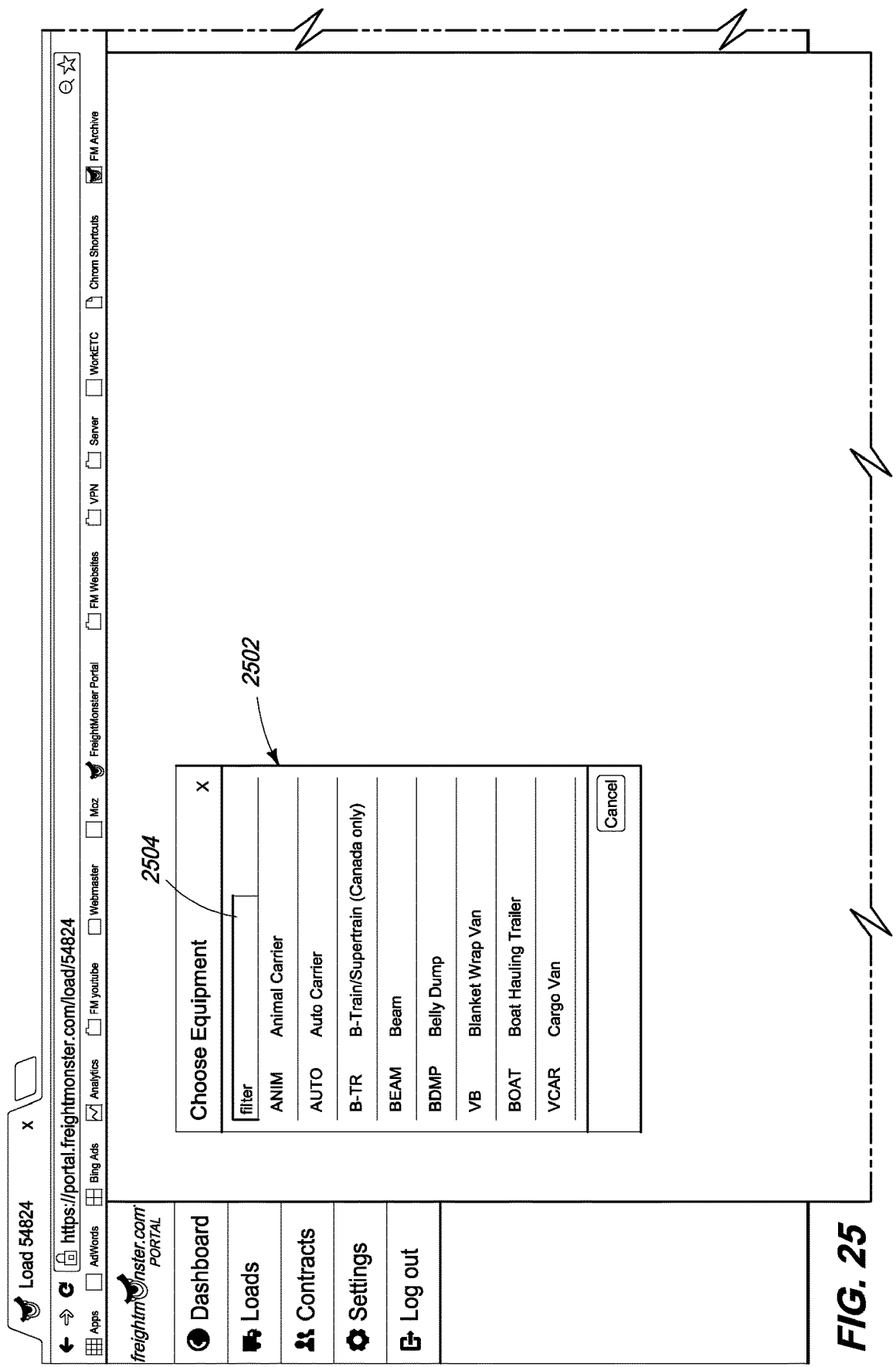
FIG. 25 illustrates a screen shot depicting the selection of equipment for the new load depicted in FIG. 24.

FIG. 25 illustrates a screen shot depicting the selection of equipment for the new load depicted in FIG. 25. More particularly, pop-up menu 2502 depicts a list of unique trailer types that can be selected by a user via menu 2502. The list of unique trailer types is queried from a database of industry standard trailer types and transportation methods (including intermodal). A search box field 2504 is also provided for inputting and searching the database for a specific type of trailer or transportation method.

Figure 26:
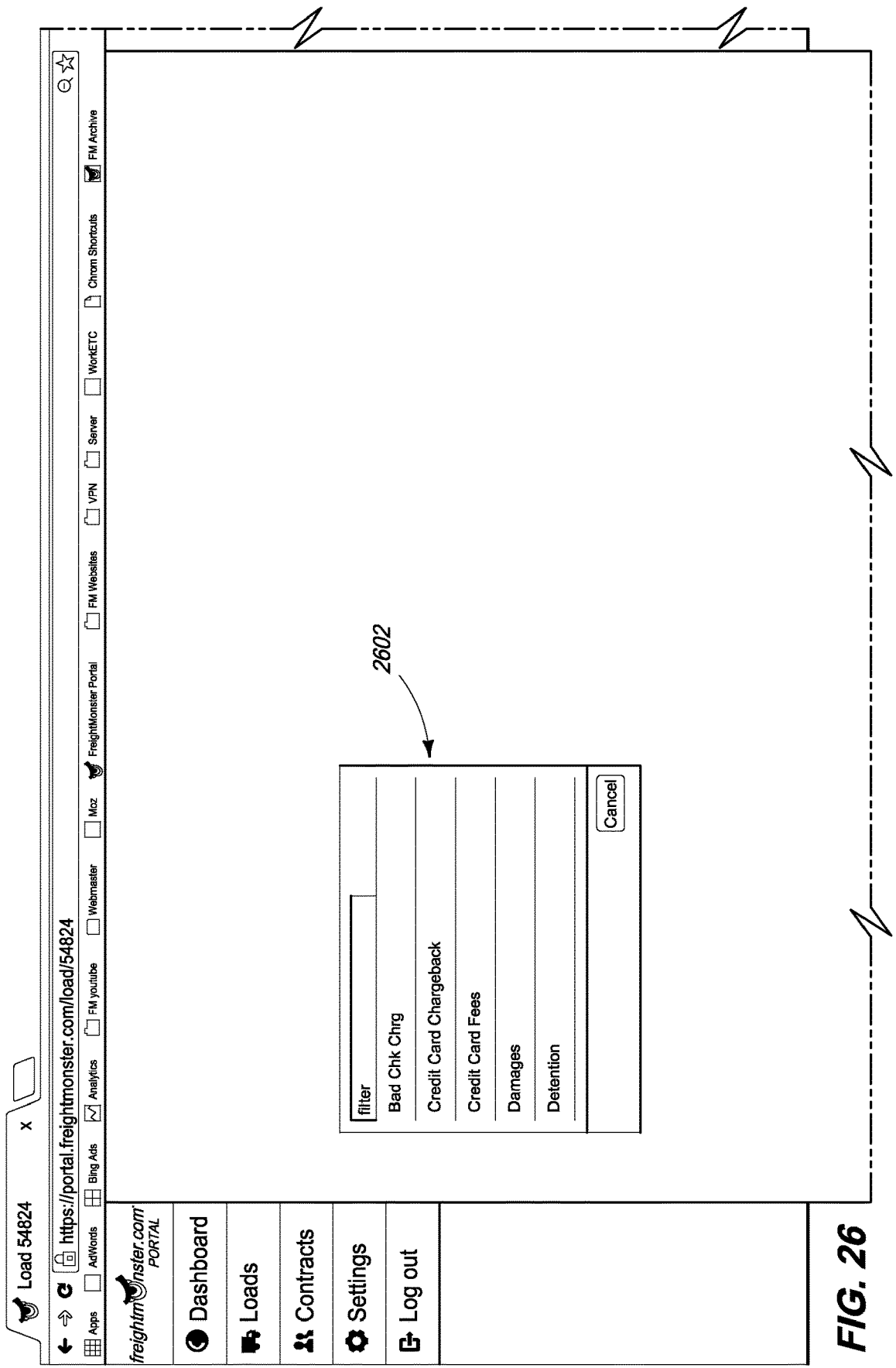
FIG. 26 illustrates a screen shot depicting a new load and adding a line item to a customer's invoice.

FIG. 26 illustrates a screen shot depicting a new load and adding a new line item to a customer's invoice. More particularly, a pop-up menu 2602 is used to add a line item to a customer invoice based on industry-specific needs. The data input via menu 2602 is automatically provided as input into an accounting management program, such as Quick Books™.

Figure 27:
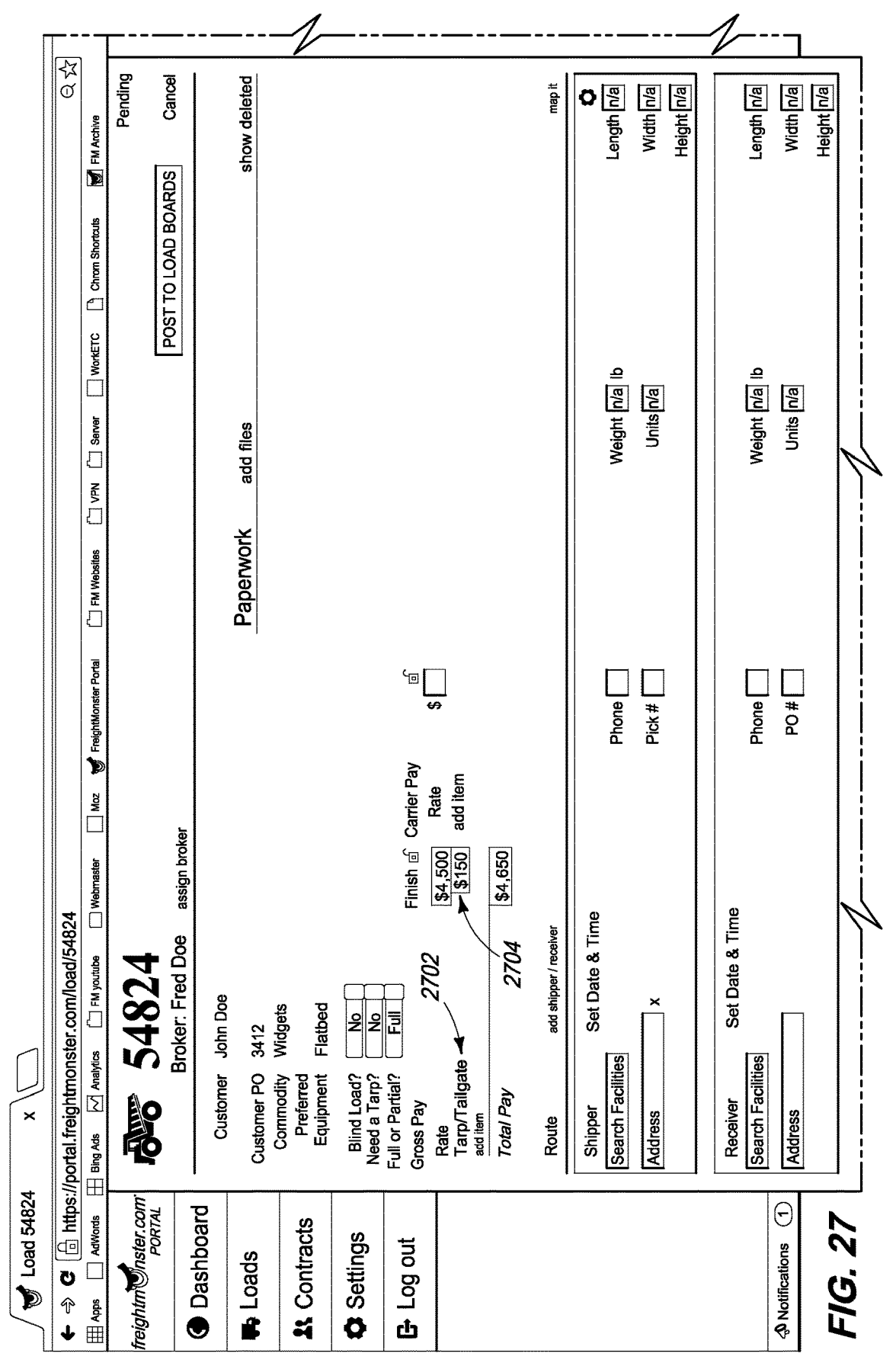

FIG. 27 illustrates a screen shot depicting realization of the line item added to the customer's invoice of FIG. 26. More particularly, "Tarp/Tailgate" field 2702 has been added along with a value field entry 2704 of $150.

Figure 28:
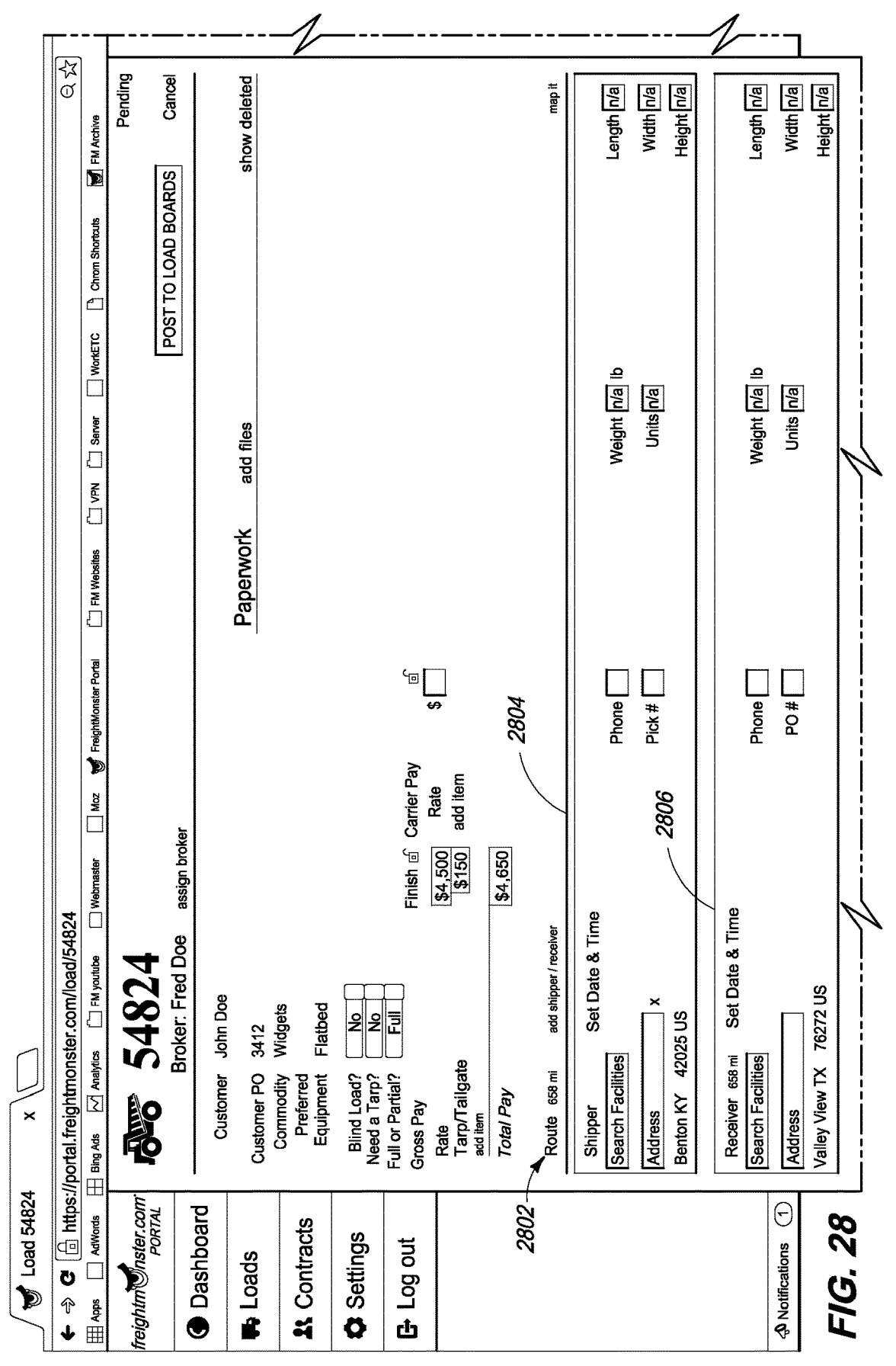

FIG. 28 illustrates a screen shot depicting the ability to add a shipper and a receiver for a designated city and state. A "Route" data entry field 2802 is provided with a "Shipper" data entry field 2804 and a "Receiver" data entry field 2806. Shipper waypoint location and load information is entered by a user into field 2804. Receiver waypoint location and load information is entered by a user into field 2806.

Figure 29:
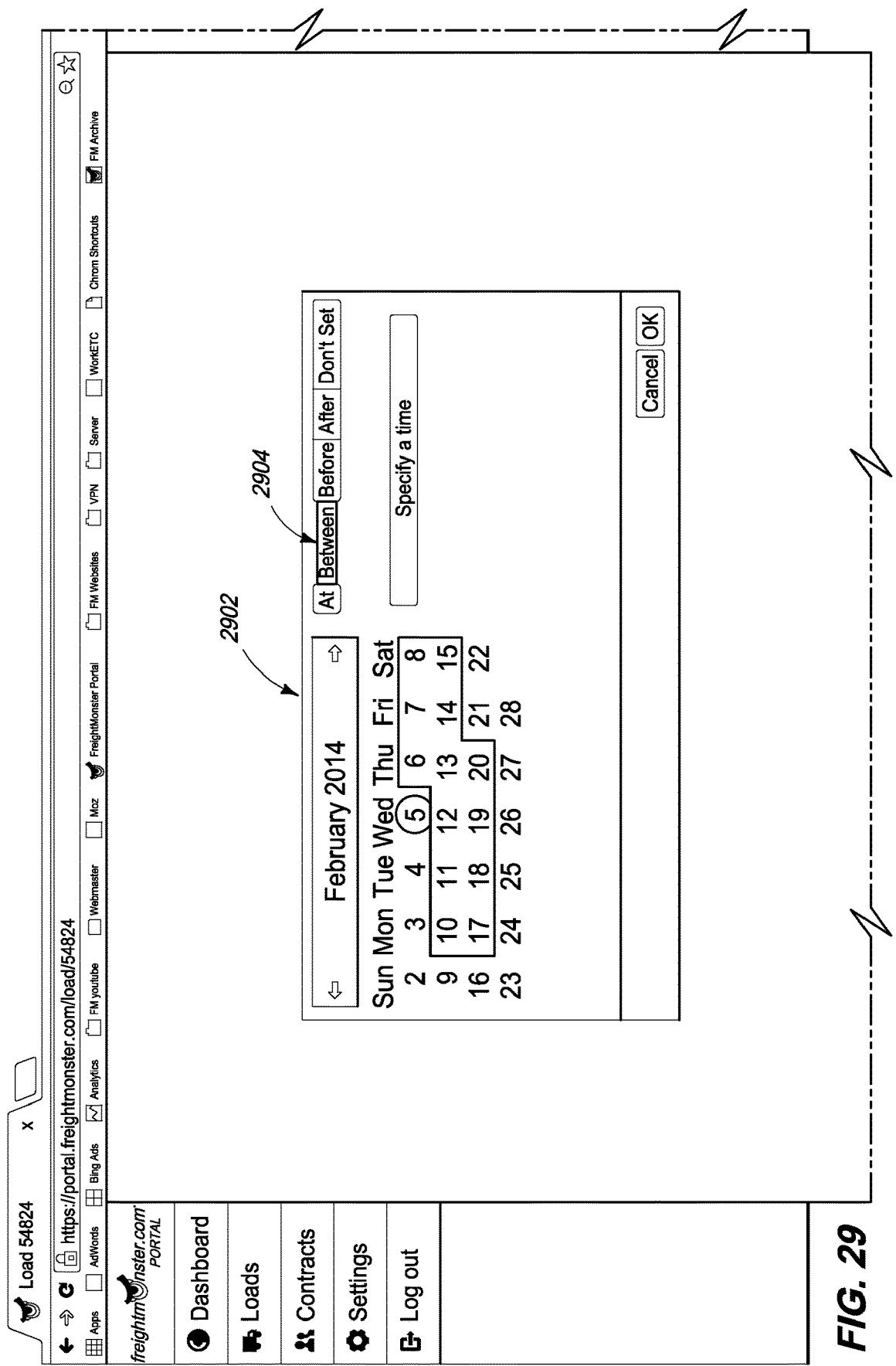
FIG. 29 illustrates a screen shot depicting a pop-up menu while selecting a temporal date range.

FIG. 29 illustrates a screen shot depicting a pop-up menu 2902 while selecting a temporal date range. More particularly, a "Between" date range selection feature 2904 has been selected to enable a single tactile input gesture (such as click-and-drag operation) for selecting a range of dates.

Figure 30:
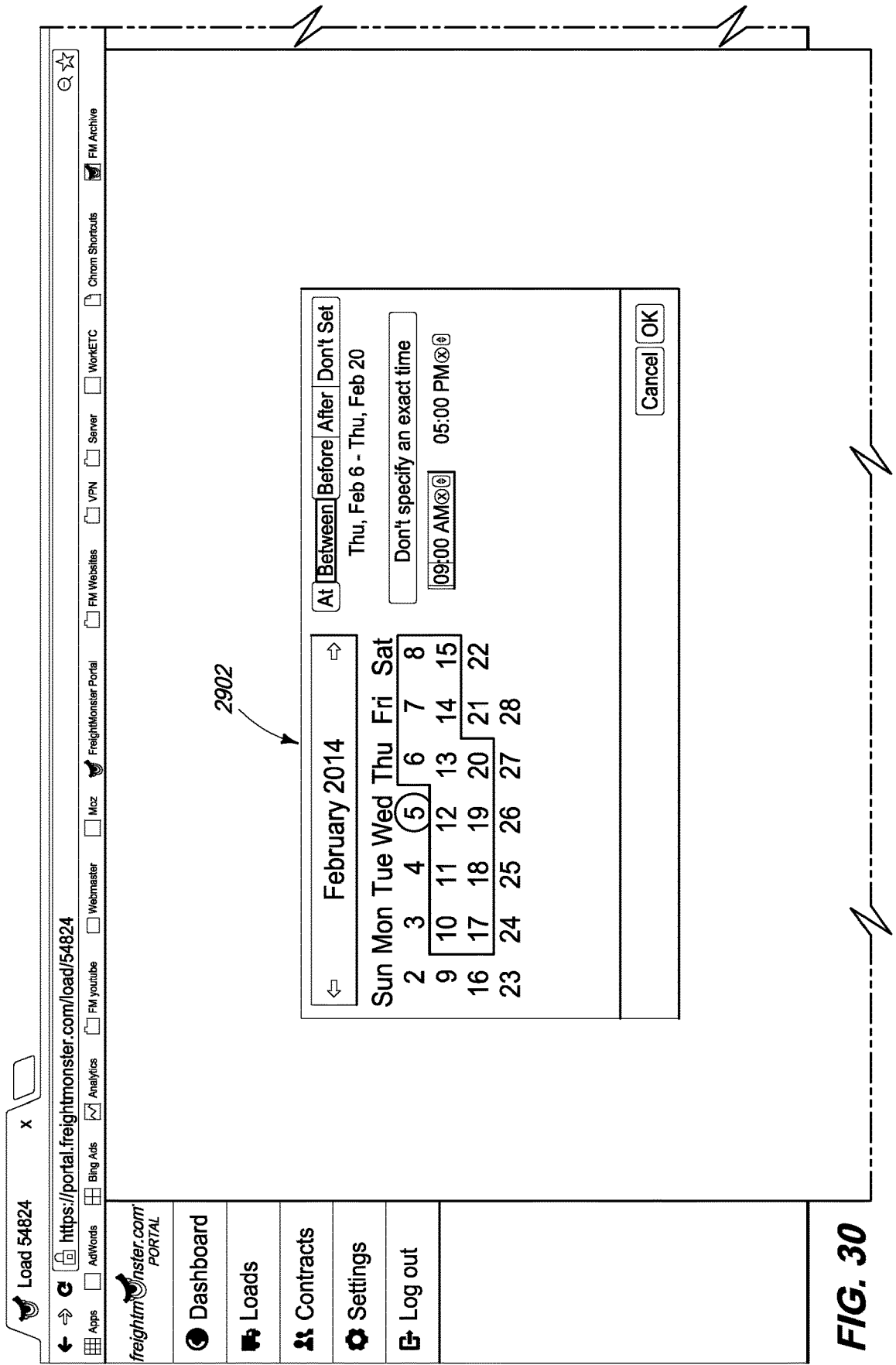
FIG. 30 illustrates a screen shot depicting the pop-up menu of FIG. 30 while selecting a temporal time range.

FIG. 30 illustrates a screen shot depicting the pop-up menu 2902 of FIG. 29 while selecting a temporal time range. A selected date range is shown for a "Shipper" as subsequently depicted in FIG. 32. Encircled "5" indicates the present date.

Figure 31:
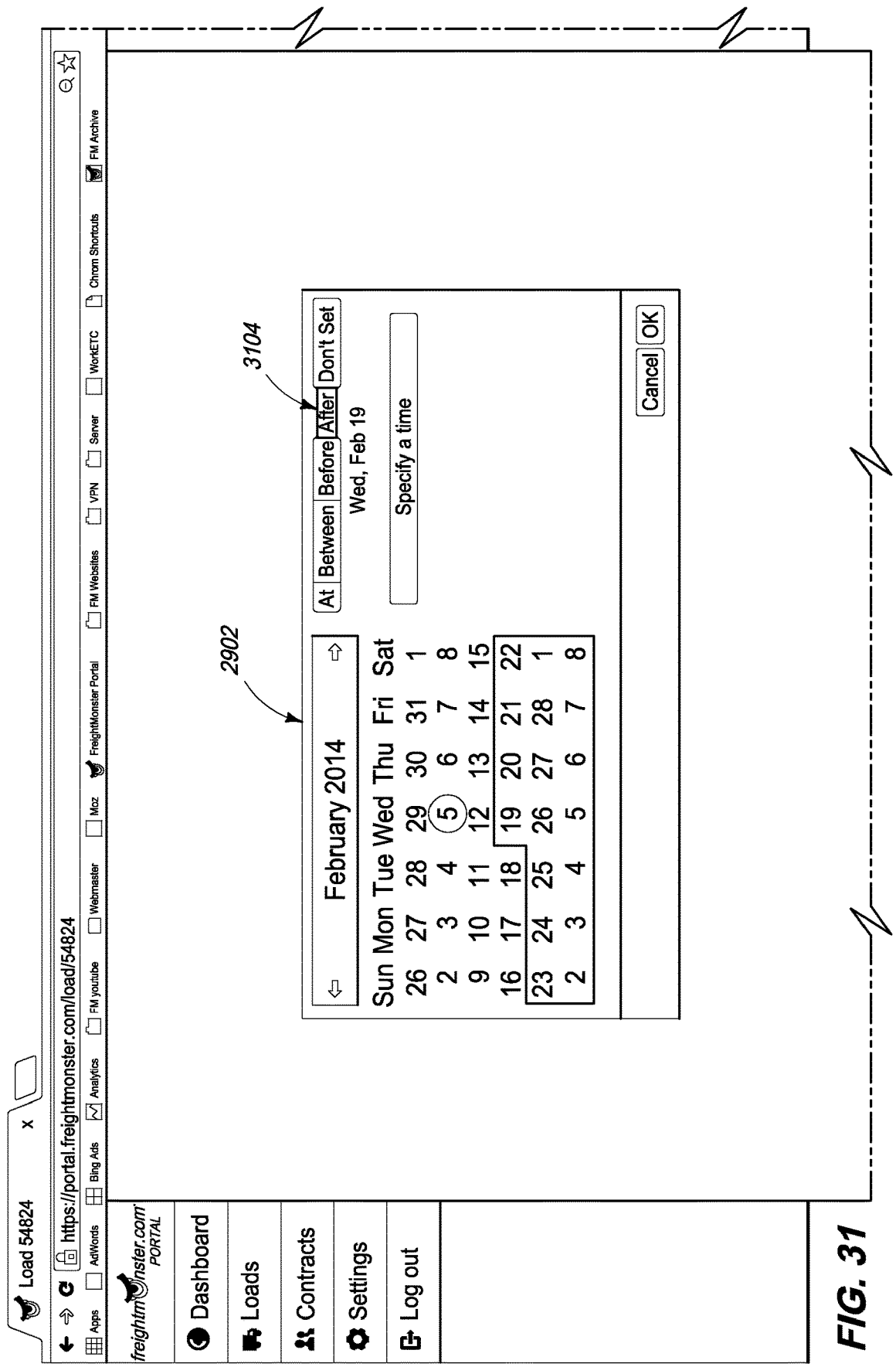
FIG. 31 illustrates a screen shot depicting the pop-up menu of FIGS. 30 and 31 while selecting a temporal "after" time range.

FIG. 31 illustrates a screen shot depicting the pop-up menu 2902 of FIGS. 29 and 30 while selecting a temporal "after" time range 3104 shown for a "Receiver" as subsequently depicted in FIG. 32. More particularly, all dates after (and including) Feb. 19, 2014 are selected.

Figure 32:
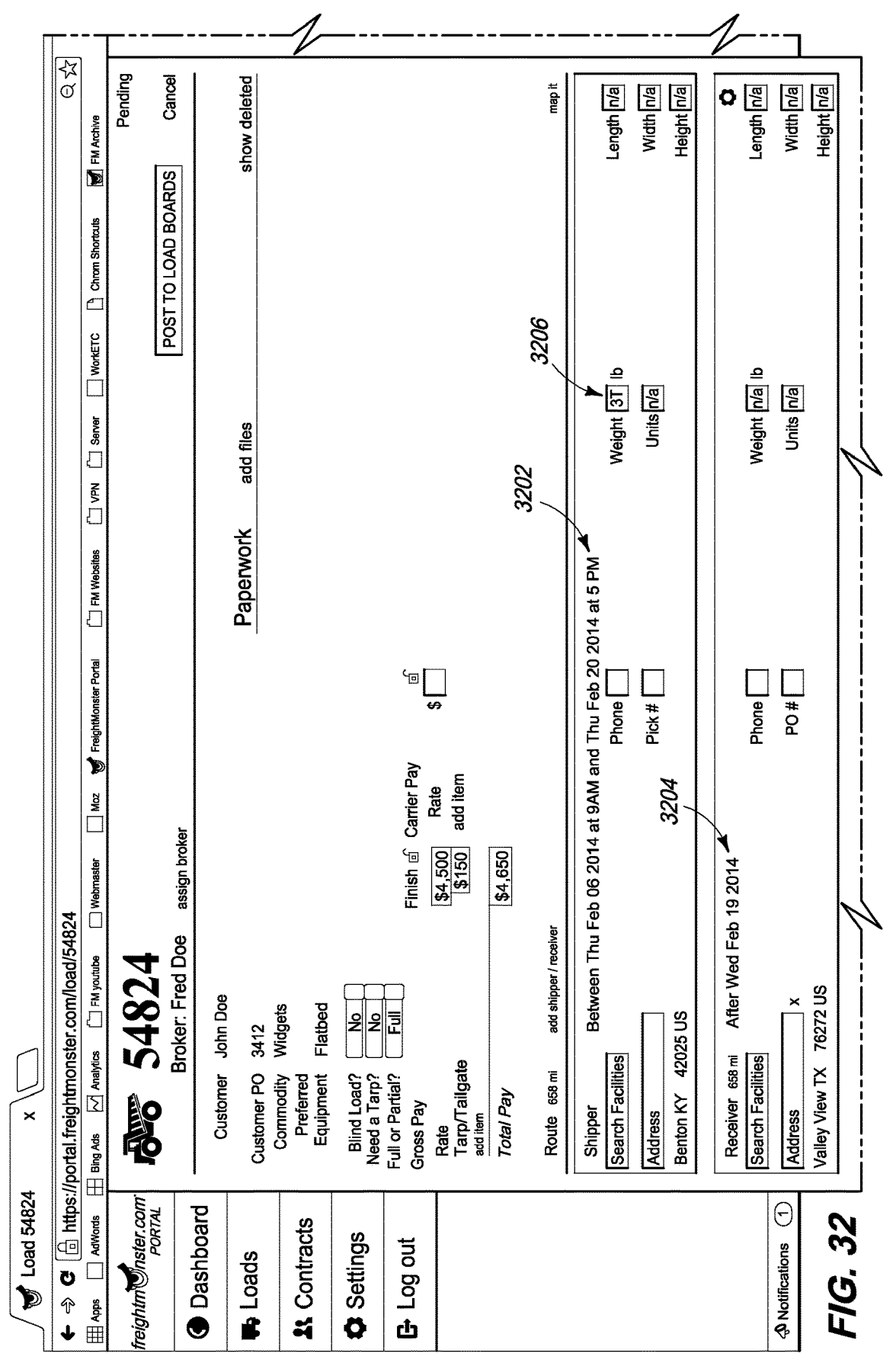

FIG. 32 illustrates a screen shot depicting a realized selected temporal range implemented via actions depicted in FIGS. 29-31. A selected date range 3202 and 3204 is shown for both the "Shipper" and the "Receiver", respectively. Additionally, a "Weight" data entry field 3206 has received an input of "3T" (lb.).

Figure 33:
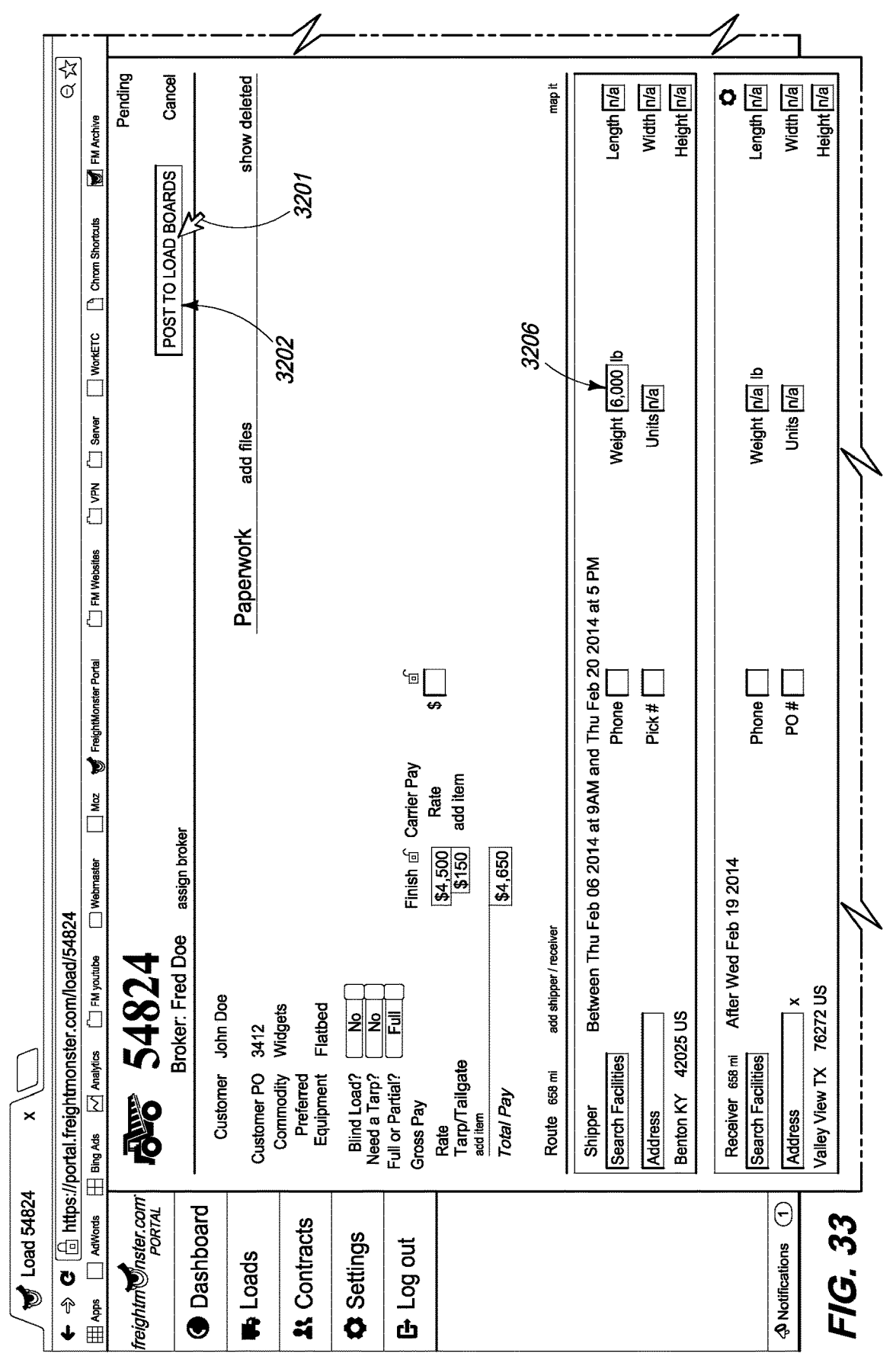

FIG. 33 illustrates a screen shot depicting automatically converted units of weight for a specific cargo over that entered in the screen shot of FIG. 32. "Weight" data entry field 3206 has been automatically converted in units (from tons) into pounds (lb.). Additionally, automatic conversions of units, such as English and metric unit measures are implemented via such system and feature. Finally, a cursor 3201 is "moused-over" "POST TO LOAD BOARD" button which triggers posting of the input information to the load board.

FIG. 34 illustrates a screen shot depicting a load status change "PUT ON HOLD" designated by item 3402 resulting from selection of a "POST TO LOAD BOARDS" field 3203 (in FIG. 33). Further details of the load status change are provided in FIG. 17, above.

Figure 35:
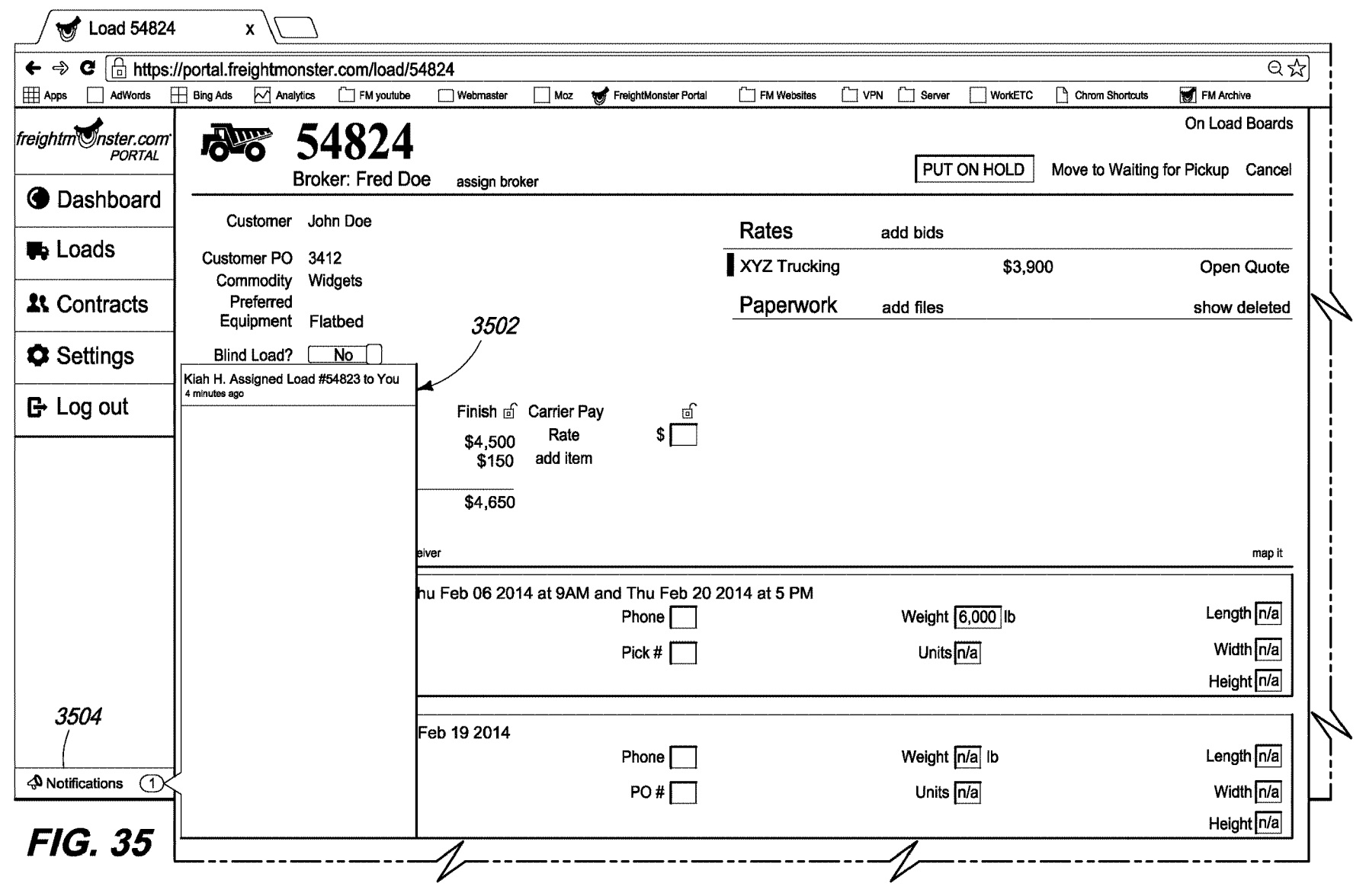

FIG. 35 illustrates a screen shot depicting the adding of a carrier quote where permissions change the rate and "XYZ TRUCKING" is added. A notifications message window 3502 is shown after selecting "Notifications" selection item 3504.

Figure 36:
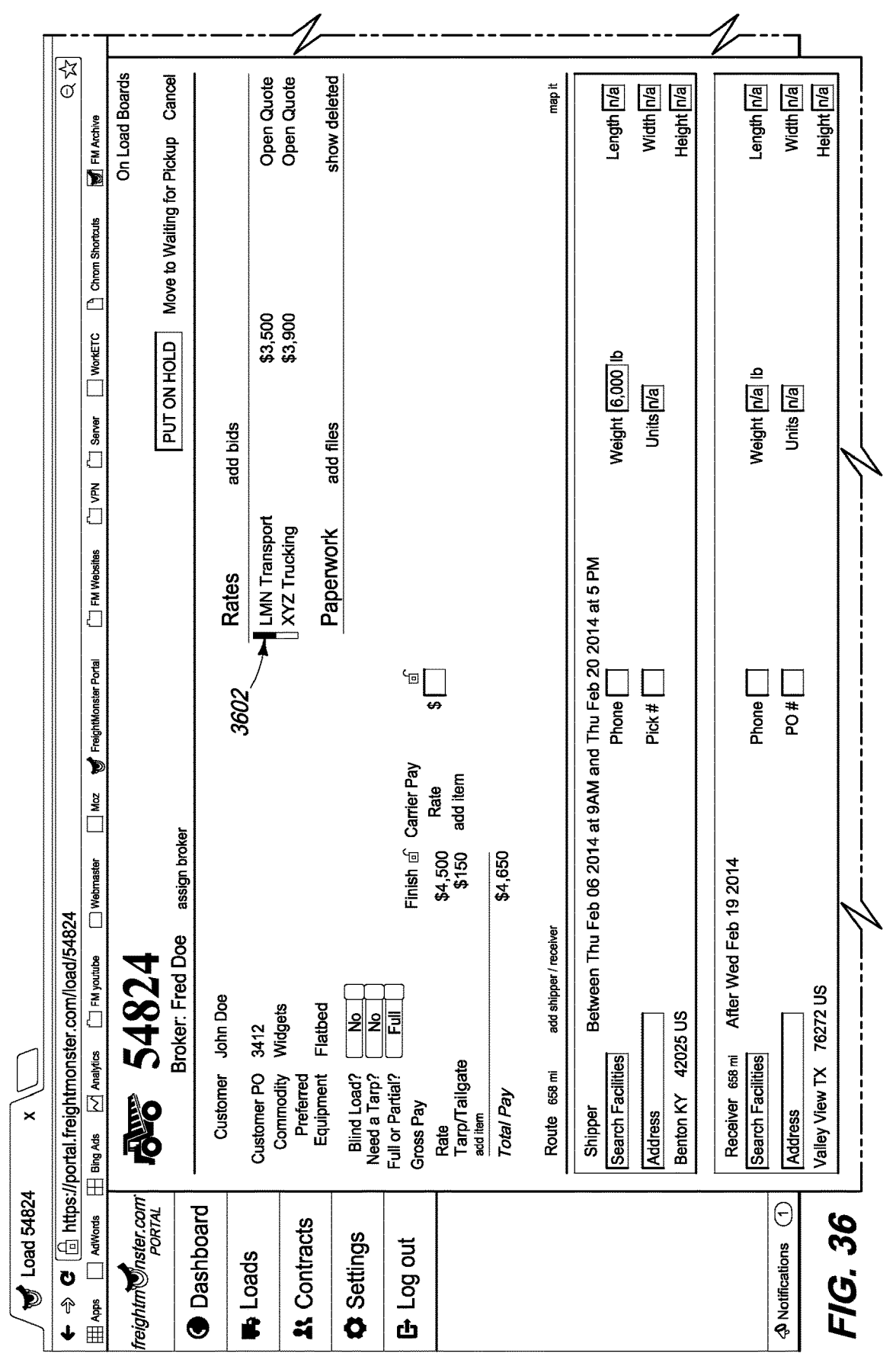

FIG. 36 illustrates a screen shot depicting the addition of a second carrier quote indicated by reference item 3602 to provide for multiple quotes. Item 3602 represents a rate of $3,500 for "XYZ Transport" which comprises an "Open Quote".

Figure 37:
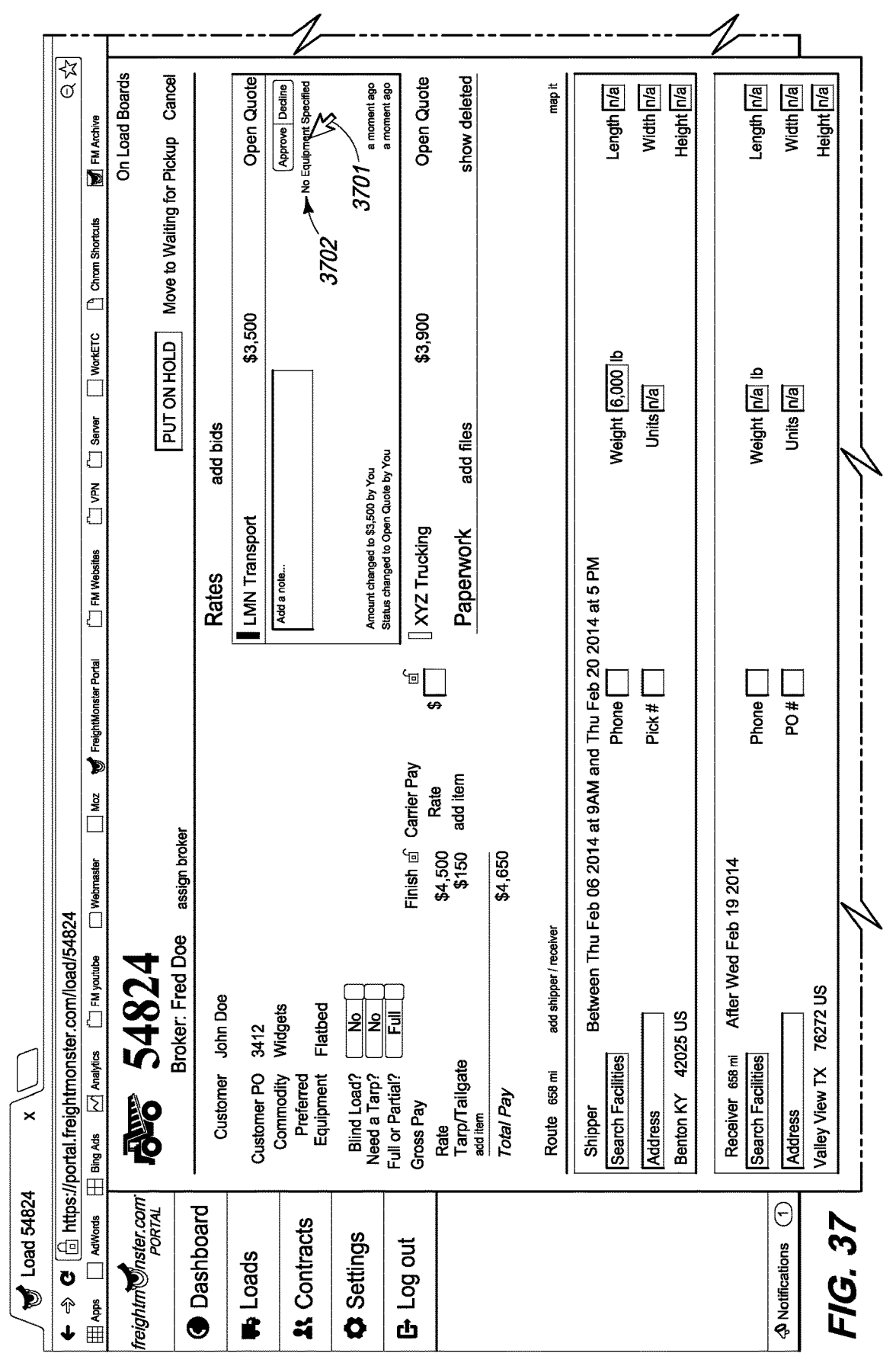

FIG. 37 illustrates a screen shot depicting a carrier quote menu. More particularly, a cursor 3701 is "moused-over" a "No Equipment Specified" menu selection item 3702 which causes pop-up menu 3802 to be enabled in FIG. 38.

Figure 38:
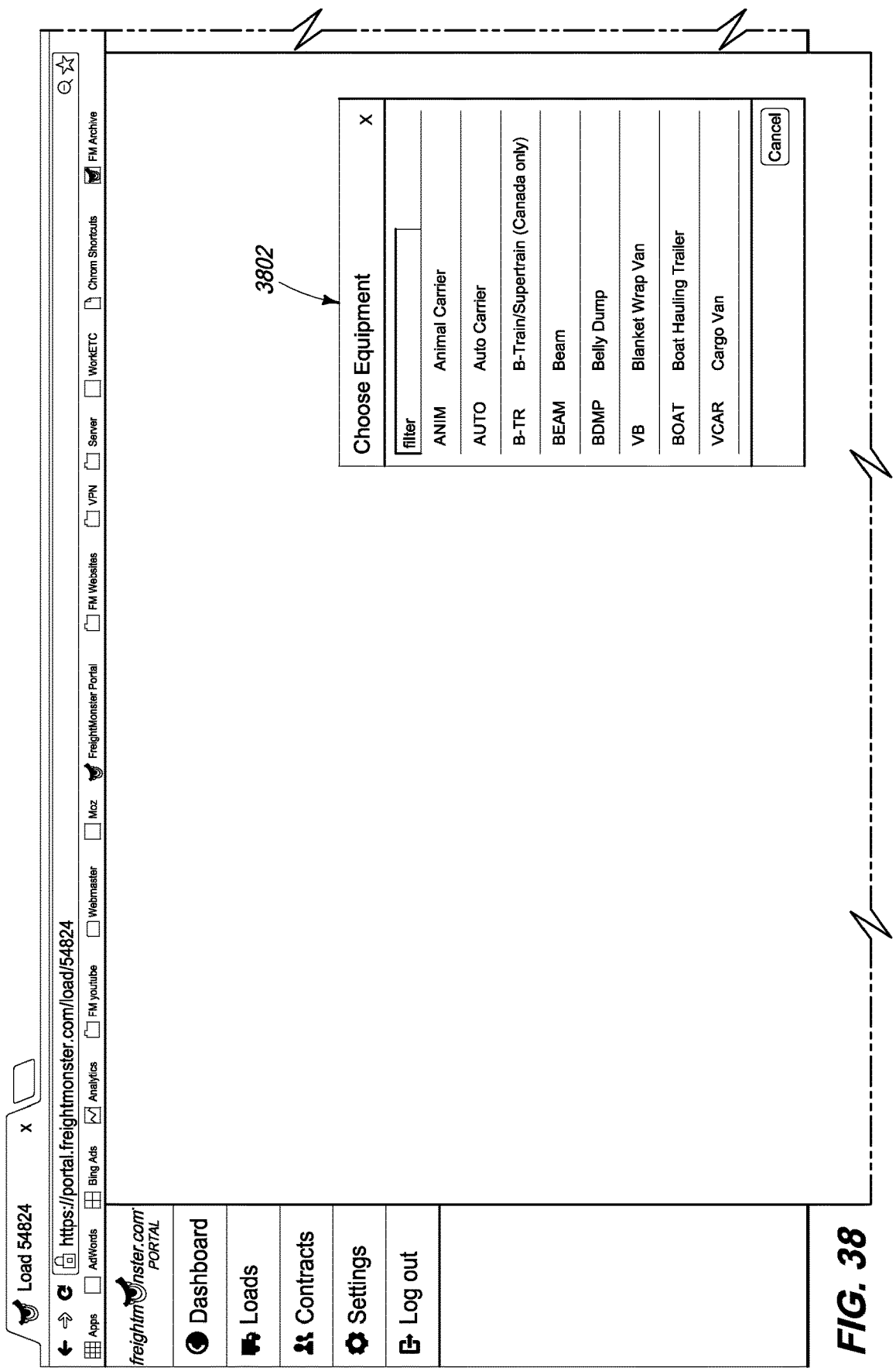
FIG. 38 illustrates a screen shot depicting a pop-up menu for adding carrier quote equipment.

FIG. 38 illustrates a screen shot depicting a pop-up menu for adding carrier quote equipment. More particularly, pop-up menu 3802 depicts a list of unique trailer types that can be selected by a user via menu 3802. The list of unique trailer types is queried from a database of industry standard trailer types and transportation methods (including intermodal). A search box field is also provided for inputting and searching the database for a specific type of trailer or transportation method.

FIG. 39 illustrates a screen shot depicting realized changes of carrier quote equipment type from actions taken by a user depicted previously in FIG. 37 and FIG. 38.

Figure 40:
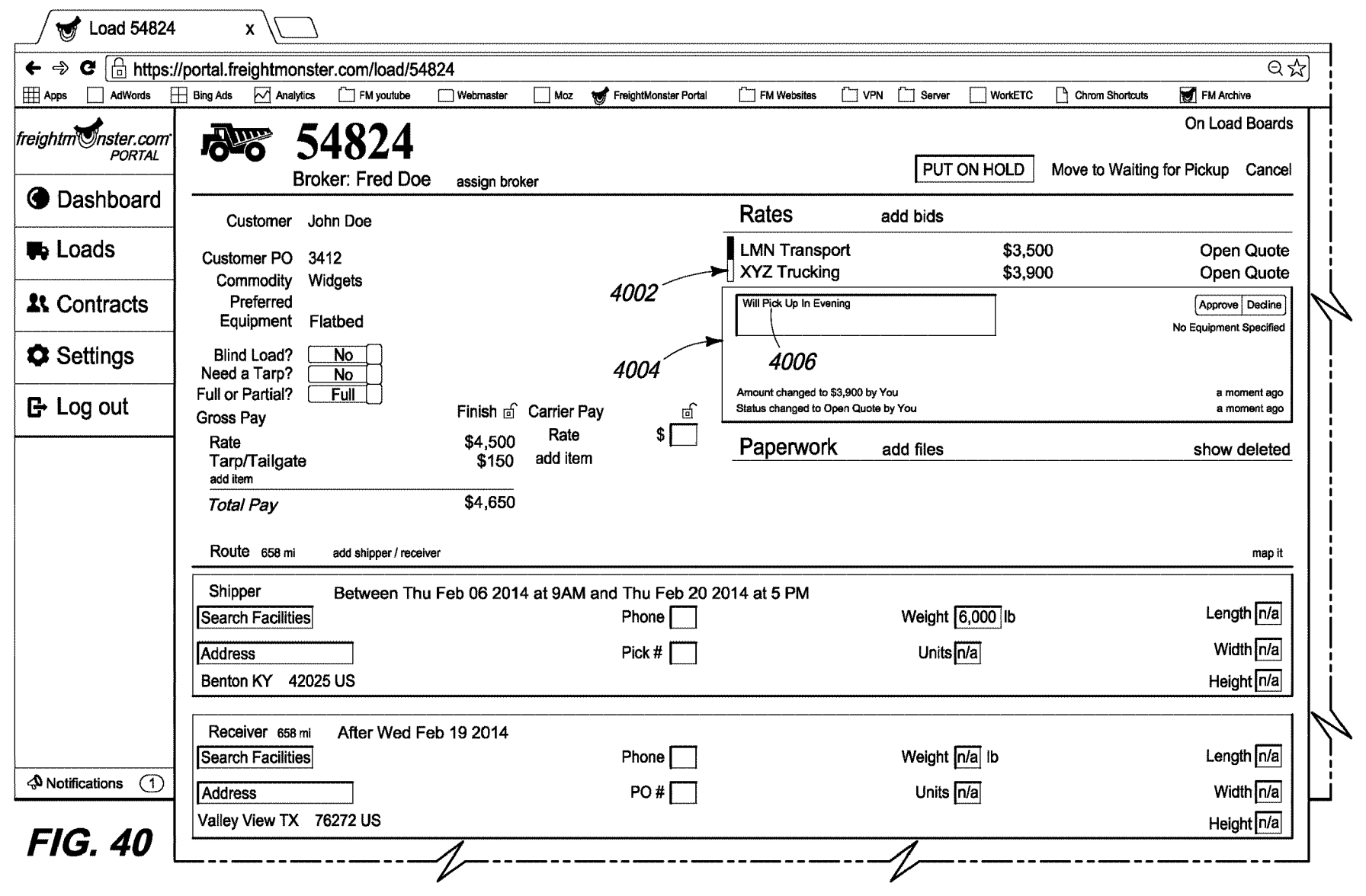

FIG. 40 illustrates a screen shot depicting the addition of a note to a carrier. More particularly, "XYZ Trucking" text input field 4002 includes a note input field 4004 in which indicia, or text 4006 has been input by a user.

FIG. 41 illustrates a screen shot depicting realization of the added note input in FIG. 40.

Figure 42:
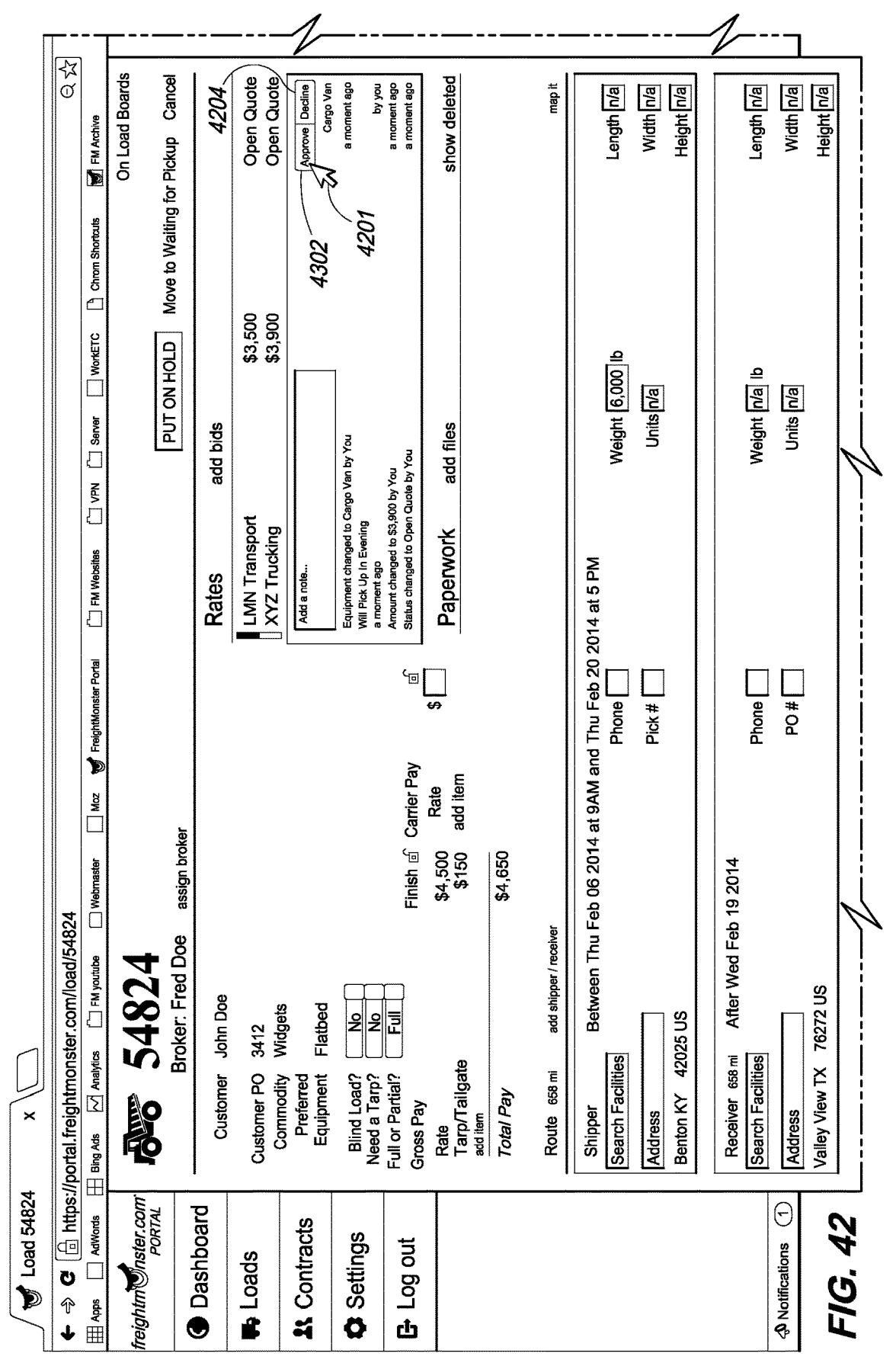

FIG. 42 illustrates a screen shot depicting realizing equipment changes for the listed carrier with the added note and approval of "XYZ TRUCKING". A cursor 4201 is "moused-over" an "Approved" selection button, when clicked, causes the identified carrier to be approved on the load. A "Decline" selection button 4204 is also provided for declining that carrier.

Figure 43:
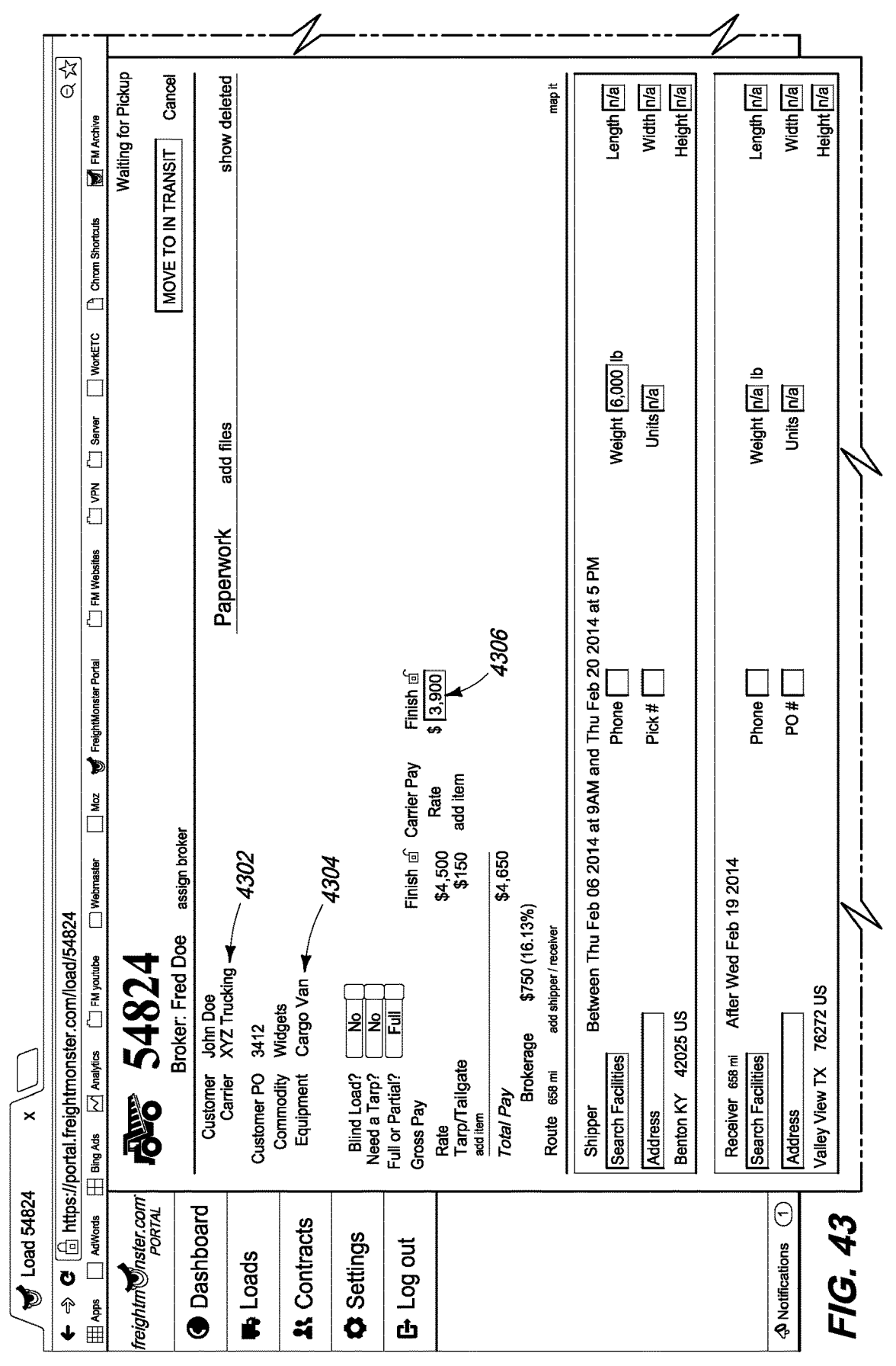

FIG. 43 illustrates a screen shot depicting realized changes for approved carrier "XYZ TRUCKING" resulting from selection of "Approved" selection button 4204 (in FIG. 42). In addition, a "Carrier" field 4302 now shows "XYZ Trucking". An "Equipment" field 4304 shows "Cargo Van". A carrier pay field 4306 shows "$3,900".

Figure 44:
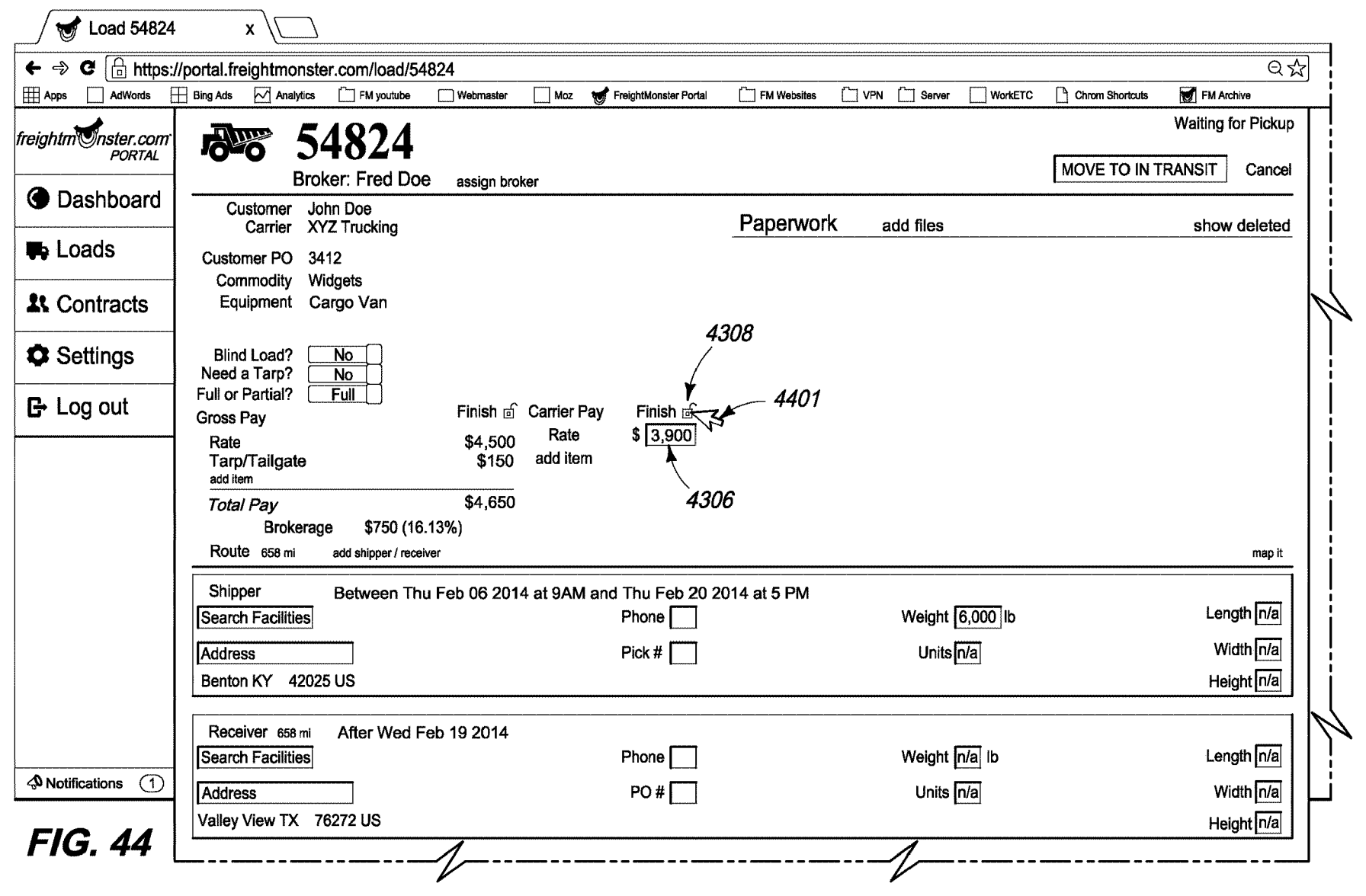

FIG. 44 illustrates a screen shot depicting creation of carrier rate paperwork. By selecting a lock icon 4308 above carrier pay field 4306 using cursory 4401, it creates paperwork as shown below with reference to FIGS. 45 and 46.

Figure 45:
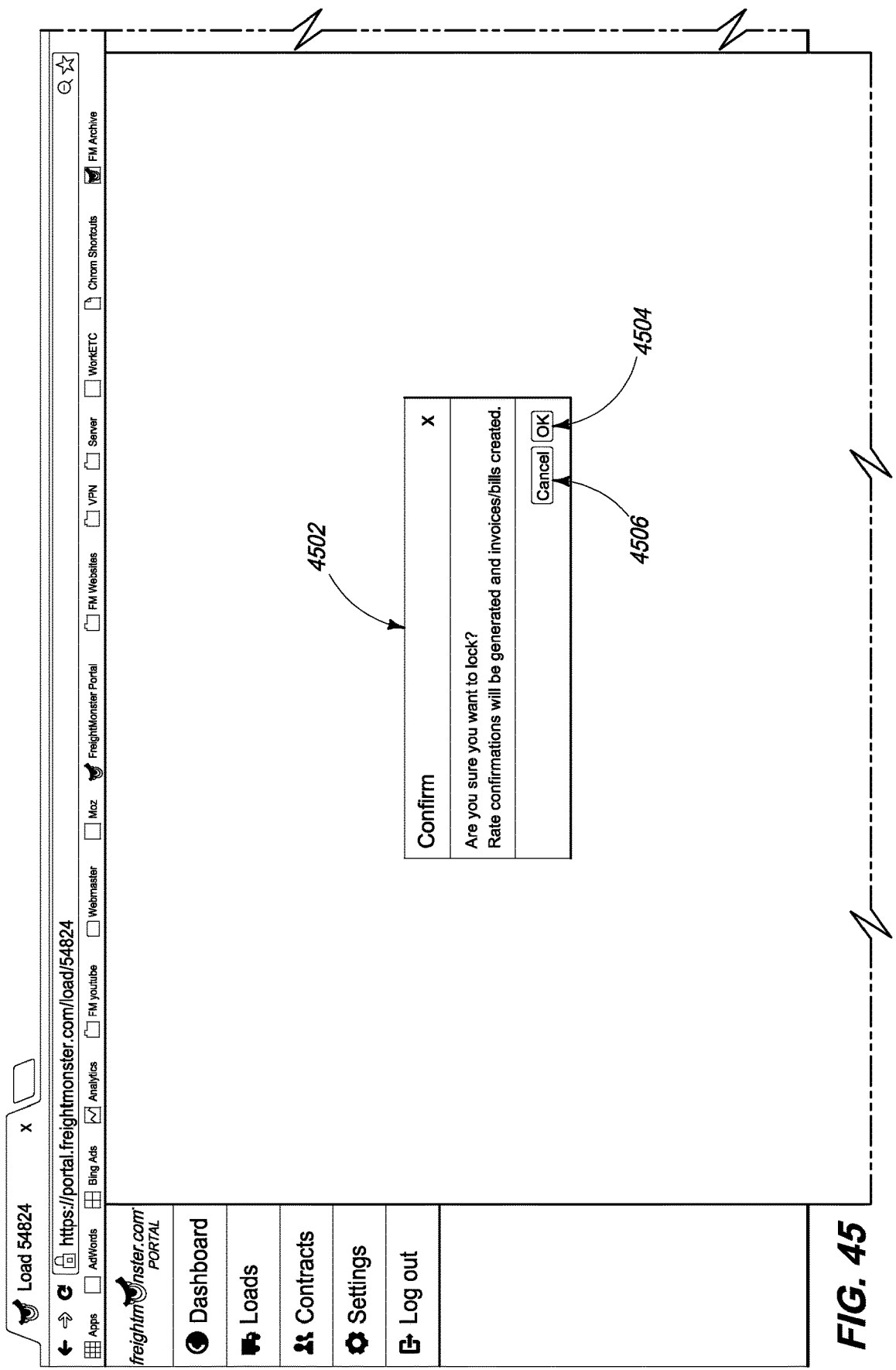
FIG. 45 illustrates a screen shot depicting a pop-up screen that provides a secondary check to a user indicating that this operation is desired by the user.

FIG. 45 illustrates a screen shot depicting a pop-up screen 4502 that provides a secondary check to a user indicating that this operation is desired by the user. A user is presented with an "OK" selection button 4504 and a "Cancel" selection button 4506 for respectively launching or cancelling the "lock" to respective system data and limits the ability for values to be changed, such as permission-locking user access to only administrative or broker level personnel (other users will be prevented from unlocking the data and making changes).

Figure 46:
FIG. 46 illustrates a screen shot depicting realization of carrier rate confirmation paperwork.

FIG. 46 illustrates a screen shot depicting realization of carrier rate confirmation paperwork which is triggered as a result of selecting "OK" button 4504 in FIG. 45. As a result, "Paperwork" menu portion 4602 is shown having an added "Carrier Rate Confirmation" item 4604. A carrier pay rate item 4606 is also provided as "$3,900".

Figure 47:
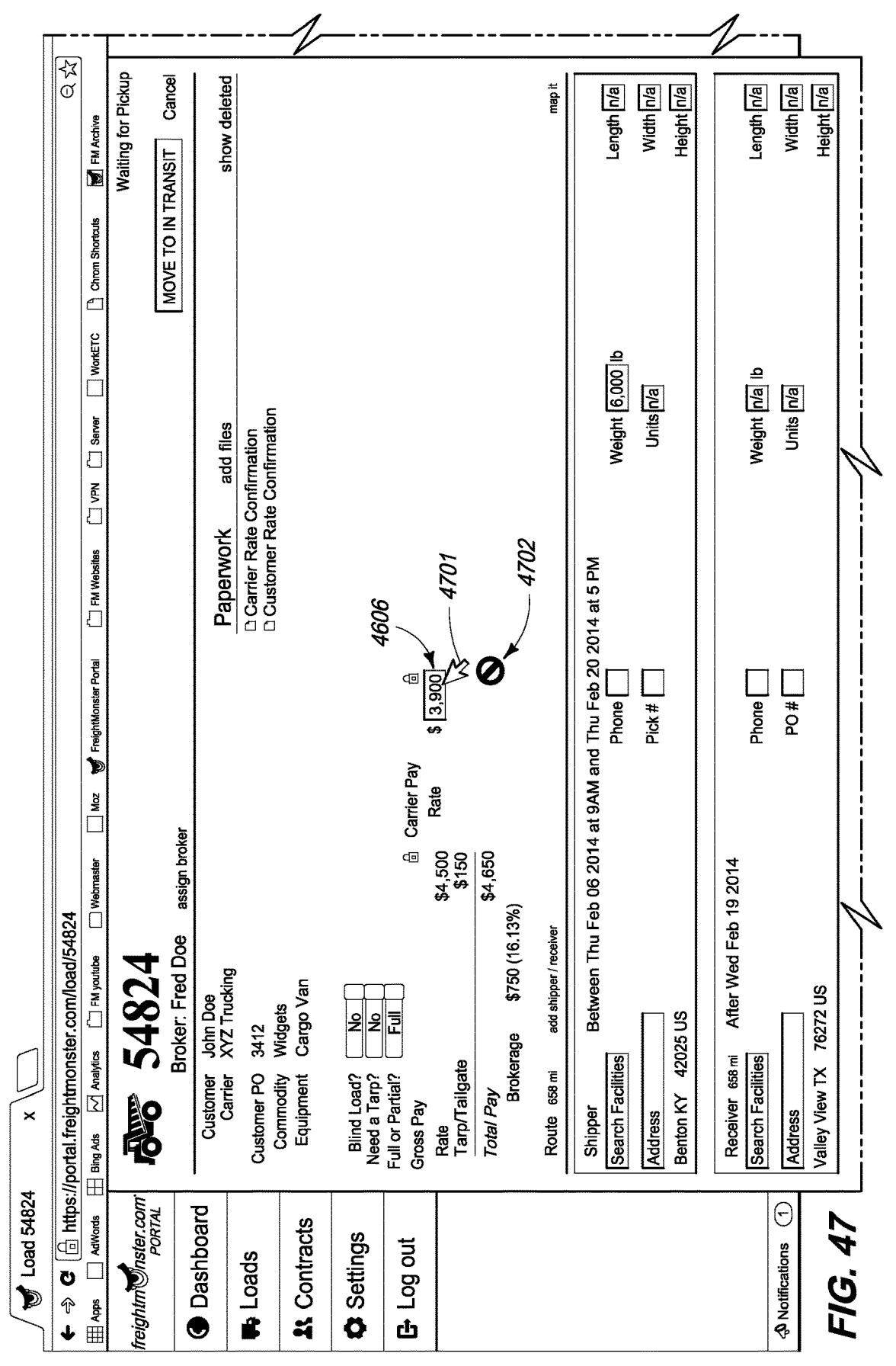

FIG. 47 illustrates a screen shot depicting realization of customer rate confirmation paperwork. A cursor 4701 is shown selecting item 4606 which, in a locked state, generates a "disabled feature" icon 4702.

Figure 48:
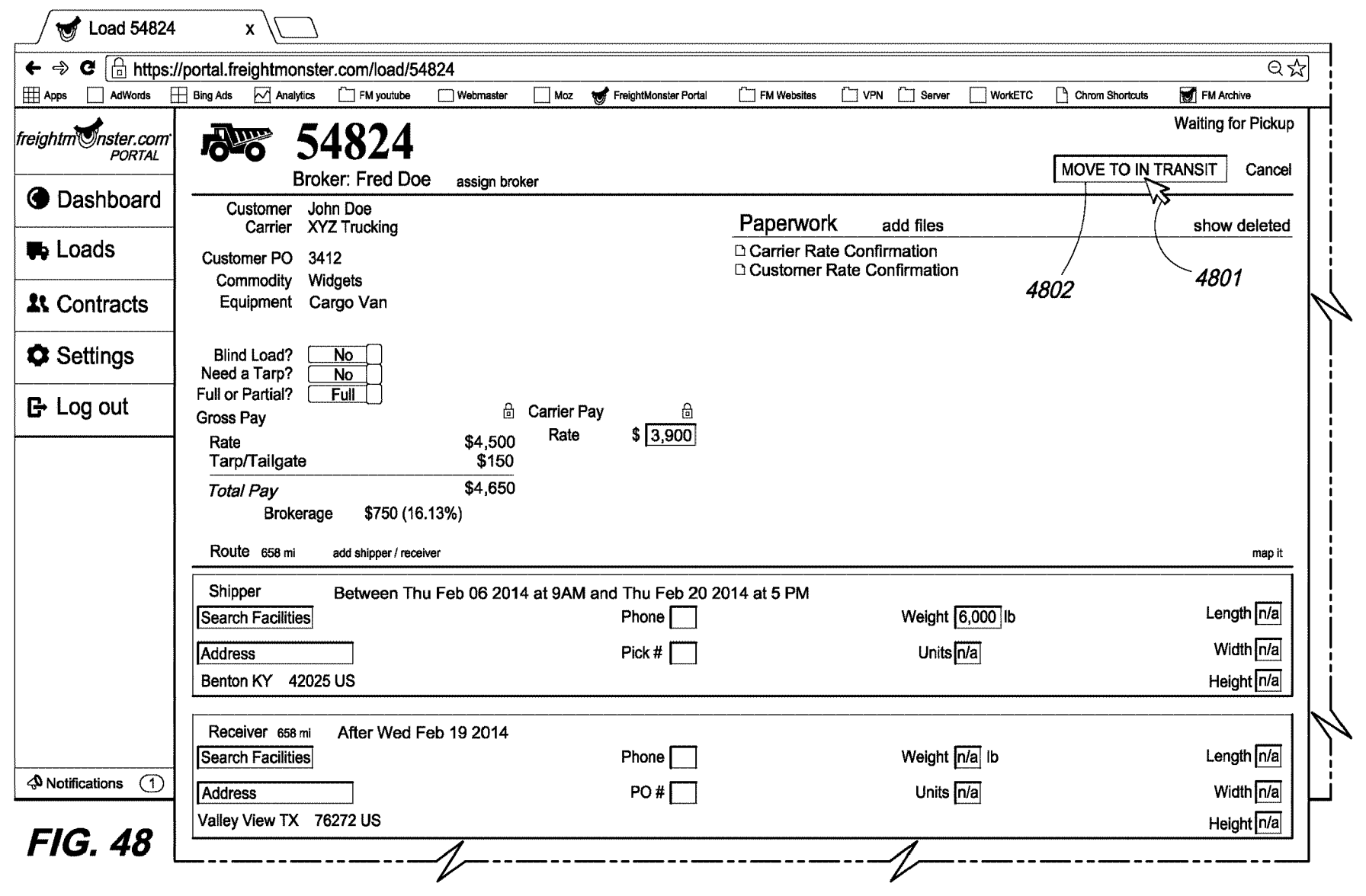

FIG. 48 illustrates a screen shot depicting selection of change of load status to "IN TRANSIT". A cursor 4801 is shown selecting "MOVE TO IN TRANSIT" button 4802 which causes a screen display change represented below in FIG. 49.

Figure 49:
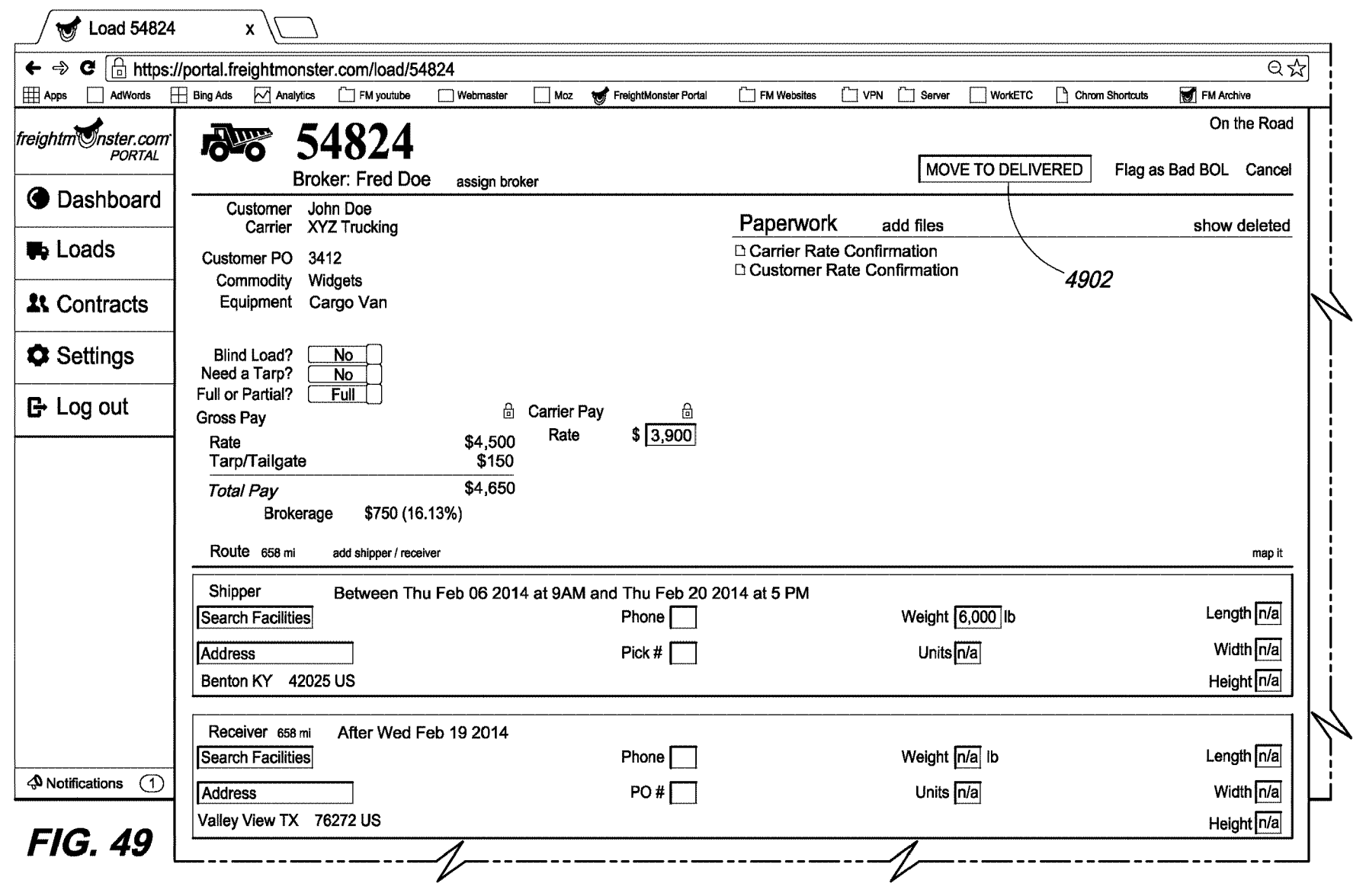

FIG. 49 illustrates a screen shot depicting realization of selection of the changed load status in FIG. 48. A "MOVE TO DELIVERED" button 4902 is then provided for selection by a user.

Figure 50:
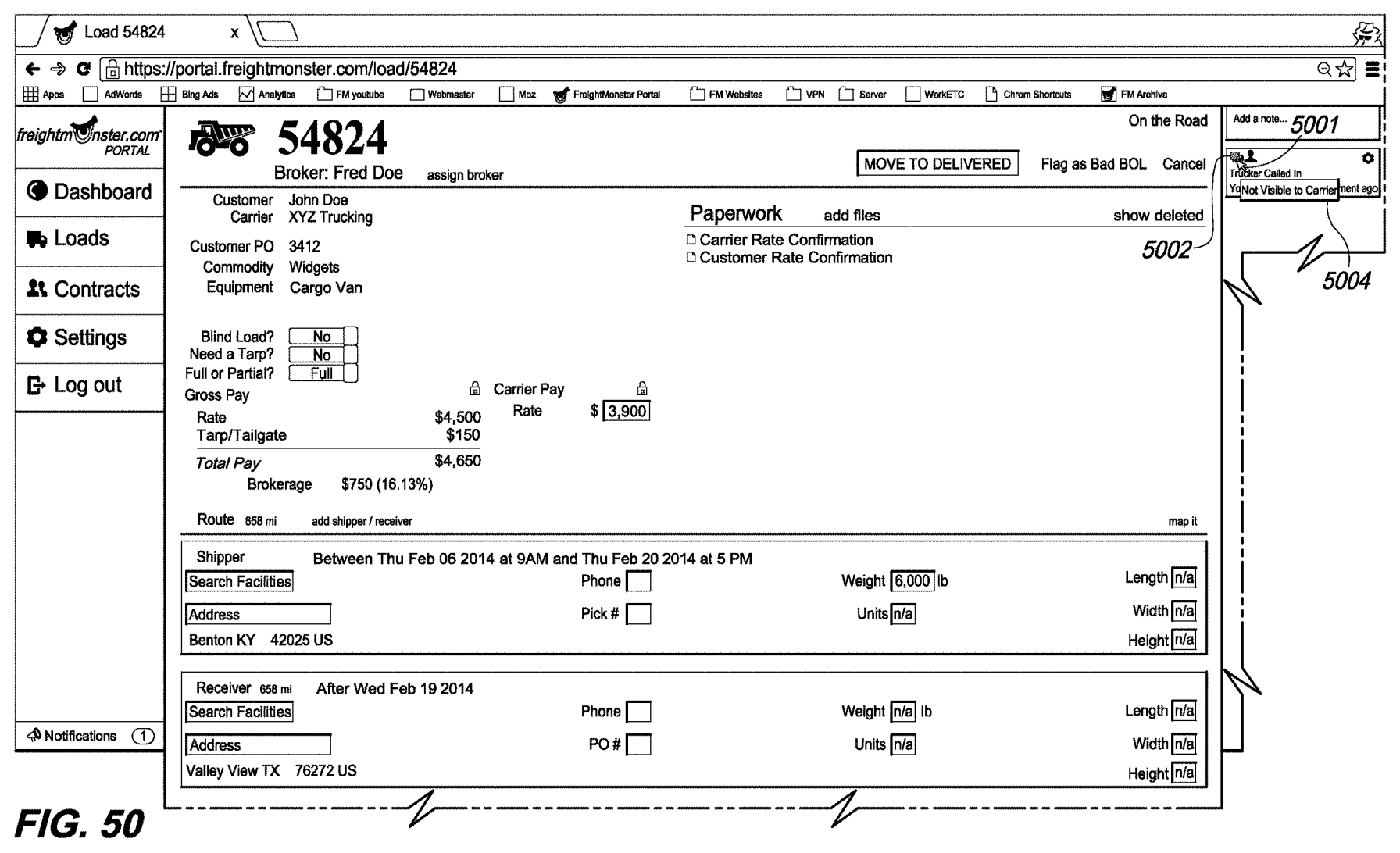

FIG. 50 illustrates a screen shot depicting added notes to a load with carrier permissions to view. A cursor 5001 is provided (hovers) over a carrier note permissions icon 5002. A tool tips, or pop-up box 5004 is generated to display the current carrier note permissions status.

Figure 51:
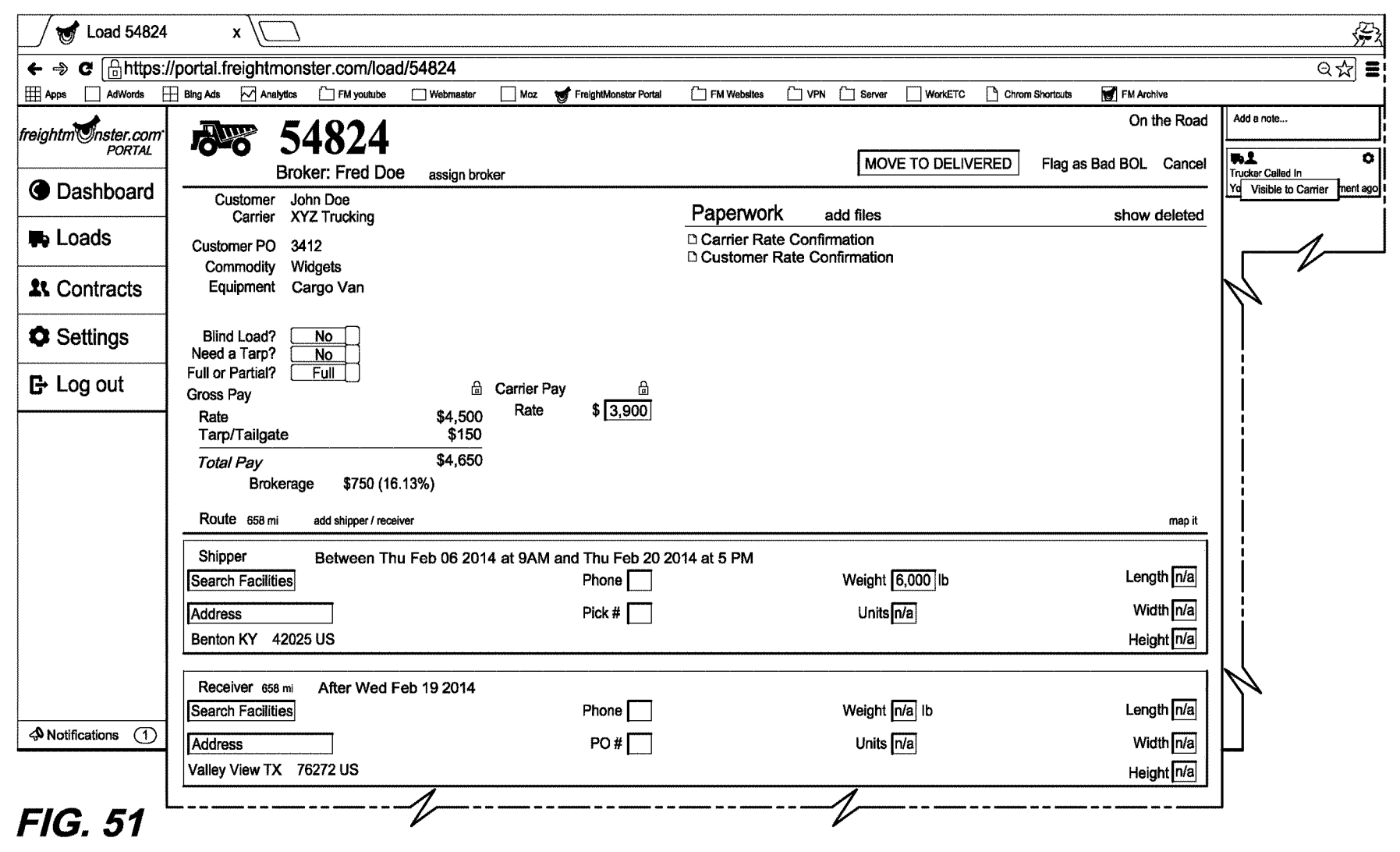

FIG. 51 illustrates a screen shot depicting that selection is being to enable viewing by the carrier of note text.

In compliance with the statute, the subject matter disclosed herein has been described in language more or less specific as to structural and methodical features. It is to be understood, however, that the claims are not limited to the specific features shown and described, since the means herein disclosed comprise example embodiments. The claims are thus to be afforded full scope as literally worded, and to be appropriately interpreted in accordance with the doctrine of equivalents.

The invention claimed is:

1. An apparatus for managing transportation of freight, comprising:
   a server;

a plurality of carrier vehicles each configured to haul a load; and a plurality of clients each associated with one of the plurality of carrier vehicles and each client having a user interface; and a processor designed to process instructions to provide date and time selection to the client from the server to enable temporal scheduling of a load to be transported for a prospective transportation industry customer;

the server having a non-transitory machine readable memory having stored therein computer instructions programmed to cause the processor to:

store user information and instructions in the memory at the host server;

access the memory at the server to retrieve the user information and instructions and execute the instructions to perform steps to:

present from the server to the plurality of clients at the user interface one or more of a selectable date range and a time range for which the user provides a temporal-based requirement for picking up a load for a customer;

enable selection of one or more of a date range and a time range at the user interface of each of the plurality of clients;

receive a selected one or more of the date range and the time range at the server from a user at one of the clients;

store the received and selected one or more of the date range and the time range into a database of the server;

associate the stored one or more of the date range and the time range with a waypoint indicative of a cargo delivery destination desired by the customer;

associate the waypoint to a load;

associate the load to the customer;

present the load, the waypoint, the date range and the time range to at least one shipper via the user interface at each of the plurality of clients each having equipment configured to move the load;

receive via the user interface at the server from a client a quote from one of the at least one shipper to move the load at the waypoint within the date range and the time range;

generate at the server for delivery to a display at a client visible display notes characterizing status of carrier permissions based on one or more conditions being met by the carrier to a user having carrier note permissions to view the status of the carrier permissions;

at the server, from a remote client, accept the quote from the one shipper to move the load;

at the server, permission-locking user access on an electronic bill of lading comprising the accepted quote to only administrative or authorized broker level personnel, the locked user access preventing the one shipper after booking and at least one of: a broker shipper, a customer, a receiver, and an insurance provider from modifying the electronic bill, to secure data on the electronic bill of lading after the load is delivered and the electronic bill of lading is generated;

shifting management of load delivery upon permission-locking user access to a uniquely different department having uniquely different account representatives than the broker;

from the server, simultaneously generating and delivering by electronic transmission the permission-locked electronic bill of lading including the accepted quote to the one shipper to acknowledge and initiate resource allocation of the equipment by directing movement of one of the plurality of carrier vehicles to acquire and move the load at the waypoint for delivery to the prospective transportation industry customer;

delivering the load from the waypoint to the customer;

at the server, changing status of the load to delivered and rendering notes to the delivered load associated with the delivered and permission-locked electronic bill of lading selectively viewable by the carrier when granted permission by administrator or broker level personnel having access permission; and generating a final delivered and permission-locked electronic bill of lading received after delivering the load to the customer using one of the uniquely different account representatives having permission-locked data presentable to the shipper after delivering the load.

2. The apparatus of claim 1, wherein the user is a load scheduling participant.

3. The apparatus of claim 2, wherein the load scheduling participant is a customer.

4. The apparatus of claim 2, wherein the load scheduling participant is a broker, and wherein presenting comprises presenting from the server to the broker at the user interface of the client one or more of a selectable date range and a time range for which the broker provides a temporal-based requirement for picking up a customer load.

5. The apparatus of claim 4, wherein the one or more of a selectable date range and the time range comprises a temporal range graphical user interface selection menu.

6. The apparatus of claim 1, wherein the load scheduling participant is a customer, and wherein presenting comprises presenting from the server to the customer at the user interface of the client one or more of a selectable date range and a time range for which the customer provides a temporal-based requirement for picking up a customer load.

7. The apparatus of claim 6, wherein the one or more of a selectable date range and the time range comprises a temporal range graphical user interface selection menu.

8. The apparatus of claim 1, wherein enabling selection of one or more of a date range and a time range at a user interface of the client comprises using a single tactile input gesture to capture a temporal range.

9. The device of claim 1, wherein the server having further instructions stored in the memory to cause the processor to store indicia about the at least one shipper indicative of at least one of: a) insurance status; b) carrier compliance; and c) common and contract authority.

10. The device of claim 1, wherein the server having further instructions stored in the memory to cause the processor to parse in one of a plurality of ways the selected date and time range and post the parsed selected date and time range to an industry standard load board.

11. The device of claim 1, wherein the server having further instructions stored in the memory to cause the processor to authenticate a user at the user interface.

12. The device of claim 1, wherein the server having further instructions stored in the memory to cause the processor to categorize the type of user, and generate one of a plurality of unique user interfaces for the categorized type of user.

13. The device of claim 1, further comprising a fleet of vehicles associated with one shipper, one of the fleet of vehicles rendered operative to acquire and move the load at the waypoint for delivery to the prospective transportation industry customer.

14. The device of claim 1, wherein shifting management of load delivery to a uniquely different department comprises enabling exclusively an accounting department with the ability to close a load after the load has been delivered.

15. The device of claim 1, further comprising exclusively enabling an administrator with an ability to modify the load outside of a normal flow process.

16. The device of claim 1, wherein the broker is only enabled with the ability to view load and account information after locking out the broker.

* * * * *

UNITED STATES PATENT AND TRADEMARK OFFICE
CERTIFICATE OF CORRECTION

| | |
|---|---|
| PATENT NO. | : 11,334,843 B2 |
| APPLICATION NO. | : 14/635692 |
| DATED | : May 17, 2022 |
| INVENTOR(S) | : Larry C. Lockhart, Jr., Arlen Anderson and Matt Wilson |

It is certified that error appears in the above-identified patent and that said Letters Patent is hereby corrected as shown below:

In the Specification

Column 6, Line 63 – Replace "particularly load" with --particular load--

Column 6, Line 67 – Replace "look at" with --looks at--

Column 8, Line 15 – Replace "email adrees" with --email address--

Column 8, Line 21 – Replace "exemplary shown" with --example shows--

Column 8, Line 36 – Replace "provide along" with --provided along--

Column 14, Line 53 – Replace "being to enable" with --to enable--

Signed and Sealed this
Nineteenth Day of July, 2022

*Katherine Kelly Vidal*
Katherine Kelly Vidal
*Director of the United States Patent and Trademark Office*